(12) United States Patent
Gotoh et al.

(10) Patent No.: US 6,552,760 B1
(45) Date of Patent: Apr. 22, 2003

(54) LUMINAIRE WITH IMPROVED LIGHT UTILIZATION EFFICIENCY

(75) Inventors: Takeshi Gotoh, Kawasaki (JP); Toshihiro Suzuki, Kawasaki (JP); Tetsuya Kobayashi, Kawasaki (JP); Tetsuya Hamada, Kawasaki (JP); Mari Sugawara, Kawasaki (JP); Keiji Hayashi, Kawasaki (JP); Noriyuki Ohashi, Kawasaki (JP); Hisashi Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/506,267

(22) Filed: Feb. 17, 2000

(30) Foreign Application Priority Data

Feb. 18, 1999 (JP) .............................. 11-039359
Feb. 26, 1999 (JP) .............................. 11-051771
Mar. 19, 1999 (JP) .............................. 11-074727

(51) Int. Cl.$^7$ .............................................. G02F 1/1333
(52) U.S. Cl. ................................. 349/56; 349/5; 353/38; 359/641; 359/642; 359/721
(58) Field of Search ................................ 349/56, 5, 6, 7, 349/8; 353/30, 31, 38, 39; 359/641, 642, 648, 649, 721, 798, 799, 800

(56) References Cited

U.S. PATENT DOCUMENTS 6,046,856 A * 4/2000 Takahashi et al. ............ 359/621
6,092,901 A * 7/2000 Hashizume et al. ............ 362/19
6,219,111 B1 * 4/2001 Fukuda et al. .................. 349/5
6,219,112 B1 * 4/2001 Yoneyama et al. .............. 349/5
6,373,629 B1 * 4/2002 Yamagishi et al. ........... 359/487
6,457,832 B1 * 10/2002 Okuyama ...................... 353/38
6,464,362 B1 * 10/2002 Sugawara et al. ........... 353/102

* cited by examiner

Primary Examiner—Robert H. Kim
Assistant Examiner—David Chung
(74) Attorney, Agent, or Firm—Greer, Burns & Crain, Ltd.

(57) ABSTRACT

A lens array 22C has convex lenses 221 and 221C arranged in alternate and staggering manner to one another. In combination with a condenser lens 23, the convex lenses 221 form images of respective convex lenses 211 of a lens array 21 on a plane 24 to be illuminated in overlapping so that an illuminance distribution on the plane 24 is almost uniform, while the convex lenses 221C whose focal length is longer than that of the convex lenses 211 make on the plane 24 an illuminance distribution of a mountain-shape. Flat plate portions and concave lenses may be employed instead of the convex lenses 221C. A polarization conversion element comprises two elements and an element disposed therebetween with its longitudinal direction being perpendicular to the two element. The images of a light emitting part are included in band-shaped useful incident areas. A polarization conversion section comprises a middle part which is thin but has a larger divergent angle and side parts each has a smaller divergent angle and a simpler construction but is thicker with its size larger.

3 Claims, 53 Drawing Sheets

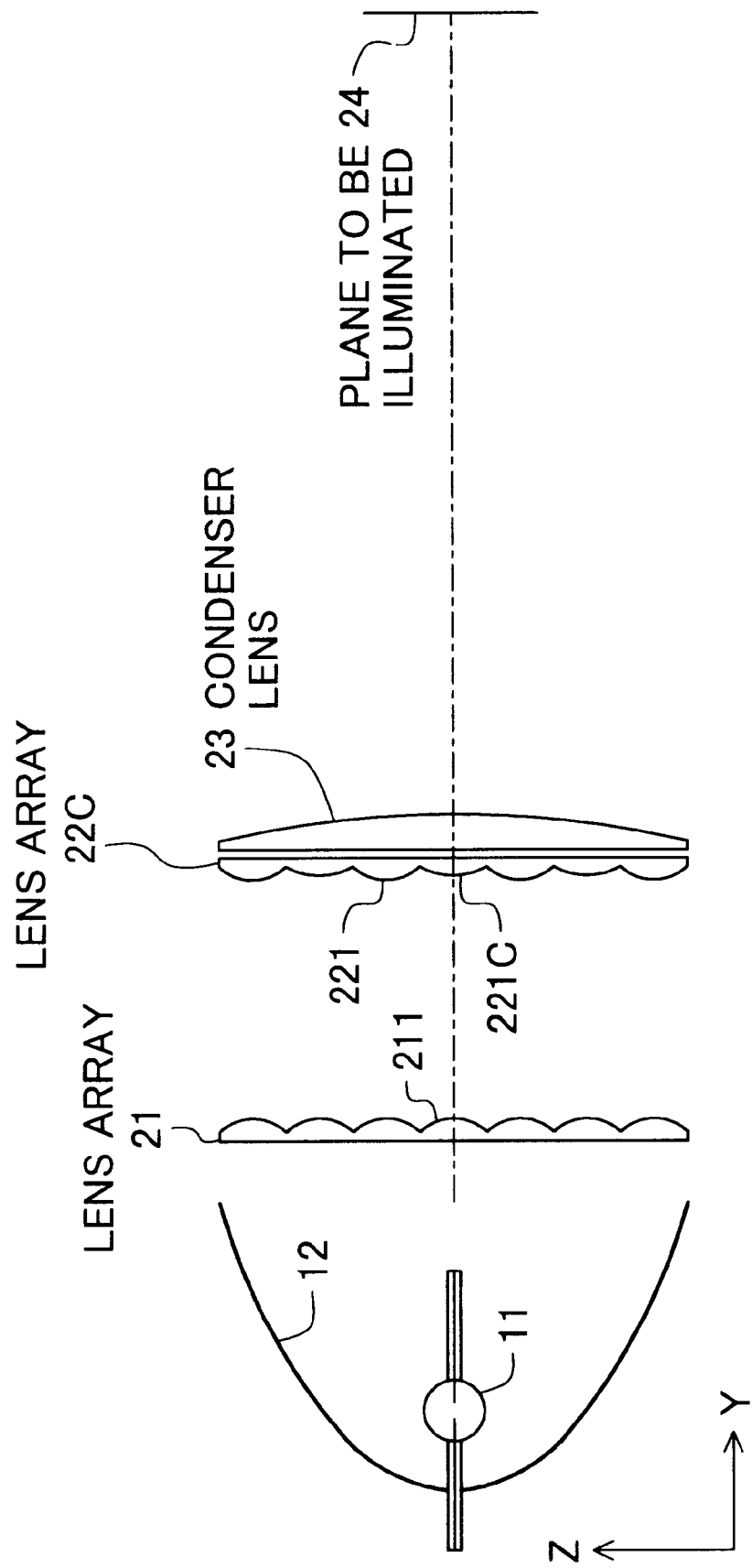

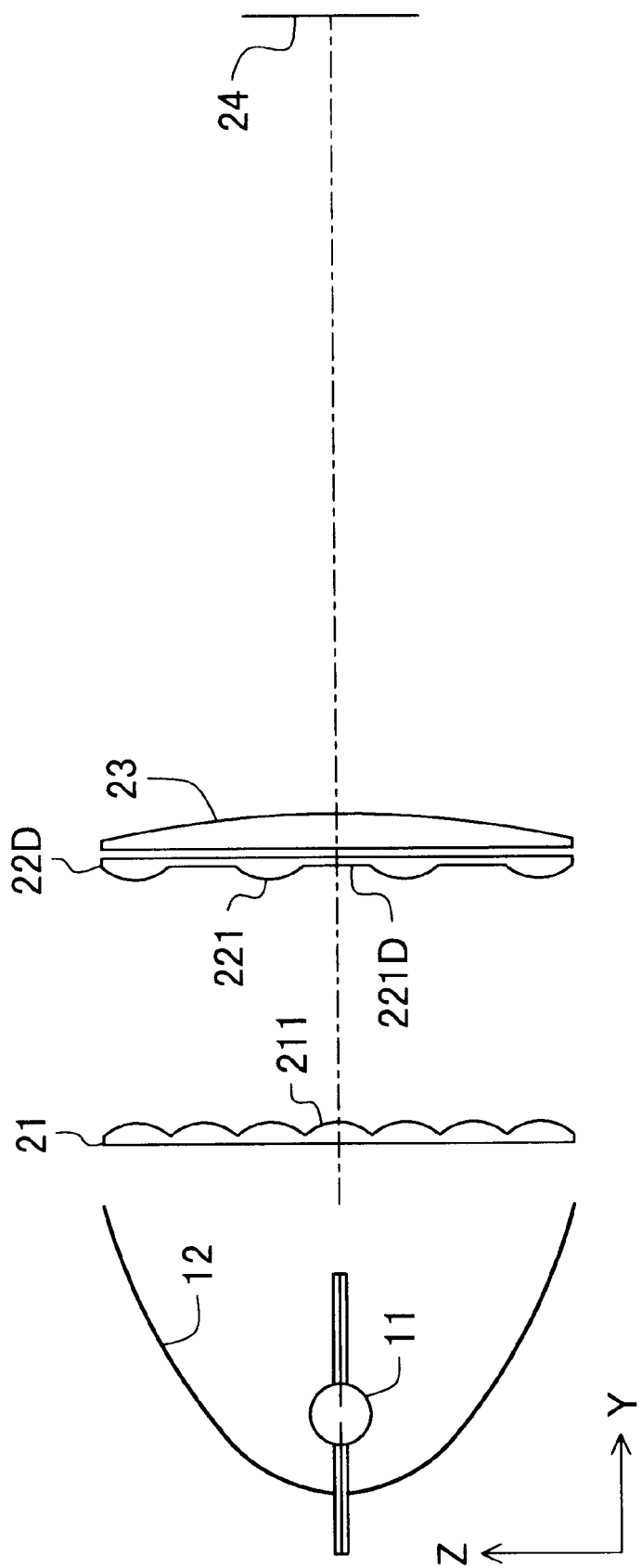

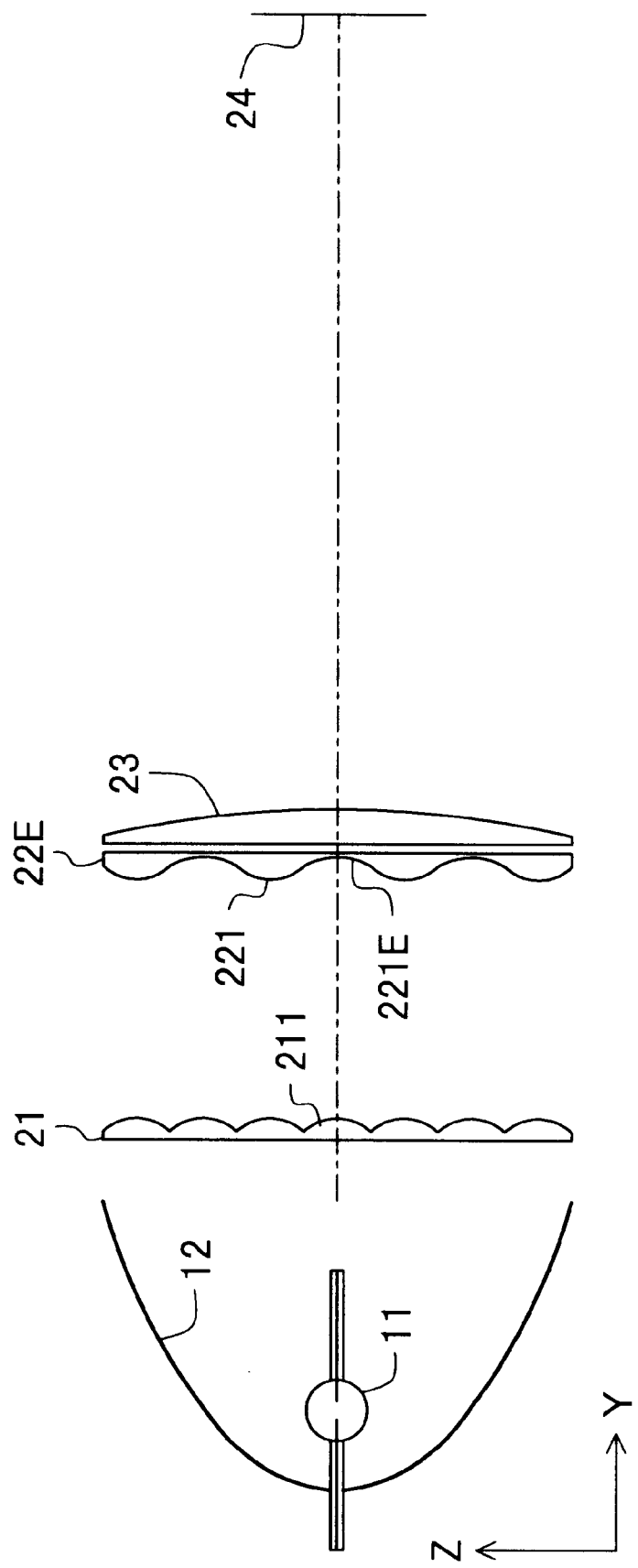

FIG.11

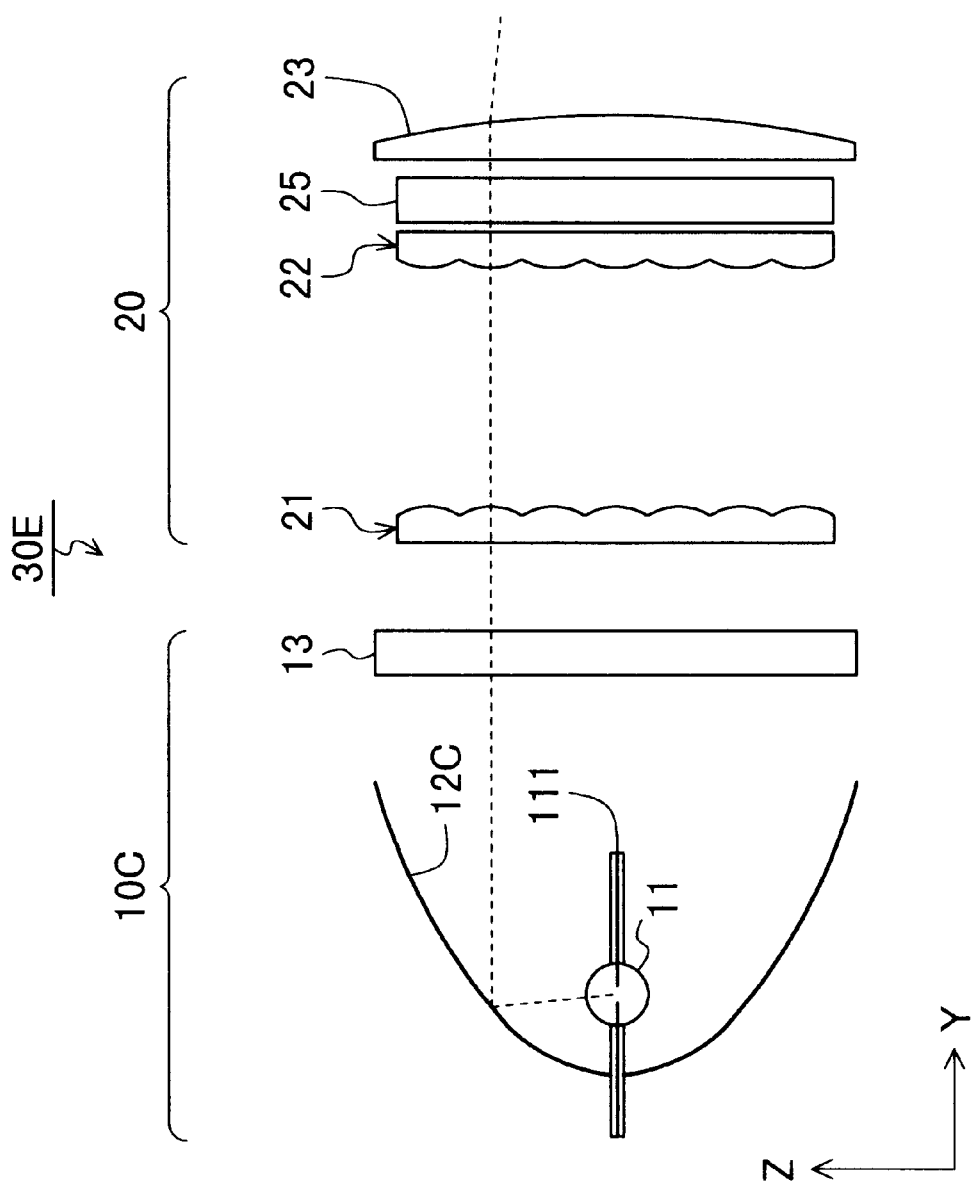
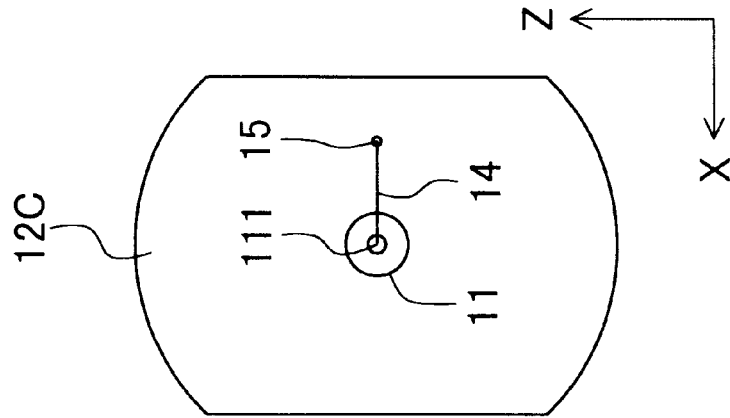

USELESS INCIDENT AREA
USEFUL INCIDENT AREA

LUMINAIRE WITH IMPROVED LIGHT UTILIZATION EFFICIENCY

BACKGROUND OF THE INVENTION

1. Field of the Invention

The present invention relates generally to a luminaire with improved light utilization efficiency, more particularly, to a polarized luminaire, an unpolarized luminaire, an illuminance distribution improving device therefore, and polarization converter each for use in a liquid crystal projection device.

2. Description of the Related Art

In projectors such as a liquid crystal projector and a movie projector, there has been a requirement for increasing light utilization efficiency of light emitted from a light source in order to obtain a brighter projected image.

FIG. 47 shows a schematic sectional view of a prior art luminaire taken along the optical axis thereof, the luminaire being employed in such projectors.

In the figure, the arc gap center of a metal halide lamp 11 coincides with a focal point of a parabolic mirror 12, and light emitted from the metal halide lamp 11 is reflected by the parabolic mirror 12 so as to be substantially in parallel light beams. The parallel beams enter into a lens array 21. A lens array 22 having lenses arranged in a corresponding manner to those of the lens array 21 is disposed opposite thereto. A distance between the lens arrays 21 and 22 is made equal to a focal length of the lenses of the lens array 21 so that light beams emitted from the lenses of the lens array 21 enter into the corresponding lenses of the lens array 22 efficiently. A condenser lens 23 is disposed on the lens array 22 side and between the lens array 22 and a plane 24 to be illuminated.

Parallel luminous flux incoming to any lens 211 of the lens array 21 converge at the center of a lens 221, corresponding to the lens 211, of the lens array 22, pass through the condenser lens 23 and proceed to the plane 24 to be illuminated so as to illuminate the entire area thereof. That is, all images of the lenses of the lens array 21 are formed on the plane 24 in overlapping by the lens array 22 and the condenser lens 23. An intensity distribution of light reflected from the parabolic mirror 12 has the highest in the central and is lower with going apart from the center, but if the number of lens pairs of the lens arrays is large (generally the number ranges from tens to hundreds), incident light intensities all over the plane 24 are almost uniform as shown in FIG. 48(B) due to such workings of the lens arrays 21 and 22 and the condenser lens 23.

In the luminaire of FIG. 47, manufacture error in dimension associated with constituents and mounting error thereof are varied every device. Since a liquid crystal projector or the like is an mass-produced article, as shown in FIG. 48(A), the size of an illumination spot P on the plane 24 is necessary to be determined in consideration of a margin area MA provided outside an effective illumination area EA so as to absorb such errors. For example, in a case where the effective illumination area EA is a liquid crystal panel in rectangular shape with a longitudinal side of 15 mm and a lateral side of 20 mm, with the margin area MA having each width of 3.5 mm in the vertical direction and each width of 2.55 mm in the horizontal direction in order to cope with such errors as actually arise, 45% of the luminance light in amount is wasted in the margin area MA if considered a uniform distribution as shown in FIG. 48(B), resulting in poor light utilization efficiency.

Now, in an unpolarized light luminaire 10 shown in FIG. 49, the center of an arc gap of a metal halide lamp 11 is sat to the focal point of a parabolic mirror 12, and a UV/IR cut filter 13 is disposed on the aperture side of the parabolic mirror 12. Unpolarized light emitted from the metal halide lamp 11 is reflected by the parabolic mirror 12 to be substantially parallel light beams, and only white light passes through the UV/IR cut filter 13.

For example, in a liquid crystal projection device, light that has passed through a UV/IR cut filter 13 is directed to, as shown in FIG. 50, a lens array 21 of an polarization conversion device 20 in order to reduce heat absorption in a liquid crystal panel that uses only polarized light. A lens array 22 is of the same shape as that of the lens array 21 and arranged opposite to the lens array 21 with a distance A between the lens arrays 21 and 22, the distance being equal to a focal length of the lens array 21. A condenser lens 23 is disposed on the lens array 22 side and between the lens array 22 and a plane 24 to be illuminated. A focal length of the lens array 22 is not required to be equal to that of a lens array 21.

A parallel luminous flux having being incident on a lens 210 of the lens array 21 converges at the center of a corresponding lens 220 of the lens array 22 and is passes through the condenser lens 23 to project onto the whole plane 24 to be illuminated. Likewise, a parallel luminous flux having being incident on a lens 211 of the lens array 21 converges at the center of a corresponding lens 221 of the lens array 22 and is passes through the condenser lens 23 to project onto the whole plane 24. The emitting light from the unpolarized light luminaire 10 has an intensity distribution which is the highest in the middle and lower toward its periphery, but an almost flat illuminance distribution is obtained across an illumination spot on the plane 24 by such workings of the lens arrays 21 and 22 and the condenser lens 23.

A polarization conversion element 25 is disposed between the lens array 22 and the condenser lens 23.

The polarization conversion element 25 is constructed as follows. One end to the other end along X direction, arranging prisms 250 of the same shapes as one another, each having a section of a parallelogram and extending along a direction perpendicular to the drawing paper. Polarization beam splitters 251 and mirrors 252 each formed with dielectric multi-layered films are alternately inserted between the prisms 250 and formed on both end surfaces of the element facing X direction. Halfwave plates 253 are pasted on every other light emitting surfaces of the prisms 250. In this parallelogram, widths of a pair of an incident surface and an emitting surface opposite to each other is a half of a width CX of a lens of the lens array 22, lengths of the other pair of opposite sides are $2^{-0.5}CX$, and one of opposite angle is 45 degrees. The polarization conversion elements 25 are arranged such that the centers of the lenses of the lens array 22 coincide with the centers in X direction of the polarization beam splitters 251.

For example, a p-polarized component of a light beam proceeding along the optical axis of a convex lens 211 is passes through a polarization beam splitter 251, while an s-polarized component thereof is reflected by the polarization beam splitter 251. The s-polarized component is further reflected by a mirror 252, and further passes through the halfwave plate 253 to be converted to p-polarized light. Therefore, light having passed through the polarization conversion element 25 is p-polarized light.

The metal halide lamp 11 in FIG. 49 has a light emitting part that is not a point source of light and therefore, emitted light from the unpolarized light luminaire 10 is not of perfect parallel beams. As shown in FIG. 50, most of non-parallel light beams, like a light beam L1, are reflected by the mirror 252 and s-polarized component of the reflected beams are further reflected by the polarization beam splitter 251 to be output from the polarization conversion element 25. Part of the non-parallel light beams, like a light beam L2, are passes through the polarization conversion element 25 with being kept in an unpolarized state. For these reasons, light utilization efficiency is reduced, which leads to darkness of a projected picture.

In FIG. 49, a divergence angle φ of the non-parallel beams whose intensity amount to more than half of that of parallel light beams is dependent on a visual angle from a point on the parabolic mirror 12 for the light emitting part. A parallelism of the emitting light beams from the unpolarized light luminaire 10 is reduced as the metal halide lamp 11 is of a higher power. For example, in order to obtain 1500 lm as a light power of the unpolarized luminaire 10, a metal halide lamp of more than 350 W is necessary, wherein a divergence angle φ of the non-parallel beams amounts to about 8 degrees at the maximum.

In FIG. 50, a visual angle θ from a lens of the lens array 21 for the corresponding incident surface of the prism of the polarization conversion element 25 is expressed by the following formula.

$$\theta = \operatorname{atan}(CX/2A) \quad (1)$$

Letting the length of the plane 24 be DX and the distance from the lens array 22 to the plane 24 be B, the following equation holds from the relation of geometrical similarity.

$$CX:DX=A:B \quad (2)$$

θ is expressed as follow from the above two relations.

$$\theta = \operatorname{atan}(DX/2B) \quad (3)$$

Namely, θ is determined by values of DX and B.

It is required to satisfy a relation of φ<θ in order to improve light utilization efficiency.

In a case where a liquid crystal panel with a diagonal length of 50 mm is employed, since B and DX are usually of about 250 mm and 40 mm, respectively, θ is of about 4.6 degrees. Therefore, in the case of the above described light source, light utilization efficiency is roughly half at the portion where φ is at the maximum, and the light utilization efficiency is of about 65% as a whole.

Now, FIG. 51 shows a schematic sectional view taken along the optical axis of a prior art polarized luminaire for use in a projection device. The arc gap center of a metal halide lamp 11 is set to the focal point of a parabolic mirror 12, and emitted light beams from the metal halide lamp 11 are reflected by the parabolic mirror 12 to be substantially parallel light beams. In a liquid crystal projection device, the parallel light beams are converted to linearly polarized light by a polarization conversion device 20X in order to improve light utilization efficiency at a liquid crystal panel which uses only linearly polarized light.

The polarization conversion device 20X is constructed of a prism 250X extending along a direction perpendicular to the drawing paper. The prism 250X has a section of a parallelogram and is joined with a right-angled triangular prism 255 with a polarization beam splitter 251X formed with dielectric multi-layered films interposed therebetween. A total reflection mirror 252X is formed on a surface of the prism 250X opposite to the polarization beam splitter 251X.

A halfwave plate 253X is pasted on a light emitting surface of the prism 250X.

A p-polarized component of incident light on the prism 250X transmits through the polarization beam splitter 251X, and an s-polarized component thereof is reflected by the polarization beam splitter 251X. The s-polarized component is reflected by the total reflection mirror 252X and then passes through the halfwave plate 253X to be finally converted to p-polarized light. With such a process, emitted light from the polarization conversion device 20X becomes all p-polarized light.

In the polarization conversion device 20X, since a thickness D of the polarization conversion device 20X is equal to the aperture radius of the parabolic mirror 12 and a length of a light emitting surface thereof is equal to 4 times the aperture radius, there are problems due to its large size and heavy weight.

FIG. 52 shows a schematic sectional view taken along the optical axis of another prior art polarized luminaire for use in a projection device.

A polarization conversion element 25 of a polarization conversion device 20Y is constructed as follows. From one end to the other end along a direction perpendicular to the optical axis, prisms 250 of the same shapes as one another are arranged, each prism with a section of a parallelogram and extending along a direction perpendicular to the drawing paper. Polarization beam splitters 251 and total reflection mirrors 252 made of dielectric multi-layered films are alternately inserted between the prisms 250 and formed on both end surfaces of the element facing the direction perpendicular to the optical axis. Halfwave plates 253 are pasted on every other light emitting surfaces of the prisms 250.

The polarization conversion element 25 performs polarization conversion of incident light on every other prisms (light incident on a useful incident area) from unpolarized light to p-polarized light similar to the polarization conversion device 20X of FIG. 51, and converts incident light on the other prisms (light incident on a useless incident area) to s-polarized light. On the other hand, parallel light beams emitted from the parabolic mirror 12 are converged only to useful incident areas by the lens array 21, and p-polarized light beams emerged from the polarization conversion element 25 are collimated by the lens array 28.

According to such a polarization conversion device 20Y, a light emitting surface of the device is narrower than that of the polarization conversion device 20X of FIG. 51, enabling the device to be more compact and lighter.

Herein, in FIG. 49, the divergence angle φ of non-parallel light beams whose light intensity is more than half of the intensity of parallel light beams is, for example, 4 degrees. Even with this divergence, as in FIG. 52, since the light beams are converged on useful incident areas on the polarization conversion element 25 by the lens array 21, it can be prevented from occurring that light beams impinge on useless incident areas.

FIG. 53 is a optical path diagram showing a relation between a combination of convex lenses 211 and 281 in FIG. 52, and a divergence angle caused by a non-point light source.

Letting a focal length of the convex lens 211 be 2F, a focal length of the convex lens 281 is F so that a parallel light flux is converted to a parallel light flux of half the diameter, and a distance between the convex lenses 211 and 281 is 3F.

An image of the light emitting part of the metal halide lamp 11 is formed at a focal point of the convex lens 211. A visual angle from the center of the convex lens 211 for the image of the light emitting part is 2θ, and a visual angle from the center of the convex lens 281 for the image is 4θ.

Accordingly, a divergence angle is twofold owing to a light flux from the parabolic mirror 12 passing through the polarization conversion device 20Y. Therefore, if the polarized luminaire of FIG. 52 is employed in a liquid crystal projection device, a light amount that leaks outside a useful incident area increases at a liquid crystal panel and a projection lens, causing a darker projection picture. If a diameter of a projection lens is increased in order to improve light utilization efficiency, the device becomes heavier and more costly.

SUMMARY OF THE INVENTION

Accordingly, it is an object of the present invention to provide a luminaire with improved light utilization efficiency.

In the first aspect of the present invention, there is provided an illuminance distribution improving device for a luminaire comprising: a first lens array having a plurality of convex lenses each having a first focal length; a second lens array, having a plurality of lenses corresponding to respective lenses of the first lens array, disposed opposite to the first lens array; and a condenser lens disposed on the opposite side to the first lens array with respect to the second lens array, wherein a distance between the first and second lens arrays is substantially equal to the first focal length, wherein the second lens array has: a first lens group composed of a plurality of convex lenses each having a second focal length; and a second lens group composed of a plurality of lenses each having a second focal length negative or longer than that of the convex lenses of the first lens group.

In regard to the second lens array, assuming that only the first lens group is used, an illuminance distribution at a plane to be illuminated is substantially uniform with steep descent around it, for example as shown in FIG. 2(A). While, assuming that only the second lens group is used, an illuminance distribution at the plane to be illuminated has a mountain-like shape with its top in the center, for example as shown in FIG. 2(B). An actual illuminance distribution is obtained from superimposing both these two illuminance distributions, and for example as shown in FIG. 2(C), the illuminance almost smoothly changes within an effective illumination area, that is, a necessary illumination area EA.

Human eyes is not so sensitive for such a smoothly change of illuminance distribution that, if such a illuminance distribution improving device is used for a luminaire, for example, in a movie projector, and human eyes feel that the illuminated area is brighter, in a case where an illuminance in a central area is higher than that in a surrounding area thereof, than in a case of a uniform illuminance distribution, assumed that quantities of total light are same as each other. Furthermore, since an illuminance at the edge of the effective illumination area EA is lower than that at the center point and an illuminance steeply decreases from an edge point of the effective illumination area EA toward the outside, the ratio of light quantity into the margin area MA to the total light quantity is lower than that in the prior art if the same margin area is ensured.

Therefore, with the first aspect of the present invention, light utilization efficiency can be increased with almost no deterioration in image quality.

In the second aspect of the present invention, there is provided a polarization conversion device comprising: a first lens array having a plurality of convex lenses each having a first focal length; a second lens array, having a plurality of lenses corresponding to respective lenses of the first lens array, disposed opposite to the first lens array; a condenser lens disposed on the opposite side to the first lens array with respect to the second lens array; and a polarization conversion element, disposed between the second lens array and the condenser lens, wherein a distance between the first and second lens arrays is substantially equal to the first focal length, wherein the polarization conversion element comprises first and second polarization conversion elements, each of the first and second polarization conversion elements having a plurality of polarization conversion components arranged in parallel to one another, wherein each of the polarization conversion components has a band-shaped useful incident area and a band-shaped useless incident area adjacent to each other on a front surface thereof, each of the polarization conversion components is for converting unpolarized light incident on the useful incident area to a first linearly polarized light and for converting unpolarized light incident on the useless incident area to a second linearly polarized light having a polarization plane perpendicular to that of the first linearly polarized light or making incident light pass through without polarizing, wherein the band-shaped useful incident areas of the first polarization conversion components and the band-shaped useful incident areas of the second polarization conversion components are perpendicular to each other, wherein the first and second polarization conversion elements are arranged in such a way that central axes of the lenses of the second lens array cross corresponding central lines of the useful incident areas.

In the prior art, since longitudinal directions of band-shaped useful incident areas on a polarization conversion element are the same as one another, as shown in FIG. 27(B), in a place where light utilization efficiency is the poorest, although both end portions of the image of a light emitting part are the brightest, but are outside the useful incident area so that light impinged on both end portions are useless. In contrast to this, with the first aspect of the present invention, since the longitudinal direction of the second polarization conversion element corresponding to such a poor place is aligned with the same direction as that of images of a light emitting part, light utilization efficiency can be improved.

In the third aspect of the present invention, there is provided a polarization conversion device comprising first and second polarization conversion sections disposed adjacent to each other with optical axes of the first and second polarization conversion sections being substantially parallel to each other, wherein the first polarization conversion section comprises: a first polarization converter, having a plurality of first prisms arranged in a row, having polarization beam splitter films and reflection films alternately inserted between the first prisms without spacing, each first prism having a cross section of a first parallelogram, the first parallelogram having a pair of opposite angles of 45 degrees; a first lens array for converging incident light and directing converged light into every other first prisms of the first polarization converter; and a second lens array for collimating converged light from the fist prisms, wherein the second polarization conversion section comprises: a second polarization converter, having a second prism which has a cross section of a second parallelogram similar to and larger than the first parallelogram, having a polarization beam splitter film and a reflection film formed on opposite surfaces of the second prism, respectively.

With the third aspect of the present invention, although parallelism of light beams are deteriorated due to passage of the light beams through the first polarization conversion section which can be thinner, almost all of the light beams therefrom can be directed to a plane to be illuminated and thereby, light utilization efficiency is increased. Further, since the thickness of the second polarization conversion section can be smaller than in a case where only the second polarization conversion section is employed, the luminaire can be more compact and lighter.

Other aspects, objects, and the advantages of the present invention will become apparent from the following detailed description taken in connection with the accompanying drawings.

BRIEF DESCRIPTION OF THE DRAWINGS

FIG. 1 is a schematic sectional view taken along the optical axis of a luminaire of the first embodiment according to the present invention;

FIG. 3 is a schematic sectional view taken along the optical axis of a luminaire of the second embodiment according to the present invention;

FIG. 5 is a schematic sectional view taken along the optical axis of a luminaire of the third embodiment according to the present invention;

FIG. 11 is an illustration of lens arrangement of a lens array, which is employed instead of the lens array 22C in FIG. 1, according to the sixth embodiment according to the present invention;

FIG. 35(A) is a schematic, longitudinal sectional view taken along the optical axis of a polarized luminaire of the eighteenth embodiment according to the present invention;

FIG. 35(B) is a front view of the parabolic mirror in FIG. 35(A);

DESCRIPTION OF THE PREFERRED EMBODIMENTS

Figure 2A:
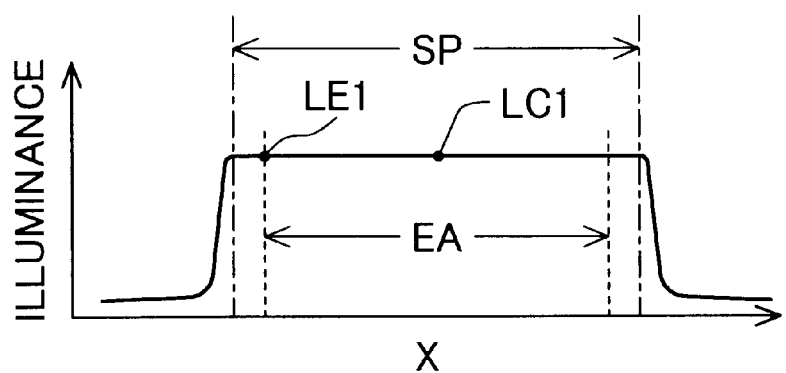
FIG. 2(A) is a graph of an illuminance distribution on an illuminated plane assumed that light passes through convex lenses 221 of a half of the total lenses of the lens array 22C in FIG. 1.

Referring now to the drawings, wherein like reference characters designate like or corresponding parts throughout several views, preferred embodiments of the present invention are described below.

First Embodiment

FIG. 1 shows a schematic sectional view taken along the optical axis of a luminaire of the first embodiment according to the present invention.

Figure 47:
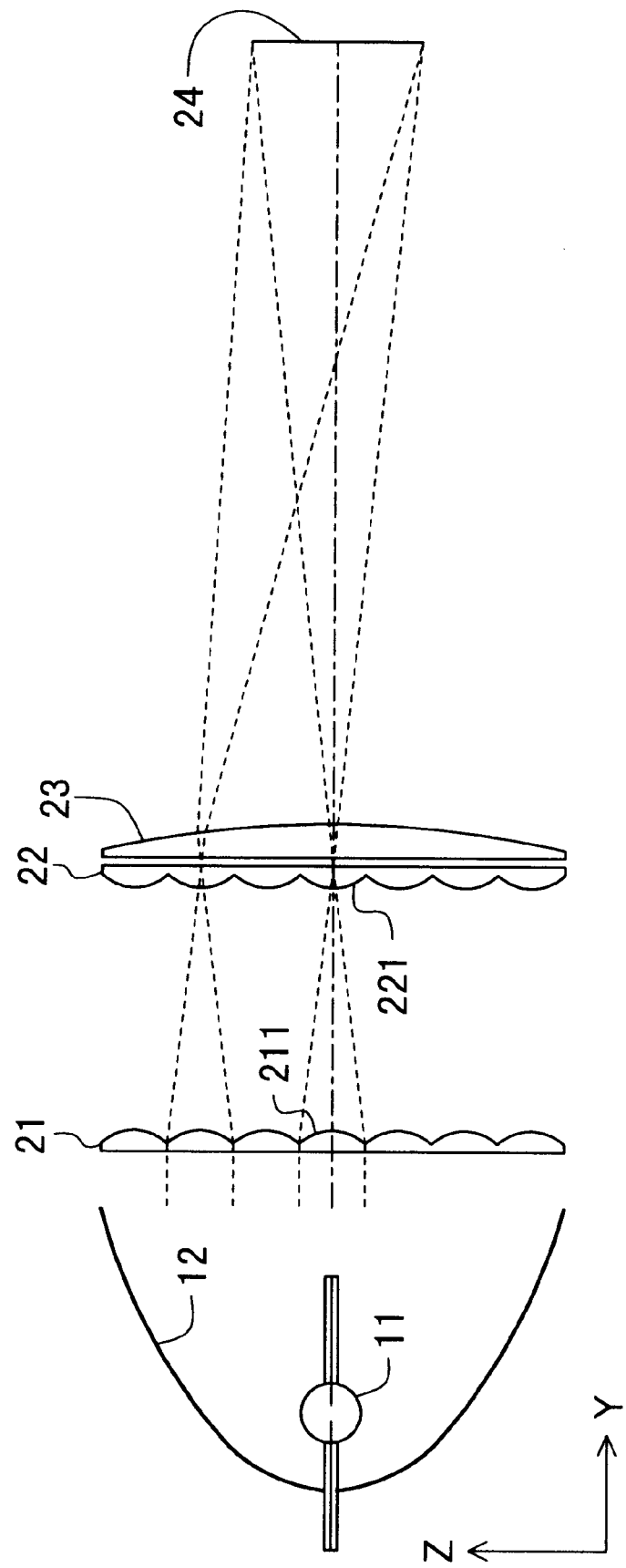
FIG. 47 is a schematic sectional view taken along the optical axis of a prior art luminaire.
Figure 48A:
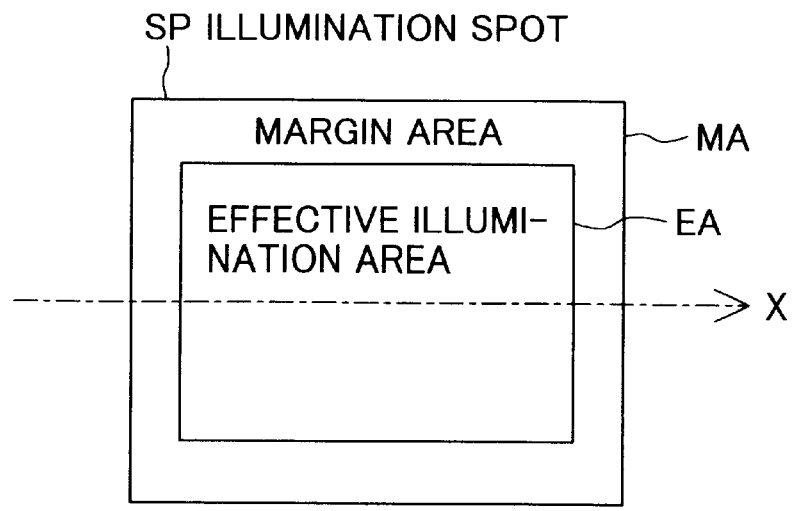
FIG. 48(A) is an illustration for a margin area of an illumination spot formed on an illuminated plane with the luminaire of FIG. 47.
Figure 48B:
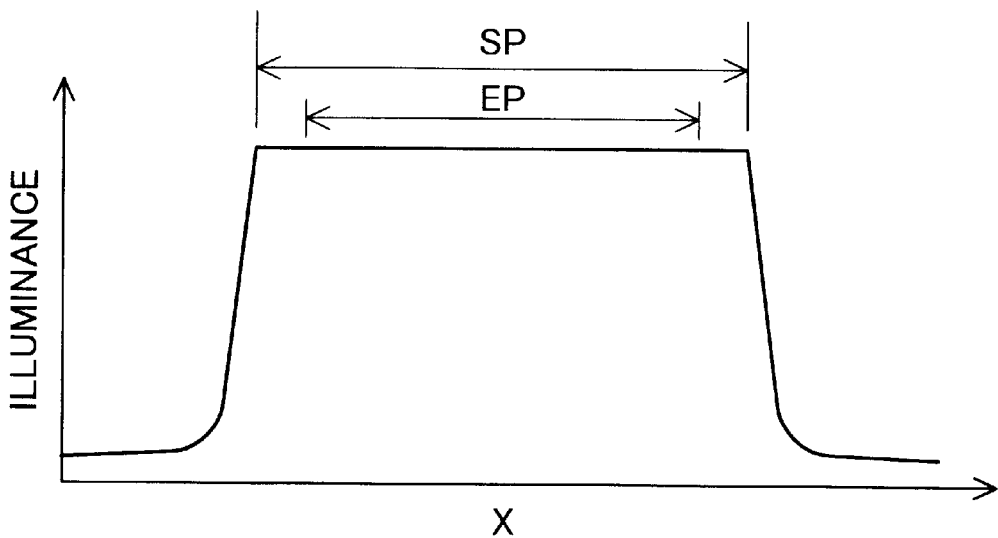
FIG. 48(B) is an illuminance distribution along X axis of this illumination spot.
Figure 49:
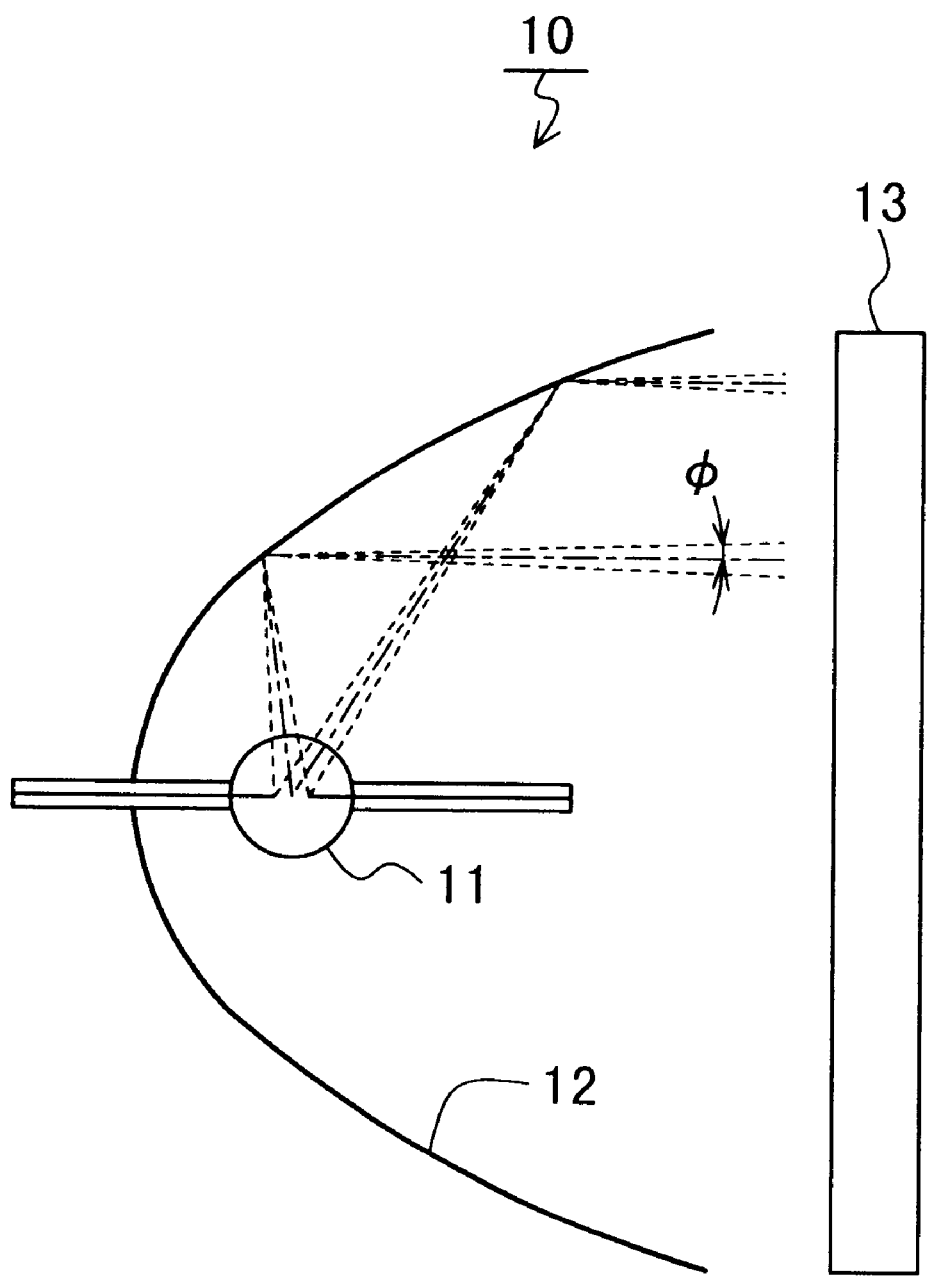
FIG. 49 is a schematic sectional view taken along the optical axis of a prior art unpolarized luminaire.

In the luminaire, a lens array 22C is employed instead of the lens array 22 in FIG. 47. The lens arrays 22C and 21 are same in number of arranged lenses and sizes of lenses as each other in planes perpendicular to the optical axis. Further, the optical axes of the lenses of the lens array 22C are respectively aligned with the optical axes of respective lenses of the lens array 22.

Since a metal halide lamp 11 employed here is not a perfect point source of light, a light beam, which is a reflected at a point on the parabolic mirror 12 after being emitted from any point shifted from the focal point of a parabolic mirror 12, proceeds not in parallel with the optical axis. That is, light beams reflected at that point diverges at a angle depending on the size of the light-emitting part. Further, a light intensity distribution at the aperture of the parabolic mirror 12 is higher in a central area and lower in surrounding area thereof.

Focal lengths of the convex lenses of the lens array 21 are equal to one another. A distance between the lens arrays 21 and 22C is equal to a focal length of the convex lenses of the lens array 21 so that a luminous flux comprising non-parallel light beams incident on the convex lenses of the lens array 21 enters into respective convex lenses of the lens array 22C efficiently.

The lens array 22C is formed by arranging convex lenses 221 and 221C, the convex lenses 221 having a focal length different from that of the convex lenses 221C, in alternate and staggered manner. The focal length of the convex lenses 221 of the lens array 22C is determined such that in combination with a condenser lens 23, images of respective lenses of the lens array 21 are formed on a plane 24 to be illuminated in an overlapping manner. Accordingly, even if a light intensity distribution at the aperture of the parabolic mirror 12 is not uniform, an illuminance distribution on the plane 24 is almost uniform as shown in FIG. 2(A) assumed that luminous light passes through only the convex lenses 221 whose group is the half of the total lenses of the lens array 22C.

Figure 2B:
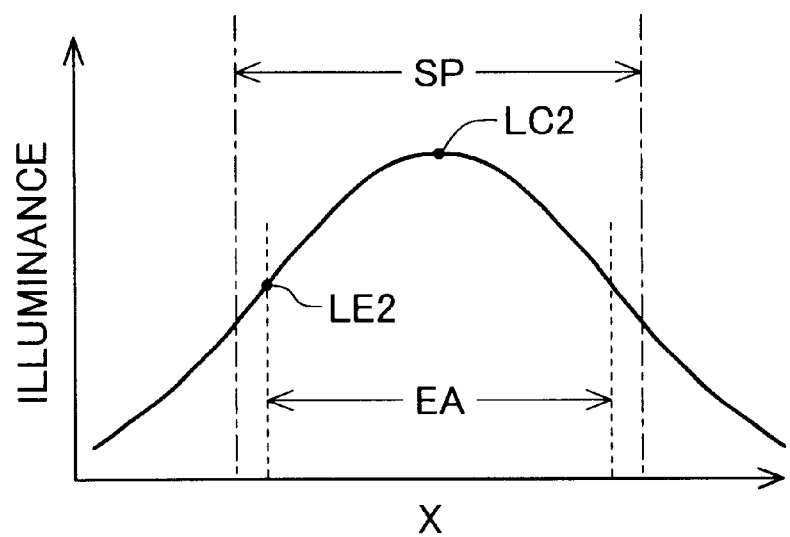
FIG. 2(B) is a graph of an illuminance distribution on the illuminated plane assumed that light passes through convex lenses 221C of the other half thereof.

On the other hand, the focal length of the convex lenses 221C is longer than that of the convex lenses 221, therefore images of the lenses 211 corresponding to the convex lenses 221C of the lens array 21 can not be formed at the plane 24 in combination of the convex lenses 221C and the condenser lens 23, resulting in that an illuminance distribution on the plane 24 has a mountain-like shape with the top in the center as shown in FIG. 2(B) assumed that luminous light passes only through the concave lenses 221C whose group is the other half of the total lenses of the lens array 22C. That is, if the focal length of the convex lenses 221C were equal to that of the convex lenses 211, an illumination distribution on the plane 24 would be almost uniform, but a curvature of the concave lenses 221C is deviated from that of the convex lenses 211 toward less than that of the convex lenses 211, an illuminance distribution on the plane 24 by the lenses 221C is also deviated from the uniform distribution, leading to a mountain-like shape with the top in the center.

Figure 2C:
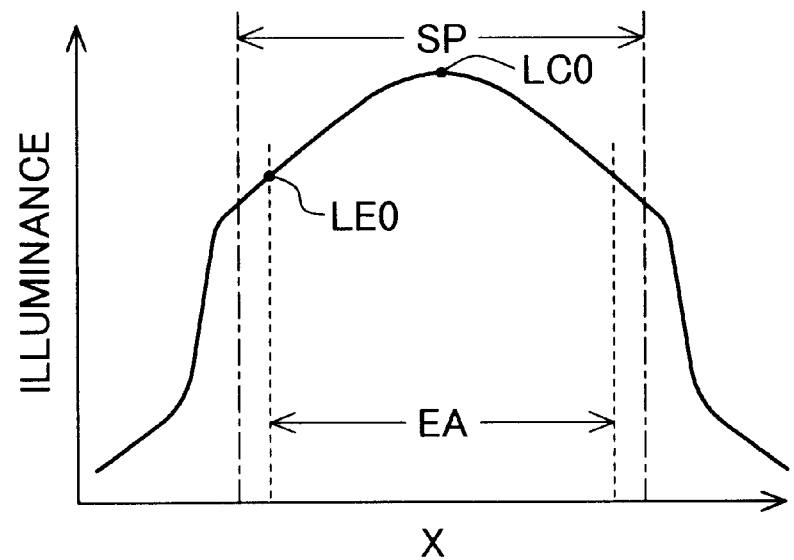
FIG. 2(C) is a graph of an illuminance distribution on the illuminated plane when light passes through all the convex lenses of the lens array 22C in FIG. 1.

An actual illuminance distribution on the plane 24 as shown in FIG. 2(C) is obtained by overlapping FIGS. 2(A) and 2(B), which changes along X axis in a smooth manner in an effective illumination area (a necessary illumination area) EA. Human eyes is not so sensitive for such a smoothly change of illuminance distribution that, if the luminaire of FIG. 1 is employed, for example, in a movie projector, and human eyes feel that the illuminated area is brighter, in a case where an illuminance in a central area is higher than that in a surrounding area thereof, than in a case of a uniform illuminance distribution, assumed that quantities of total light are same as each other.

Furthermore, since an illuminance at the edge of the effective illumination area EA is lower than that at the center point and an illuminance steeply decreases from an edge point of the effective illumination area EA toward the outside, the ratio of light quantity into the margin area MA to the total light quantity is lower than that in the case of FIG. 47 if the same margin area is ensured.

Therefore, with the luminaire of the first embodiment, light utilization efficiency can be increased with almost no deterioration in image quality.

Actual parameter example associated with the luminaire of FIG. 1 is as follows.

The metal halide lamp 11 has an arc gap of 1.5 mm and a power of 150 W;

the parabolic mirror 12 has a UV/IR cut cold mirror with a focal length of 14 mm and a diameter of 80 mm at the aperture;

the lens arrays 21 and 22C each have 6.7 mm×9 mm in size and matrix arrangement of 12 rows×8 columns, wherein the convex lenses 211 each have a focal length of 60 mm, the convex lenses 221 each have a focal length of 45 mm and convex lenses 221C each have a focal length of 100 mm;

the distance between the lens array 22C and the plane 24 to be illuminated is of 180 mm;

the condenser lens 23 has a focal length of 180 mm;

the effective illumination area EA is of 15 mm×20 mm; and in a reflecting luminous flux from a point on the parabolic mirror 12, the maximum value of divergence angle between the optical axis and a non-parallel light beam whose light intensity is higher than a half of that of a parallel light beam is 3.1 degree, and the image of the light-emitting part formed on the lens array 22C has the maximum diameter of about 6.5 mm.

The size of an illumination spot SP on the plane 24 is defined under the condition that light flux passes through only convex lenses 221 which are a half of the total lenses of the lens array 22C. This size satisfies the following relation.

(lens size of the lens array 21):(size of the illumination spot SP)= (distance between the lens arrays 21 and 22):(distance between the lens array 22C and the plane 24)     (1)

From this relation (1), the size of SP is 3=180/60 times the lens size of the lens array 21, that is, 20.1 mm×27 mm. Therefore, the margin area MA outside the effective illumination area EA in the illumination spot SP has each width of 3.5 mm in the vertical direction and each width of 2.55 mm in the horizontal direction.

Letting the light intensities at the center point and an edge point on the effective illumination area EA in FIGS. 2(A) to 2(C) be (LC1, LE1), (LC2, LE2) and (LC0, LE0), each ratio of light intensity at an edge point to that at the center point is LE1/LC1≈100%, LE2/LC2≈50% and LE0/LC0≈75%.

Further, each ratio of total light energy in the effective illumination area EA to that in the illumination spot SP is about 55%, about 60% and about 57.5% in FIGS. 2(A) to 2(C), respectively, which shows increase in light utilization efficiency by about 2.5% as compared with the case of FIG. 47.

Second Embodiment

FIG. 3 shows a schematic sectional view taken along the optical axis of a luminaire of the second embodiment according to the present invention.

The luminaire is same as that in FIG. 1 with the exception that a lens array 22D is employed instead of the lens array 22C in FIG. 1. The lens array 22D is formed by arranging lenses same as the convex lenses 221 in FIG. 1 and flat plate portions 221D with a focal length of ∞ in alternate and staggered manner.

Figure 4A:
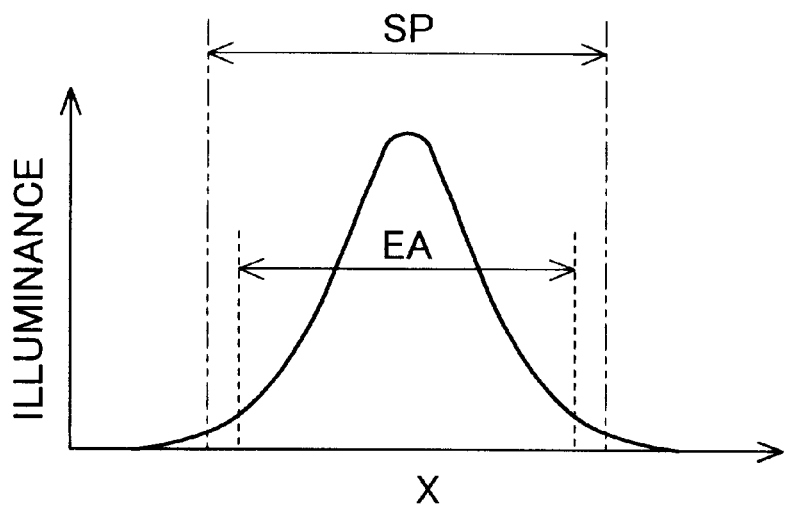
FIG. 4(A) is a graph of an illuminance distribution on an illuminated plane assumed that light passes through convex lenses 221D of a half of the total lenses of the lens array 22D in FIG. 3.
Figure 4B:
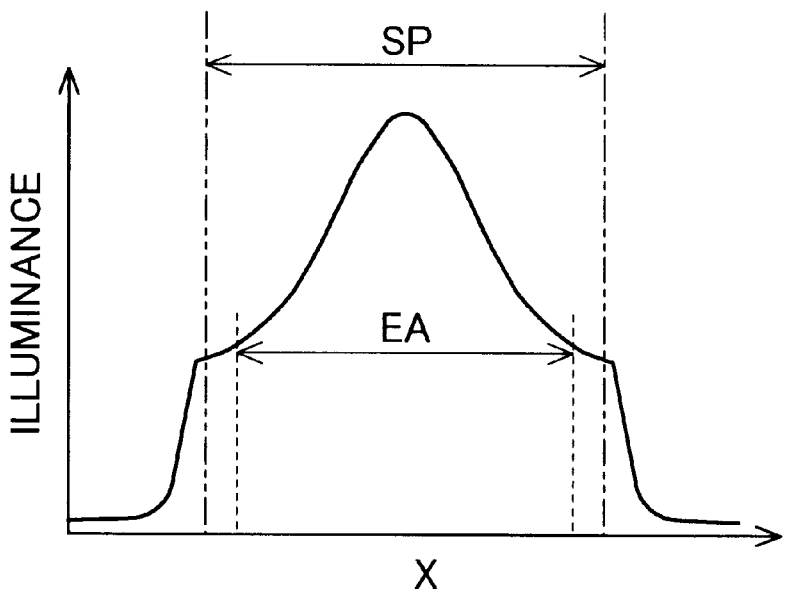
FIG. 4(B) is a graph of an illuminance distribution on the illuminated plane when light passes through all the convex lenses 221and 221D of the lens array 22D in FIG. 3.

FIGS. 4(A) and 4(B) are graphs showing illuminance distributions corresponding to FIGS. 2(B) and 2(C), respectively. The illuminance distribution in FIG. 4(A) has a mountain-like shape sharper than that in the case of FIG. 2(B).

Since an illumination distribution on the plane 24 has a shape as shown in the FIG. 4(B) which is obtained by overlapping FIGS. 2(A) and 4(A), in which an illuminance rather smoothly changes within the effective illumination area EA and is higher in a central area than in a surrounding area thereof and abruptly decreases from the edge of the effective illumination area EA toward the outside, therefore light utilization efficiency can be increased with almost no deterioration in image quality if the same margin area as that in the case of FIG. 47 is ensured.

In a case where dimensional parameters are same as those in the case of FIG. 1 except for the flat plate portions 221D, each ratio of illuminance of an edge point to the center point in FIG. 4(A) and 4(B) is LE2/LC2≈10%, and

LE0/LC0≈55%.

Further, a ratio of total light energy in the effective illumination area to that in the illumination spot SP is 67.5% in the case of FIG. 4(B), and light utilization efficiency is increased by about 12.5% as compared with that in the case of FIG. 47.

Third Embodiment

FIG. 5 shows a schematic sectional view taken along the optical axis of a luminaire of the third embodiment according to the present invention.

The luminaire is same as that in FIG. 1 with the exception that a lens array 22E is employed instead of the lens array 22C in FIG. 1. The lens array 22E is formed by arranging lenses same as the convex lenses 221 in FIG. 1 and concave lenses 221E in alternate and staggered manner.

Figure 6A:
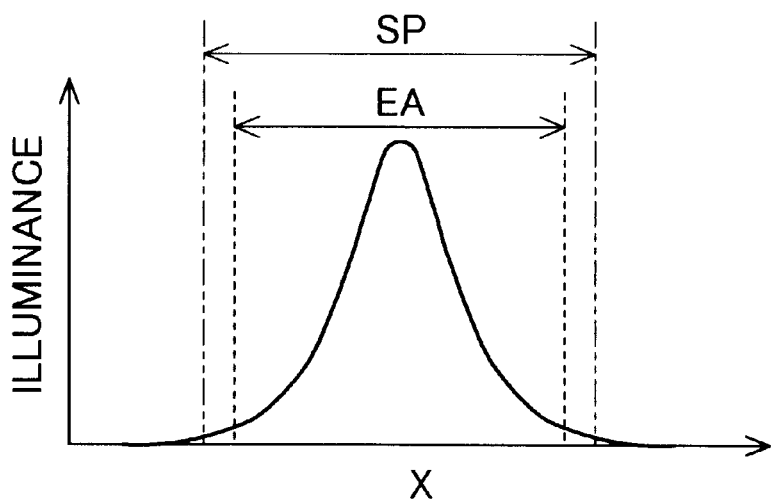
FIG. 6(A) is a graph of an illuminance distribution on an illuminated plane assumed that light passes through convex lenses 221E of a half of the total lenses of a lens array 22E in FIG. 5.
Figure 6B:
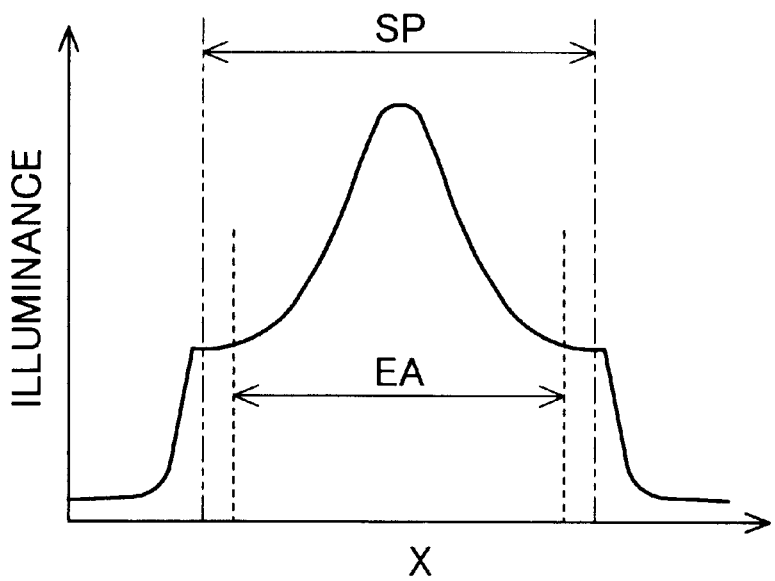
FIG. 6(B) is a graph of an illuminance distribution on the illuminated plane when light passes through all the convex lenses 221 and 221E of the lens array 22E in FIG. 5.

FIGS. 6(A) and 6(B) are graphs showing illuminance distributions corresponding to FIGS. 2(B) and 2(C), respectively. The illuminance distribution in FIG. 6(A) has a mountain-like shape sharper than that in the case of FIG. 2(B).

Since an illuminance distribution on the plane 24 has a shape as shown in the FIG. 6(B) which is obtained by overlapping FIGS. 2(A) and 6(A), in which an illuminance rather smoothly changes within the effective illumination area EA, and is higher in a central area than in a surrounding area thereof and abruptly decreases from an edge point of the effective illumination area EA toward the outside, therefore light utilization efficiency can be increased with almost no deterioration in image quality if the same margin area as that in the case of FIG. 47 is ensured.

In a case where parameters are same as those in the case of FIG. 1 except for a focal length of the concave lenses 221E of −60 mm, each ratio of illuminance at an edge point to that at the center point in FIGS. 6(A) and 6(B) is LE2/LC2≈5%, and

LE0/LC0≈52.5%.

Further, ratio of total light energy in the effective illumination area to that in the illumination spot SP is 72.5% in the case of FIG. 6(B), and light utilization efficiency is increased by about 17.5% as compared with that in the case of FIG. 47.

Fourth Embodiment

Figure 7:
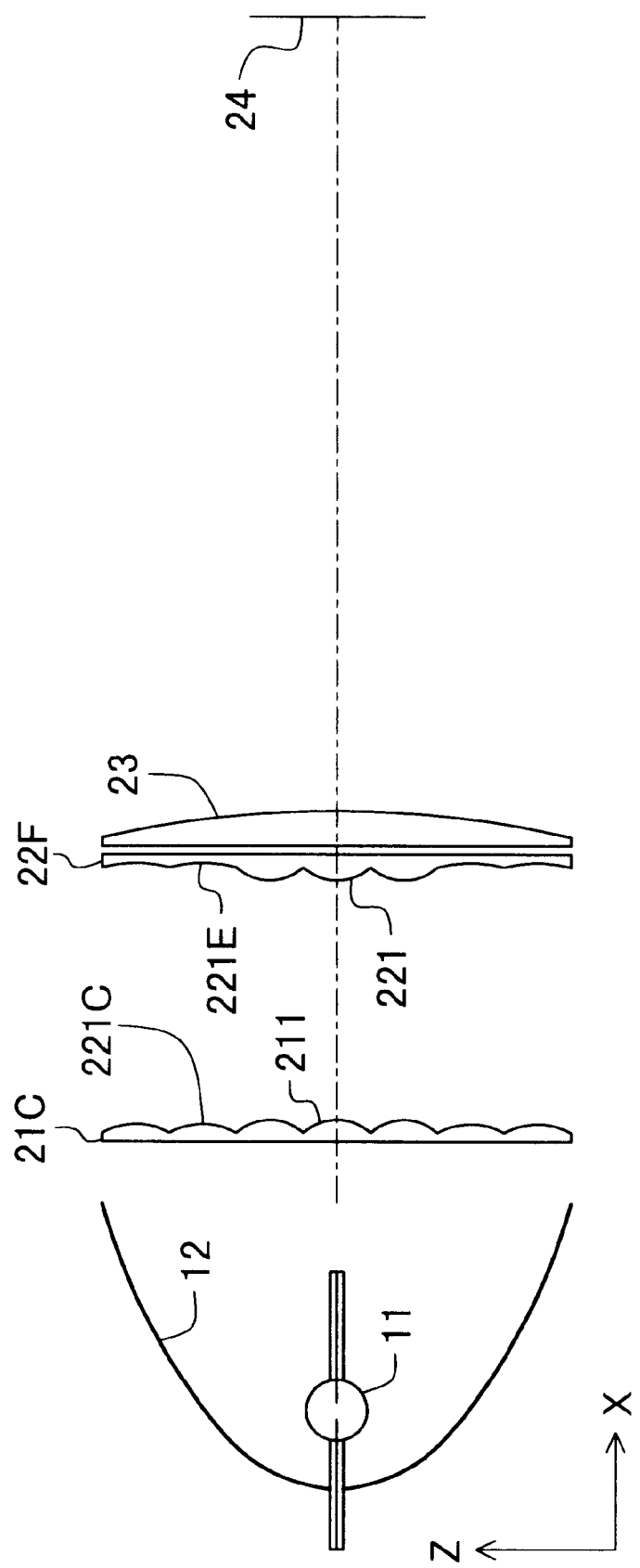
FIG. 7 is a schematic sectional view taken along the optical axis of a luminaire of the fourth embodiment according to the present invention.

FIG. 7 shows a schematic sectional view taken along the optical axis of a luminaire of the fourth embodiment according to the present invention.

The luminaire is same as that in FIG. 1 with the exception that lens arrays 21C and 22F are employed instead of the lens arrays 21 and 22C in FIG. 1.

A lens array 21C has the same lenses as the convex lenses 211 in FIG. 1 formed only in a central area, and has convex lenses 211C whose focal length FL is larger than that of the convex lenses 221, formed in a surrounding area of the central area. A lens array 22F has the same lenses as the convex lenses 221 in FIG. 1 formed in the central area in a corresponding manner to the convex lenses 211 of the lens array 21C, and has concave lenses 221E with a focal length −FL formed in the surrounding area thereof.

Therefore, images of the convex lenses 211 in the central area of the lens array 21C are formed on the plane 24 in an overlapping manner by a combination of the lenses 221 and the condenser lens 23, and such illuminance distribution as shown in FIG. 2(A) is obtained. On the other hand, light beams incident on the convex lenses 211C in a peripheral area of the lens array 21C are converged and thereafter passes through respective concave lenses 221E in a peripheral area of the lens array 22F to be recovered as light beams with almost the same beam angular distribution as that prior to entering the convex lenses 211C. An illuminance distribution on an plane 24 by these light beams becomes, as shown in FIG. 8(A), a similar shape to an illuminance distribution at the aperture of the parabolic mirror 12, and a ratio of an illuminance in the peripheral A area to that in the central area is smaller than that in the case of FIG. 6(A).

Figure 8A:
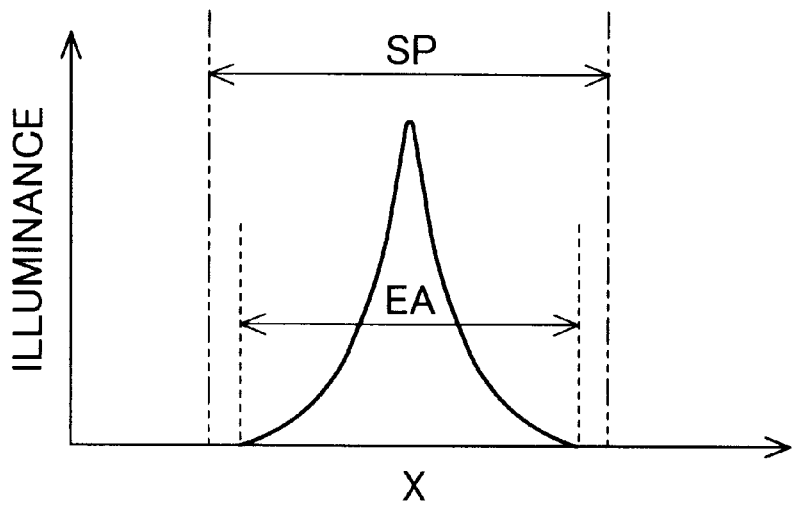
FIG. 8(A) is a graph of an illuminance distribution on an illuminated plane assumed that light passes through concave lenses 221E of a half of the total lenses of a lens array 22F in FIG. 7.
Figure 8B:
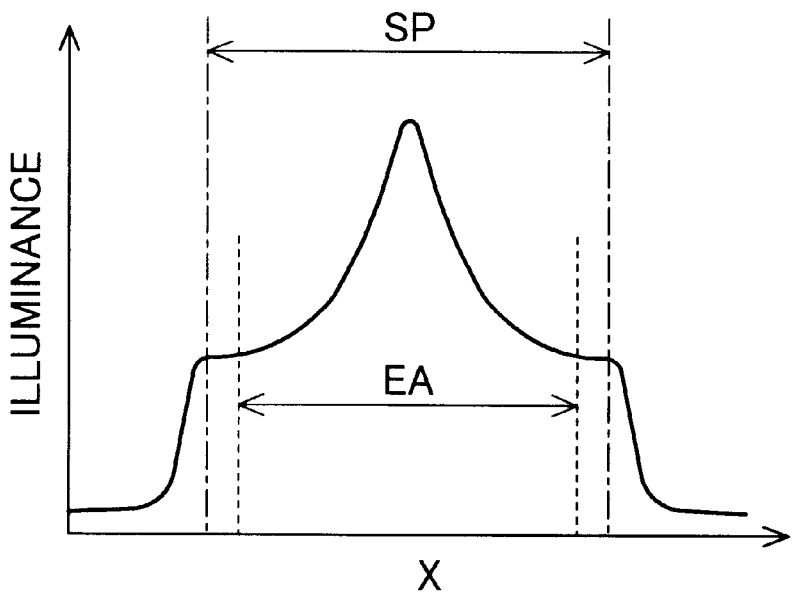
FIG. 8(B) is a graph of an illuminance distribution on the illuminated plane when light passes through all the convex lenses 221 and 221E of the lens array 22E in FIG. 7.

Since an actual illumination distribution on the plane 24 has a shape in which an illuminance rather smoothly changes within the effective illumination area EA as shown in the FIG. 8(B), which is obtained by overlapping FIGS. 2(A) and 8(A) and is higher in the central area than in a peripheral area and abruptly decreases from the edge of the effective illumination area EA toward the outside, therefore light utilization efficiency can be increased with almost no deterioration in image quality if the same margin area as that in the case of FIG. 47 is ensured.

In a case where the same parameters are employed with the exception that focal lengths of the convex lenses 211C and the concave lenses 221E are respectively of 120 mm and −120 mm and in the lens array of 12 rows×8 columns, the central area has an arrangement of 8 rows×4 columns, each ratio of illuminance at the edge to that at the center in FIGS. 8(A) and 8(B) is LE2/LC2≈5%, and

LE0/LC0≈52.5%.

Further, a ratio of total light energy in the effective illumination area to that in the illumination spot SP is 77.5% in the case of FIG. 8(B), and light utilization efficiency is increased by about 22.5% as compared with that in the case of FIG. 47.

It should be noted that, in the first to fourth embodiments, even if a way of arrangement of a first kind of lenses with a first focal length and a second kind of lenses with a second focal length different from the first focal length is changed, and/or a ratio of number of the first kind of lenses to the second kind of lenses is changed, the same effects as those prior to the changes can be ensured. For example, in the first to third embodiments, the two kinds of lenses with different focal lengths may be arranged in each of the lens arrays 22C to 22E such that one kind of lenses are collectively arranged in the central area and the other kind of lenses are collectively arranged in the surrounding area thereof as in the lens arrangement of the fourth embodiment. Further, in the fourth embodiment, two kinds of lenses with different focal lengths in the lens array 22F may be arranged in alternate and staggered manner as in the lens arrangement of the first to third embodiments.

Fifth Embodiment

Figure 9:
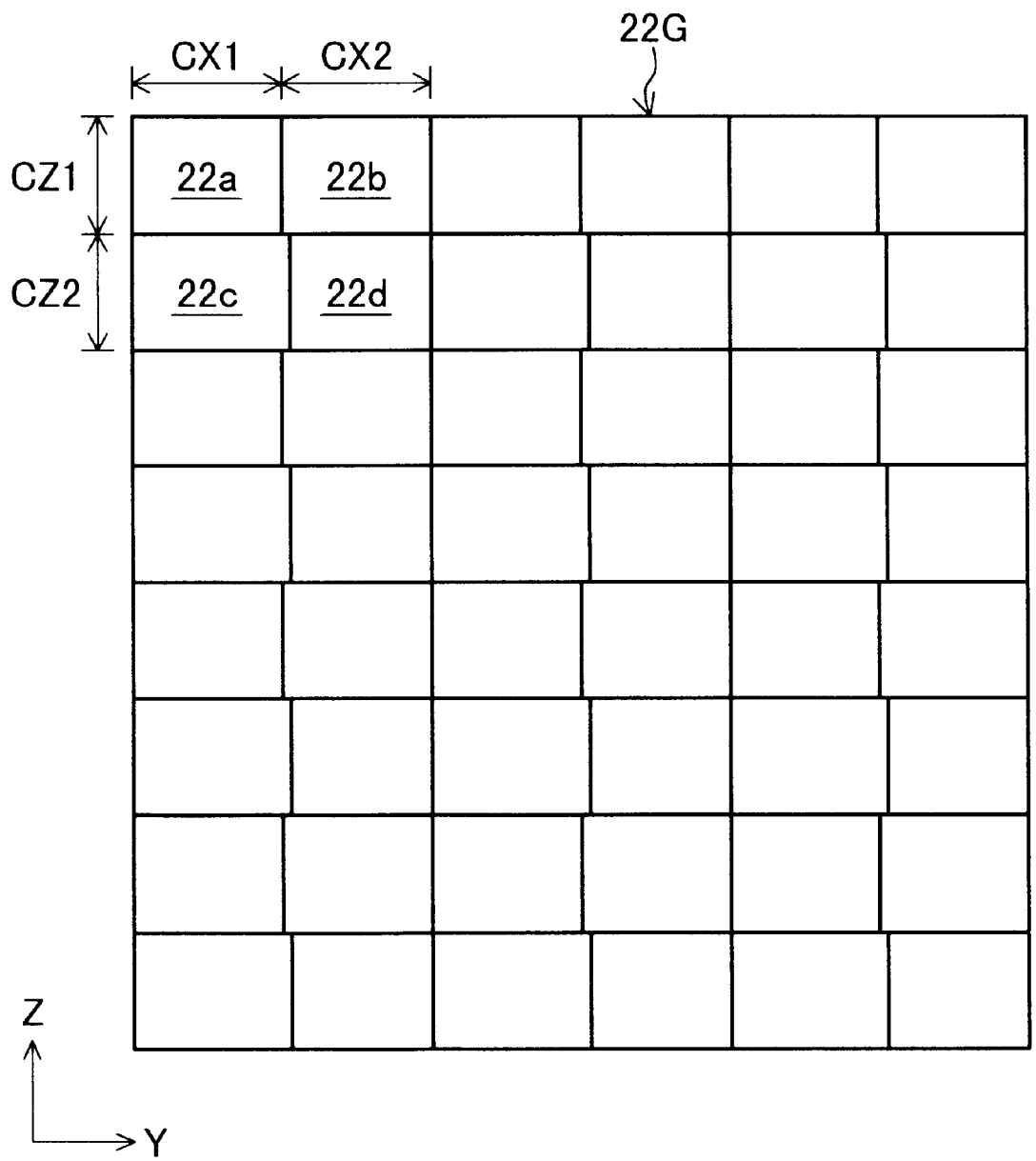
FIG. 9 is an illustration of lens arrangement of a lens array according to the fifth embodiment according to the present invention, the arrangement being employed instead of the lens array 22C in FIG. 1.

FIG. 9 shows an lens arrangement of a lens array 22G employed instead of the lens array 22C in FIG. 1 as the fifth embodiment according to the present invention.

The lens array 22G has square clusters of 4 rows×3 columns, each cluster has convex lenses 22a to 22d in 2 rows×2 columns, and the convex lenses 22a to 22d are a little different in size from one another. For example, convex lenses 22a and 22b each have a length in Z direction of CZ1=6.5 mm, convex lenses 22c and 22d each have a length in Z direction of CZ2=7 mm, convex lenses 22a and 22d each have a length in X direction of CX1=8 mm, and convex lenses 22b and 22c each have a length in X direction of CX2=8.5 mm. A size of this cluster is same as that of a lens array having 2 rows×2 columns in the lens array 21. That is, the size of each lens of the lens array 21 is (CZ1+CZ2)/2=6.75 mm in Z direction and (CX1+CX2)/2=8.25 mm in X direction.

Figure 10A:
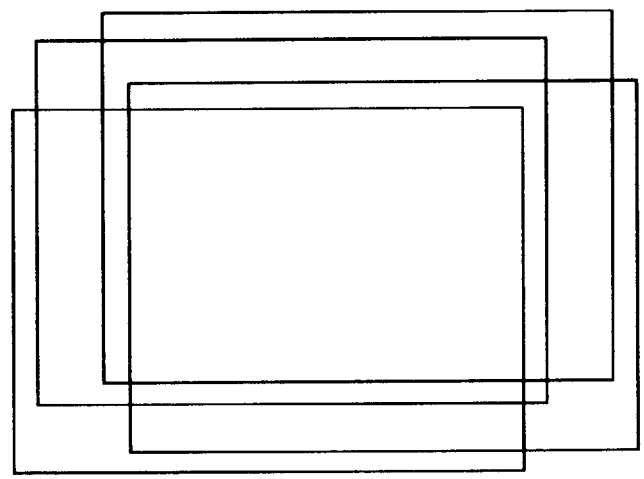
FIG. 10(A) is a plan view showing illumination spots on an illuminated plane assumed that light passes through the respective convex lens groups each having lenses 22a, 22b, 22c or 22d in FIG. 9.

Therefore, the center points of the convex lens 22a to 22d are respectively deviated from the center points of respective lenses of the lens array 21. Hence, images of lenses of the lens array 21 formed on the plane 24 by the respective convex lenses 22a to 22d are deviated slightly from one another as shown in FIG. 10(A).

Figure 10B:
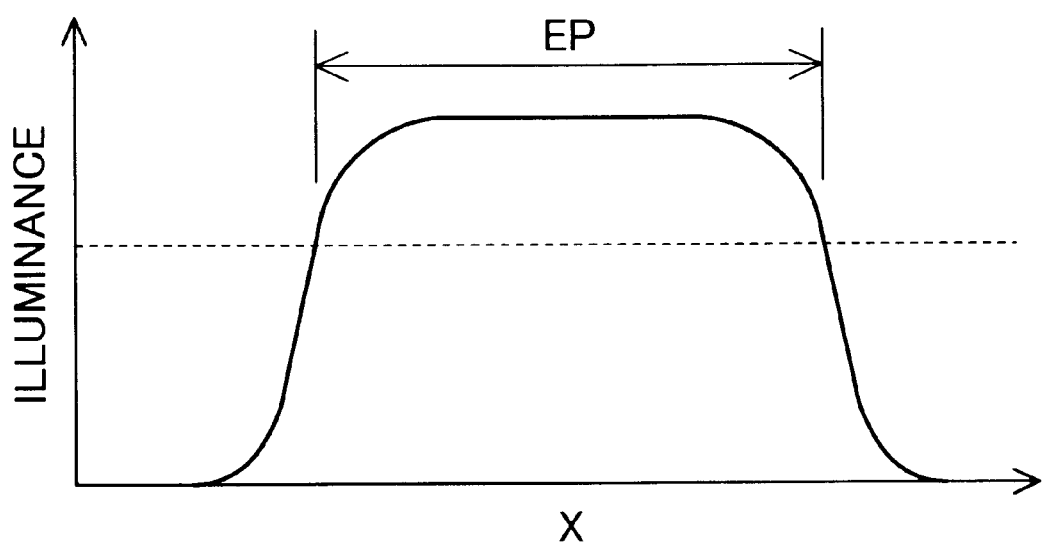
FIG. 10(B) is a graph of an illuminance distribution on the illuminated plane when the lens array 22G of FIG. 9 is employed for a luminaire.

As a result, as shown in FIG. 10(B), an illuminance distribution on the plane 24 is uniform in the central area when a luminaire equipped with the lens array 22G is used, but is more gently-sloped in the peripheral area than in the case where the lens array 22 in FIG. 47 is employed, therefore light utilization efficiency can be increased with almost no deterioration in image quality if the same margin area as that in the case of FIG. 47 is ensured.

It should be noted that the number of lenses in a cluster is arbitrary and the lens array 22G may have only one cluster.

Sixth Embodiment

Figure 11:
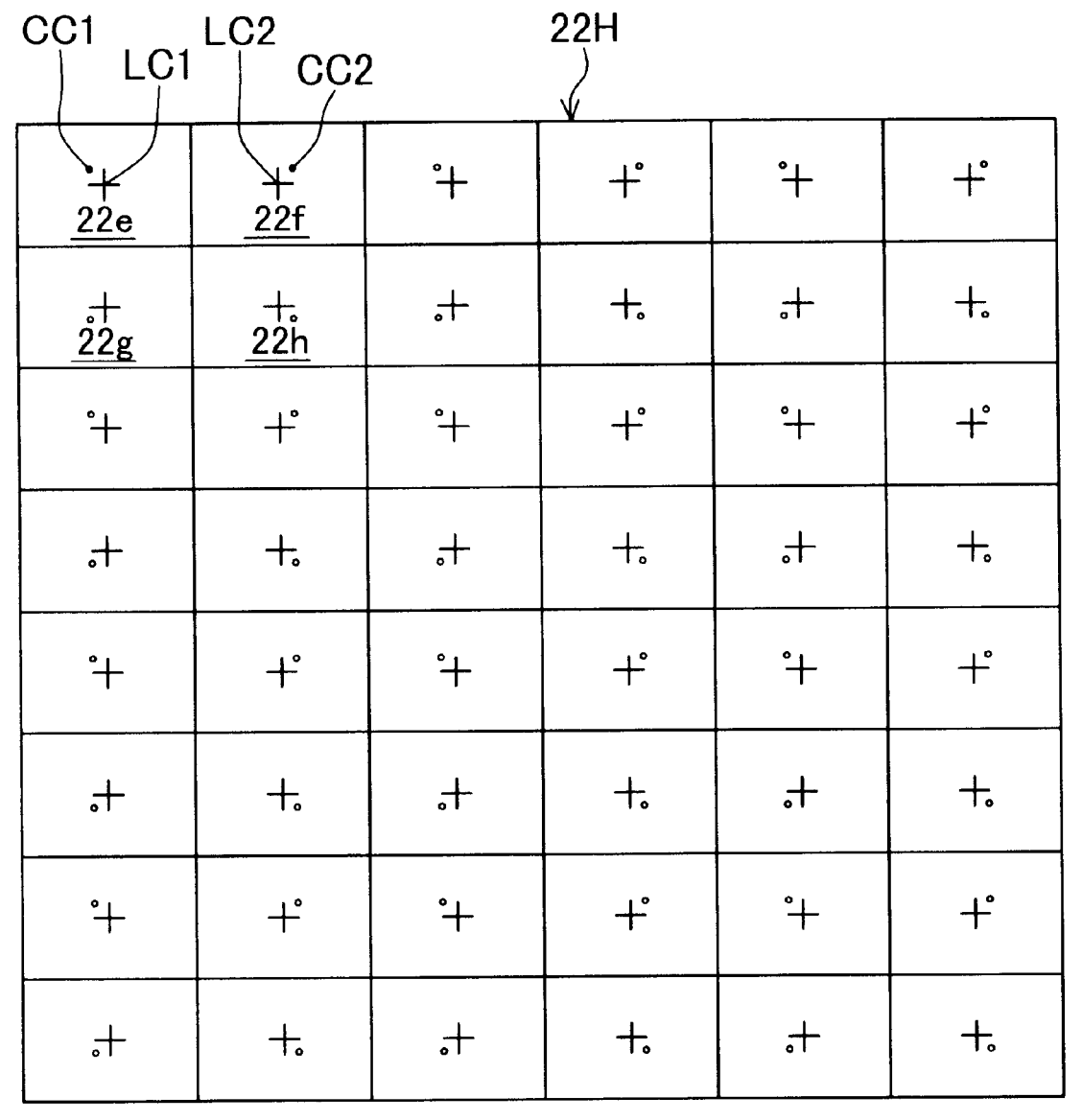

FIG. 11 shows the lens arrangement of a lens array 22H that is employed instead of the lens array 22C in FIG. 1, as a six embodiment according to the present invention.

Figure 12:
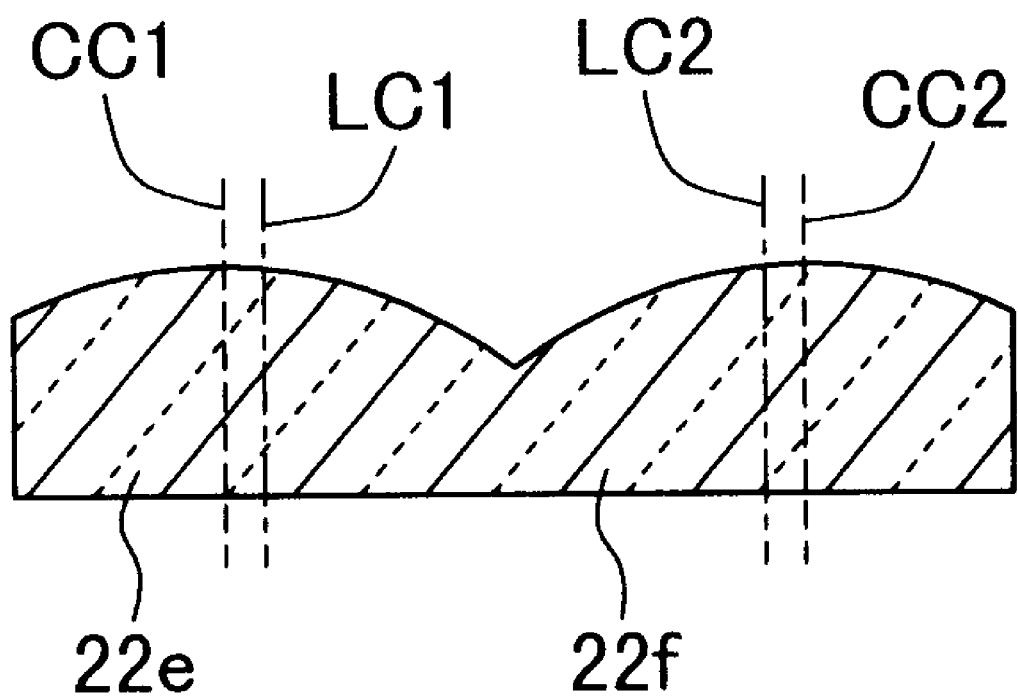
FIG. 12 is an enlarged cross-sectional view of lenses 22e and 22f in FIG. 11.

Sizes of lenses of the lens array 22H are equal not only to one another but also to sizes of respective lenses of a lens array 21 disposed at an opposite position. In decentered convex lenses 22e to 22f of 2 rows×2 columns, each top position on its convex indicated by a circle mark is off its geometric center indicated by a cross mark and, and the off positions are different to each other. FIG. 12 shows sections of the decentered lenses 22e and 22f, wherein in the lens 22e, the optical axis CC1 corresponding to the circle mark in FIG. 11 is shifted to the left from the central axis LC1 corresponding to the cross mark in FIG. 11, and in the lens 22f, the optical axis CC2 is shifted to the right from the central axis LC2.

Referring back to FIG. 11, the lens array 22H has clusters of 4 rows×3 columns, and each thereof has the decentered convex lenses 22e to 22h of 2 rows×2 columns. When this lens array 22H is employed in a luminaire, a similar illuminance distribution to FIG. 10(B) is obtained and light utilization efficiency is increased.

It should be noted that the number of lenses in a cluster is arbitrary and the lens array 22H may be one cluster.

Seventh Embodiment

Figure 13:
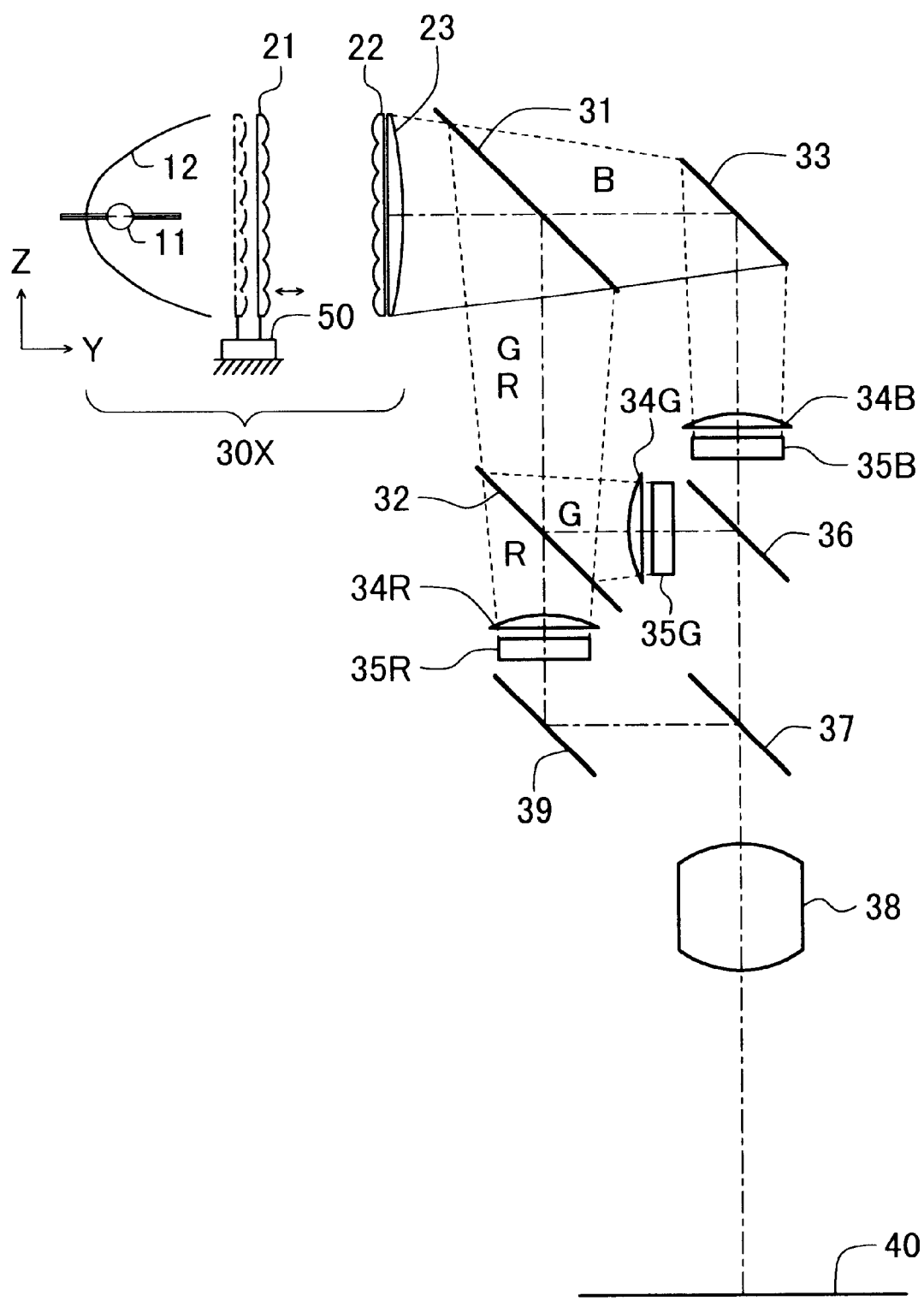
FIG. 13 is a schematic cross-sectional view taken along the optical axis of a liquid crystal projection device of the seventh embodiment according to the present invention.

FIG. 13 shows a schematic cross-sectional view taken along the optical axis of a liquid crystal projection device of the seventh embodiment according to the present invention.

A film of UV/IR cut filter is formed on a flat surface of the lens array 21. This filter is an interference filter that reflects UV and IR and make visible light pass. Since this filter is formed on the flat surface of the lens array 21, visible light can be increased by 2 to 10% as compared with the case where a separate UV/IR cut filter plate is employed.

A dichroic mirror 31 makes a blue light component B of a incident luminous flux pass through and reflects the green light component G and red light component R of the luminous flux emitted from the luminaire 30X comprising the metal halide lamp 11, the parabolic mirror 12, the lens arrays 21 and 22 and the condenser lens 23. The reflected light is divided by a dichroic mirror 32 into the transmitting red light R and the reflected green light. The blue light component B having passed through the dichroic mirror 31 is reflected by a total reflecting mirror 33 and enters through a field lens 34B into a liquid crystal light valve 35B. The reflected green light component G enters through a field lens 34B into a liquid crystal light valve 35G. The red light component R having passed through the dichroic mirror 32 enters through a field lens 34R into a liquid crystal light valve 35R.

Each of the liquid crystal light valves 35B, 35G and 35R comprises a liquid crystal panel and polarizing plates disposed on both sides thereof and having transmission directions of electric field vector which are at right angle to each other, and a transmittance of each pixel of a light valve changes in response to an video signal fed to the liquid crystal panel. A position of each of the liquid crystal panels corresponds to that of the plane 24 to be illuminated in FIG. 47.

Outgoing light from the liquid crystal light valve 35B enters into a projection lens 38 after passing through dichroic mirrors 36 and 37. Outgoing light from the liquid crystal light valve 35G is reflected by the dichroic mirror 36 and enters into the projection lens 38 through a dichroic mirror 37. Outgoing light from the liquid crystal light valve 35R is reflected by a total reflecting mirror 39, further reflected by the dichroic mirror 37 and enters into the projection lens 38. With such an optical system, an enlarged image is obtained on a screen 40.

The field lenses 34B, 34G and 34R are ones for improving a brightness of a projected image by bending directions of light beams in the peripheral region of a luminous flux toward the optical axis so as to make the beams enter into the projection lens 38.

In regard to lens arrays 21 and 22 each, there is dispersion in lens pitch due to manufacturing. Actual measurements showed a lens pitch dispersion of the maximum of ±0.2 mm in each of directions along adjacent sides of a lens. This dispersion causes a illuminance distribution in the peripheral area to be gentle for the same reason as that in the case of FIG. 9. However, since a degree of the gentleness is lower than in the case where the lens array 22G in FIG. 9 is employed, a margin area is necessary to be narrowed in order to increase light utilization efficiency to a sufficient level.

Hence, a size of an illumination spot SP is changed by a optical-axial position adjusting device 50 that can adjust a position of the lens array 21 in the optical axial direction, thereby decreasing the margin area.

Figure 14:
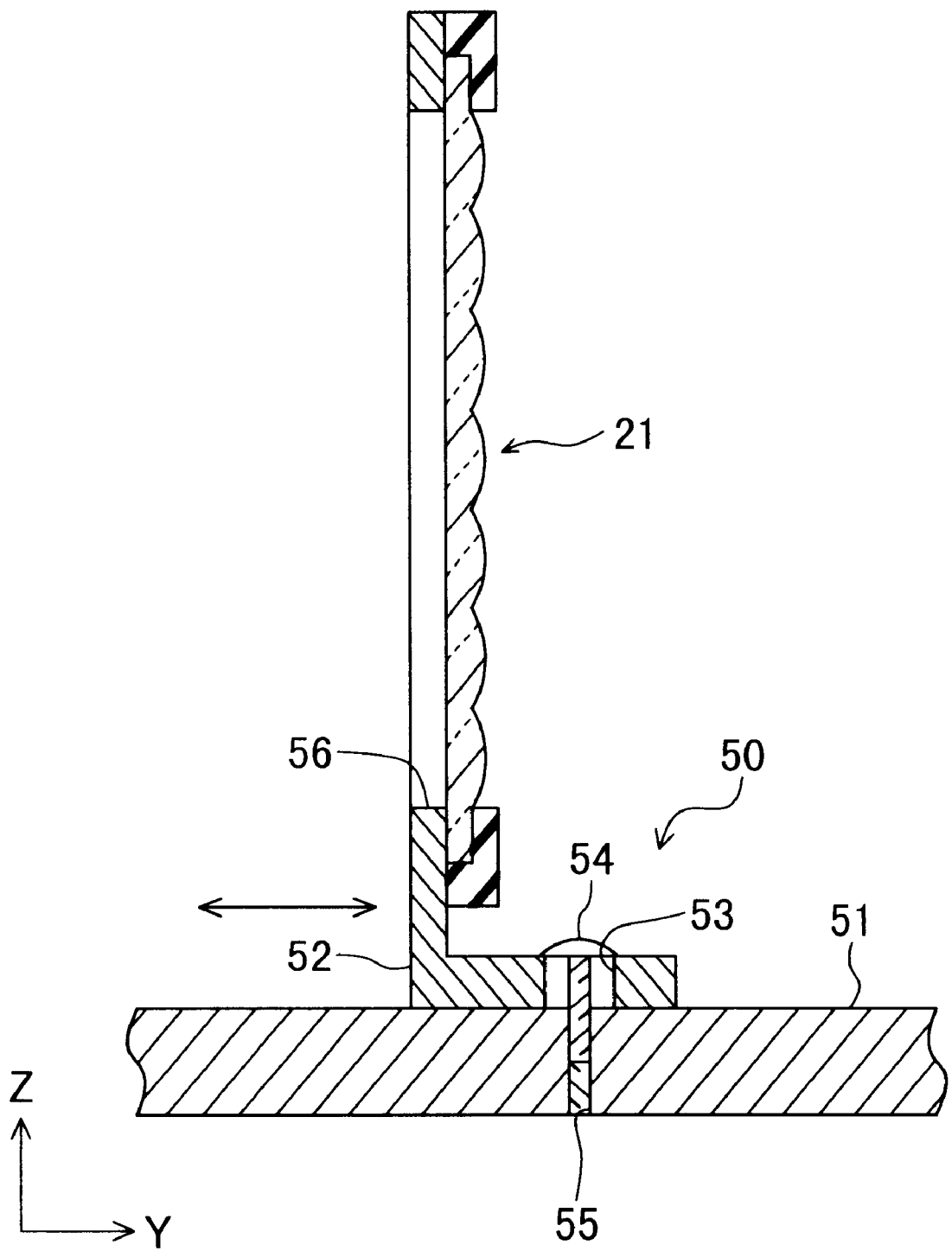
FIG. 14 is a schematic longitudinal sectional view showing an embodiment of an optical-axial position adjusting device of a lens array in FIG. 13.

FIG. 14 is a schematic longitudinal sectional view showing an embodiment of an optical-axial position adjusting device 50 for the lens array 21. The part 50 is mounted on a base plate 51. The part 50 comprises a lens array support frame 52 in the shape of character L, and a screw 54 is inserted in a long hole 53 having longitudinal direction Y and mated with a female thread 55 formed in the base plate 51. The edge portion of the lens array 21 is fixed along the edge portion of an opening 56.

The following is a description of parameters in position adjustment associated with the optical-axial position adjusting device 50.

Parameters of a luminaire are same as those in the description of the first embodiment except for the focal length of all the lenses of the lens array 22 being 45 mm. Note that the effective illumination area EA is of each liquid crystal panel of the liquid crystal light valves 35B, 35G and 35R.

Illumination spots on the liquid crystal panels for R, B and G were displaced by the following distances.

As to R, 1.0 mm in Z direction and −0.5 mm in X direction;
as to G, 0.5 mm in Z direction and −1.5 mm in X direction; and
as to B, −0.5 mm in Z direction and 0.5 mm in X direction.

For these displacements, if there is an illumination spot with a size of ((a width of an effective area in Z direction on a liquid crystal panel)+1.5 mm)×(a width of an effective area in X direction on a liquid crystal panel) +2 mm)=16.5 mm×22.0 mm, a faultless display can be performed. There is a redundancy in the illumination spot SP since the spot has a size of 20.1 mm×27 mm.

Hence, in light of the equation (1), a distance between the lens arrays 21 and 22 was adjusted to 70 mm from an original 60 mm by means of the optical-axial position adjusting device 50 and thereby, an illumination spot size was demagnified from 180/60=3 times a lens size of the lens array 21 to 180/70=2.75 times the size to reduce the illumination spot SP to 17 mm×23 mm in size with the result of improvement of light utilization efficiency (illuminance). Light loss in the margin area MA was reduced from 45% to 23% and thus the loss was able to be decreased to a half of that prior to the adjustment. Although the peripheral area of the illumination spot was blurry a little since image forming conditions are deviated by this adjustment, no problem arose on quality of a projected image.

Eighth Embodiment

In FIG. 13, when the optical axes of the lens arrays 21 and 22 coincide with the optical axis of the liquid panels, the margin area of each plane to be illuminated can be minimized. However, since actually there are manufacture error in dimension and mounting error associated with constituents, an adjustment mechanism for the constituents is required in order to achieve the alignment. Parts to be adjusted are preferred to be as small as possible in number in terms of working.

Figure 15:
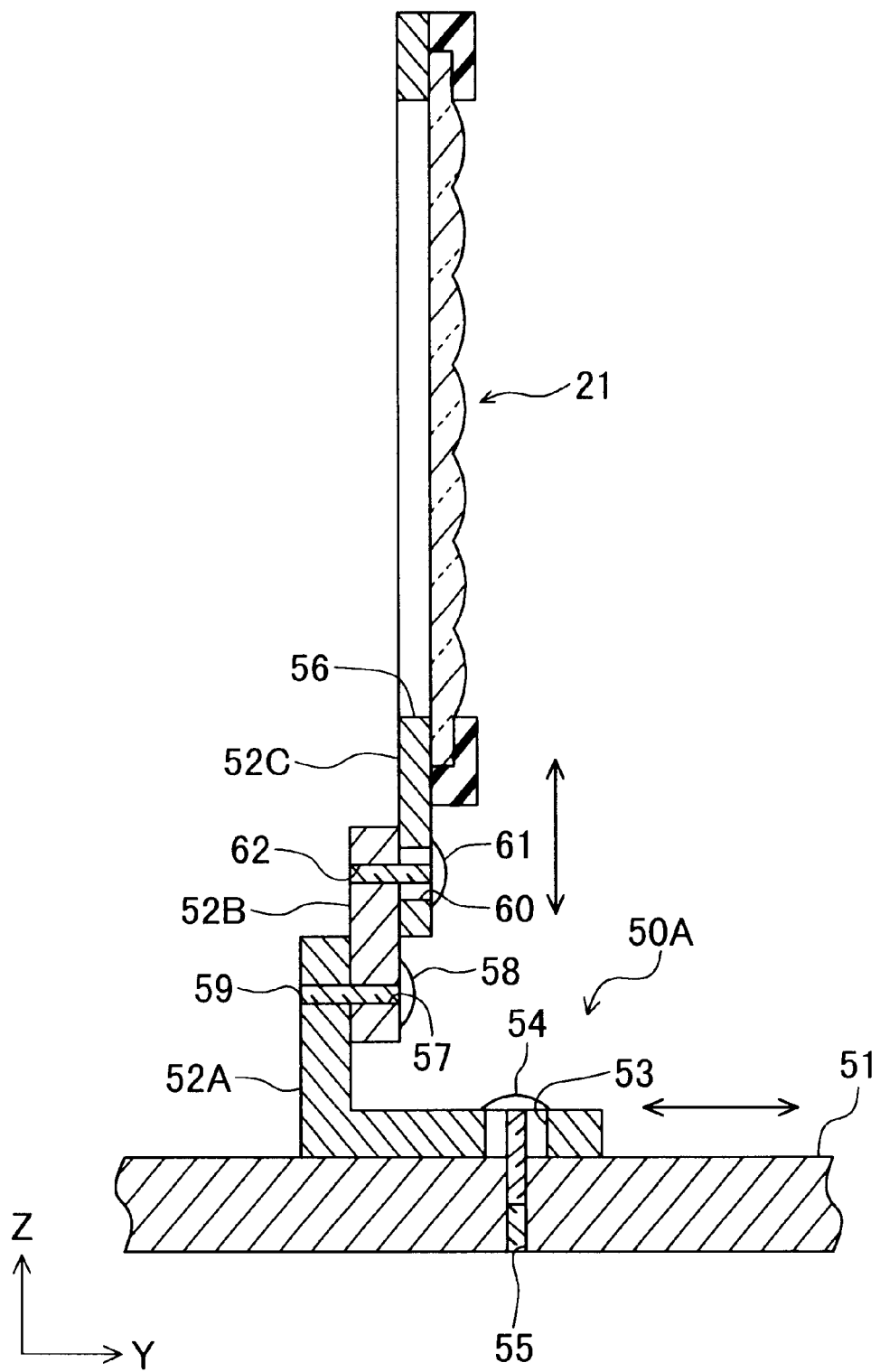
FIG. 15 is a schematic longitudinal sectional view showing a position adjusting device of a lens array of the eighth embodiment according to the present invention.

Hence, in the eighth embodiment, as shown in FIG. 15, a three axial position adjusting device 50A is provided for the lens array 21, and the lens array 21 is made to be adjustable not only position along the optical axis but also position on a plane perpendicular to the optical axis so that deviation of the center of an illumination spot SP from the center of a liquid crystal panel is corrected and thereby, light utilization efficiency is improved as compared with the case of FIG. 13.

The three axial position adjusting device 50A is mounted on the base plate 51. The three axial position adjusting device 50A comprises a L-shaped member 52A, and the screw 54 is inserted in a long hole 53 having longitudinal direction Y and mated with the female thread 55 formed in the base plate 51. A screw 58 is inserted in a long hole 57 formed in a plate 52B, the long hole 57 having longitudinal direction perpendicular to the drawing paper, and the screw 58 is mated with a female thread 59 formed in the L-shaped member 52A. Likewise, a screw 61 is inserted in a long hole 60 formed in a lens array support frame 52C, the long hole 60 having longitudinal direction Z, and the screw 61 is mated with a female thread 62 formed in a plate 52B. The edge portion of the lens array 21 is fixed along the edge portion of an opening 56 formed in the lens array support frame 52C.

With such a configuration, a position of the L-shaped member 52A in Y direction relative to the base plate 51 can be adjusted, a position of the plate 52B in X direction relative the L-shaped member 52A can be adjusted and a position of the lens array support frame 52C in Z direction relative to the plate 52B can be adjusted.

In the parameters of the eighth embodiment, a position of the lens array 21 in a plane perpendicular to the optical axis was adjusted with fixing a distance between the lens arrays 21 and 22 to 75 mm, and as a result, an illumination spot SP was reduced to a size of 16 mm×21 mm. Since the peripheral area of the illumination spot was out of focus a little by deviation of image forming conditions caused by this adjustment, the adjustment was performed so that a size of the illumination spot was larger a little than the minimum necessary size thereof. With such adjustment, light loss in the margin area MA was reduced to 11%, and thus the loss was able to be decreased to a half of that of the eighth embodiment.

Ninth Embodiment

Figure 16:
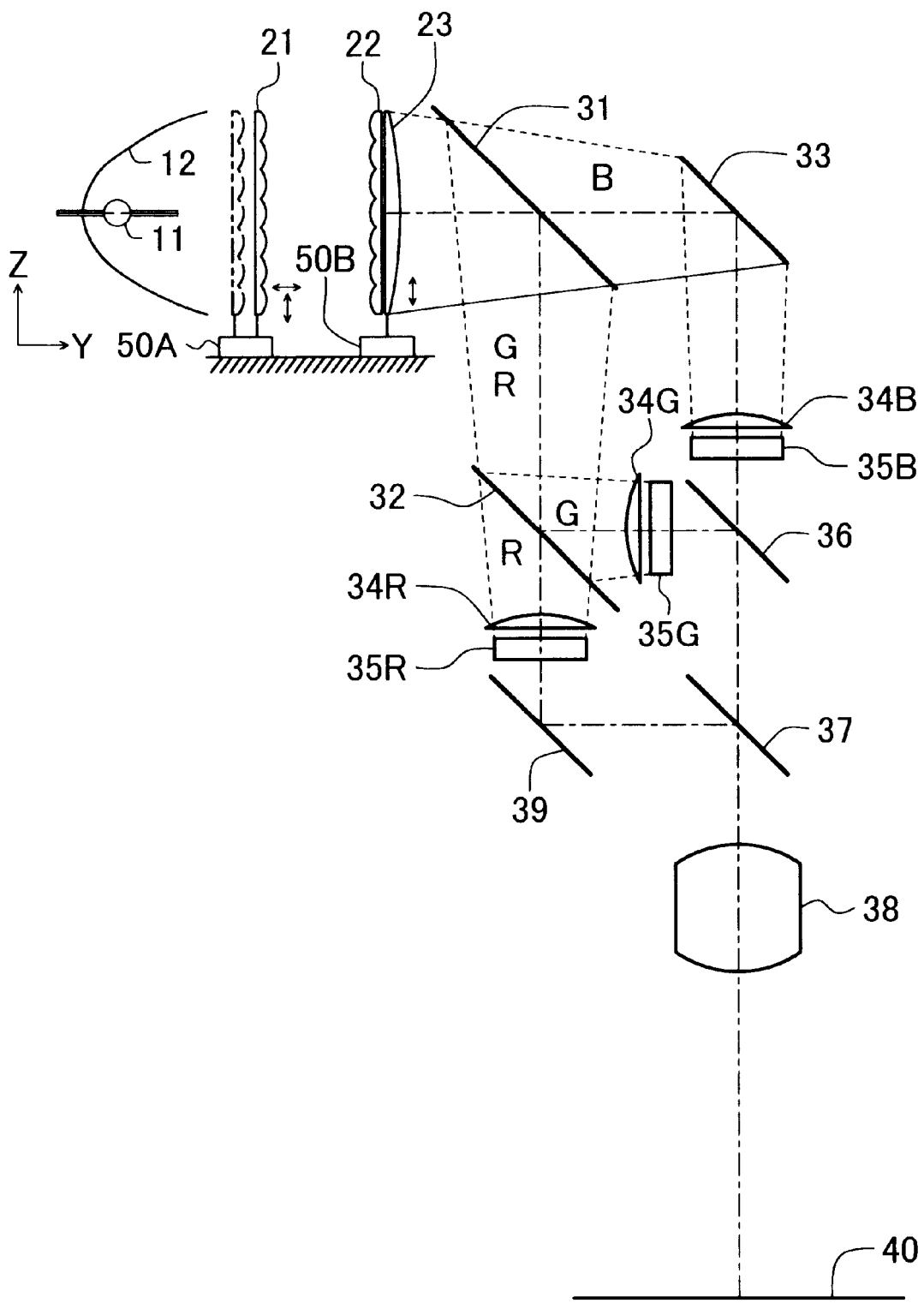
FIG. 16 is a schematic cross-sectional view taken along the optical axis of a liquid crystal projection device of the ninth embodiment according to the present invention.

FIG. 16 shows a schematic cross-sectional view taken along the optical axis of a liquid crystal projection device of the ninth embodiment according to the present invention.

For example, when the optical axis of a parabolic mirror 12 is inclined from a proper direction owing to poorly mounting the parabolic mirror 12, an illumination spot on a liquid crystal panel is displaced to a great extent. If a position of the lens array 21 is adjusted in a plane perpendicular to the drawing paper so as to correct the displacement with the three axial position adjusting device 50A, an amount of adjustment is excessively large, leading to a problem since part of outgoing light from the lens array 21 cannot enter the lens array 22.

Therefore, in order to prevent such a problem from occurring, the liquid crystal projection device comprises the configuration of the eighth embodiment and further an position adjusting device 50B that can adjust a mounting position of a condenser lens 23 in a plane perpendicular to the drawing paper. The in-plane position adjusting device 50B is, for example, of a structure in which screws and long holes are used similar to the three axial position adjusting device 50A.

With such an adjustment mechanism, the above-described problem has been solved.

Tenth Embodiment

Figure 17:
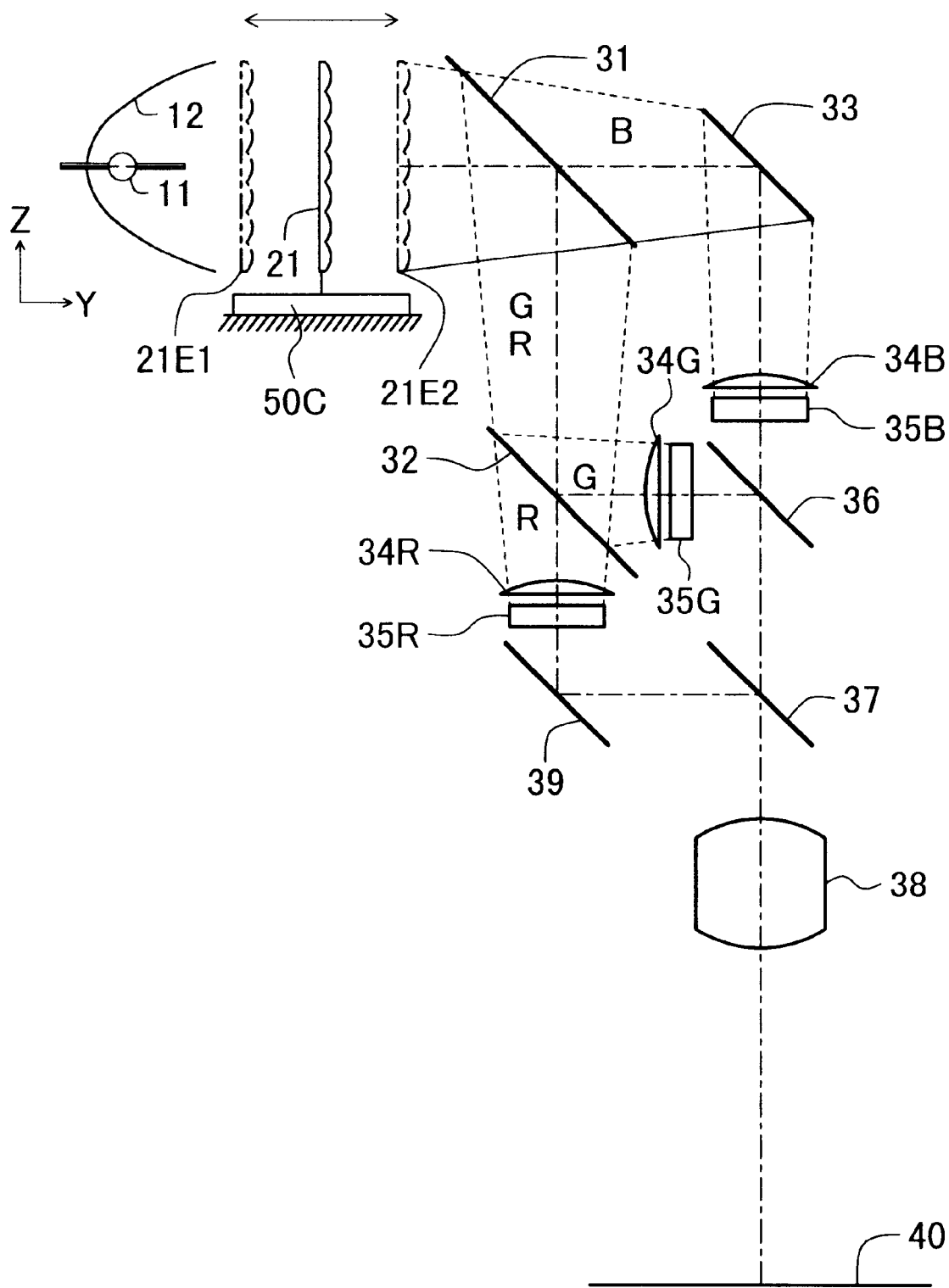
FIG. 17 is a schematic cross-sectional view taken along the optical axis of a liquid crystal projection device of the tenth embodiment according to the present invention.

FIG. 17 shows a schematic cross-sectional view taken along the optical axis of a liquid crystal projection device of the tenth embodiment according to the present invention.

In this device, the lens array 22 and the condenser lens 23 in FIG. 13 are removed and the lens array 21 is used for light diffusion. In a case of no lens array 21 in FIG. 17, an illuminance distribution on a liquid crystal panel is of a shape like a curve C0 shown in FIG. 8, and an illuminance at the end of the effective illumination area EA is excessively low. If the lens array 21 is placed at the front of the parabolic mirror 12, light is diffused and mixed and therefore, an illuminance distribution is a gentler-slope than the curve C0 with the result that an illuminance at the end of the effective illumination area EA increases.

However, as an illuminance at the end of the effective illumination area EA increases, a light loss increases. Further, manufacture error in dimension and mounting error associated with constituents causes a change in illuminance at the edge of the effective illumination area EA.

Therefore, the lens array 21 is made to be adjustable in position along the optical axis by the optical-axial position adjusting device 50C, and an illuminance at the end of the effective illumination area EA is set to the minimum necessary value for improving the quality of a projection image, thereby increasing light utilization efficiency.

Figure 18:
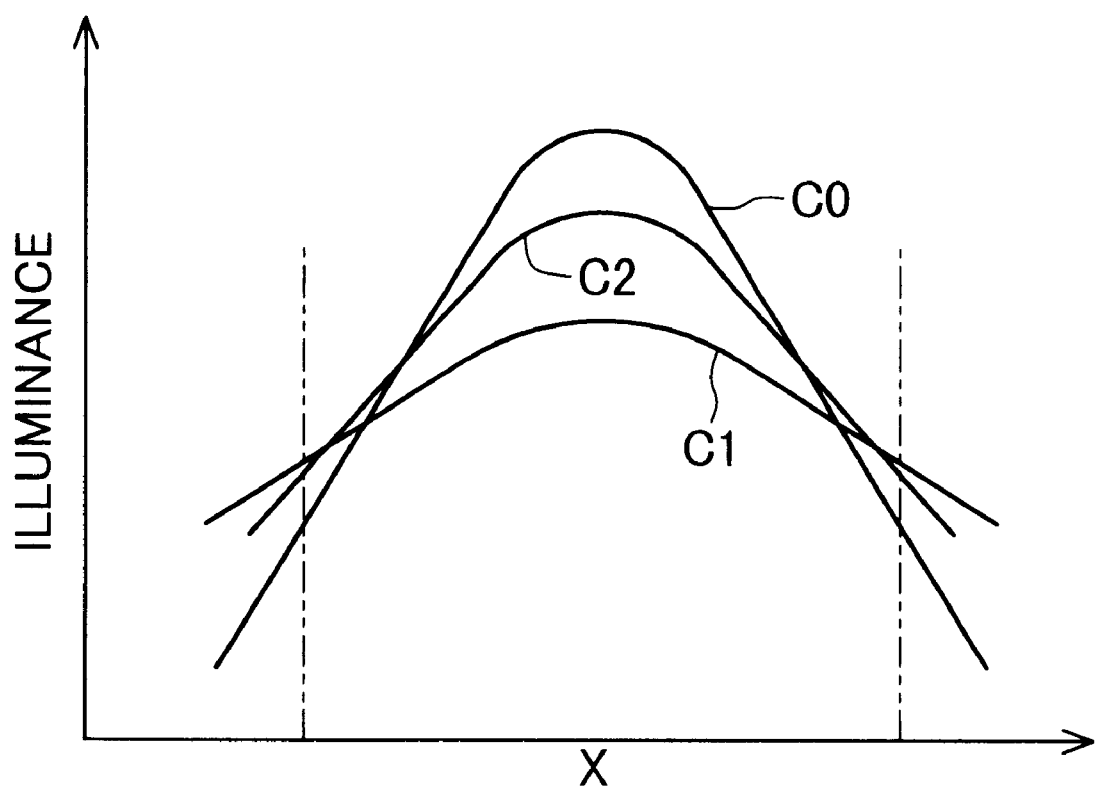
FIG. 18 is a graph showing illuminance distributions on a liquid crystal panel in cases where, in FIG. 17, there is no lens array, the lens array 21 is positioned at 21E1 and 21E2.

When the lens array 21 is moved to a position 21E1 closer to the parabolic mirror 12 by the optical-axial position adjusting device 50C, an optical path length of light that is diffused by the lens array 21 is longer with the result that an illuminance distribution on a liquid crystal panel is like the curve C1 in FIG. 18, while when the lens array 21 is moved to a position 21E2 farther from the parabolic mirror 12, an illuminance distribution on a liquid crystal panel is like the curve C2 in FIG. 18.

It should be noted that when a diffusing plate or a polygon prism is employed instead of the lens array 21 and a position thereof along the optical axis is adjusted, effects similar to the above described will also be obtained.

Eleventh Embodiment

Figure 19:
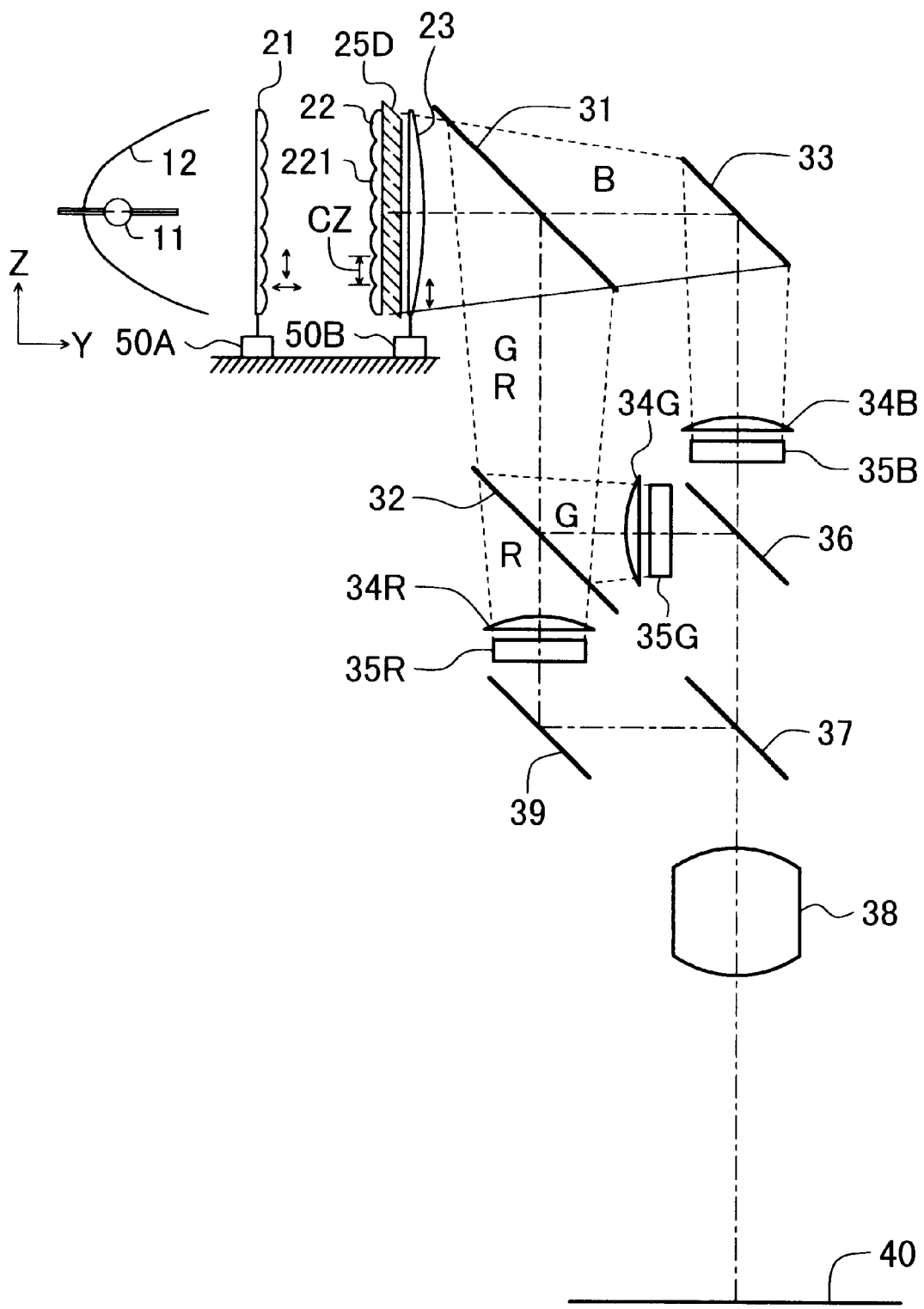
FIG. 19 is a schematic cross-sectional view taken along the optical axis of a liquid crystal projection device of the eleventh embodiment according to the present invention.

FIG. 19 shows a schematic cross-sectional view taken Z along the optical axis of a liquid crystal projection device of the eleventh embodiment according to the present invention.

In this device, a polarization conversion element 25D is disposed between the lens array 22 and the condenser lens 23 in addition to the configuration of FIG. 16. The polarization conversion element 25D converts unpolarized light to a linearly polarized light so that light amount passes through incident-side polarizers of liquid crystal light valves 35B, 35G and 35R increases but absorption thereof decreases.

Figure 20:
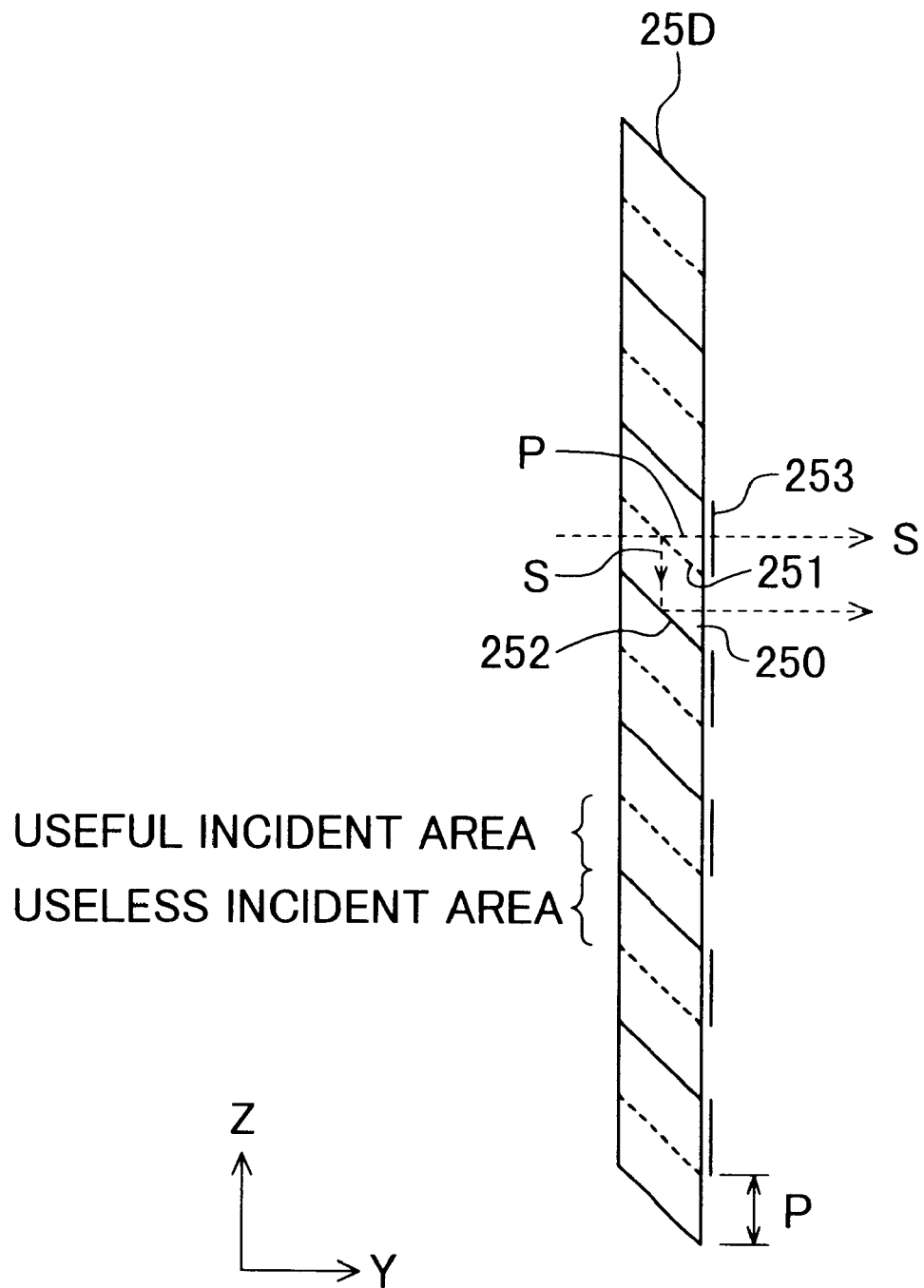
FIG. 20 is a schematic enlarged sectional view of a polarization conversion element in FIG. 19.

FIG. 20 is an enlarged view of the polarization conversion element 25D.

The polarization conversion element 25D is constructed as follows. One end to the other end along Z direction, arranging prisms 250 of the same shapes as one another, each having a section of a parallelogram and extending along a direction perpendicular to the drawing paper. Polarization beam splitters 251 (indicated with dotted lines) and s-polarization mirror 252 each formed with dielectric multi-layered films are alternately inserted between the prisms 250 and formed on both end surfaces of the element facing Z direction. Halfwave plates 253 are pasted on every other light emitting surfaces of the prisms 250. In this parallelogram, widths P of a pair of an incident surface and an emitting surface opposite to each other is a half of a width CX of a lens of the lens array 22, lengths of the other pair of opposite sides are $2^{-0.5}$CX, and one of opposite angle is 45 degrees. The polarization conversion elements 25D are arranged such that the centers of the lenses of the lens array 22 coincide with the centers in Z direction of the polarization beam splitters 251.

A p-polarized component of a light beam proceeding along the optical axis of a convex lens 211 is passes through a polarization beam splitter 251, while an s-polarized component thereof is reflected by the polarization beam splitter 251. The s-polarized component is further reflected by an s-polarization mirror 252. The p-polarized component that has passed through the polarization beam splitter 251 passes through the halfwave plate 253 to be converted to s-polarized light. Therefore, light having passed through the polarization conversion element 25D is s-polarized light.

A p-polarized light having entered into a prism and having passed through a s-polarization mirror 252 is a useless light, and a s-polarized light having entered into the prism, having reflected by the s-polarization mirror 252, having reflected by the polarization beam splitter 251 and having passed through the halfwave plate 253 to be p-polarized light is also a useless light.

Accordingly, an incident surface of a prism is a useful incident area or a useless incident area, and the useful and useless areas are alternately arranged along the Z direction.

Referring back to FIG. 19, a distance between the lens arrays 21 and 22 are shorter than the focal length of the lens array 21 so that almost the minimum image of the luminous part in the metal halide lamp 11 is formed on an incident surface of the polarization conversion element 25D. For example, the distance are given by the following equation.

(a focal length of the lens array 21)=(a distance between the lens arrays 21 and 22)+(a thickness of the lens array 22)   (2)

With such a condition, light utilization efficiency is increased since more light enters the useful incident areas on the polarization conversion element 25D.

It was found that when the polarization conversion element 25D was employed, the margin area MA on a liquid crystal panel was broader in a direction perpendicular to the longitudinal direction of a prism 250 than the longitudinal direction thereof. This is because that, in FIG. 20, a luminous flux passes through a useful incident area of the polarization conversion element 25D became a luminous flux passing through a halfwave plate 253 and a luminous flux passing through an emitting surface of a prism adjacent to the halfwave plate 253, whereby a width of an outgoing luminous flux in Z direction increases to two times that of an incident luminous flux.

It was also found that this problem was able to be alleviated or solved by determining aspect ratios of lenses of the lens arrays 21 and 22 such that the following relation $$CZ/CX > EZ/EX > (CZ-P)/CX \quad (3)$$

was satisfied, where EZ denotes a length of the effective illumination area EA of a liquid crystal panel in Z direction, EX denotes a length of the effective illumination area EA of a liquid crystal panel in a direction perpendicular to Z direction and P denotes a pitch of prisms of the polarization conversion element 25D. P is also equal to a width of a useful incident area on the front surface of the polarization conversion element 25D.

Although the lens arrays 21 and 22 whose lenses had an aspect ratio same as an aspect ratio 3:4 of an liquid crystal panel had been used in the prior art, in this embodiment lens arrays 21 and 22 whose lenses had a aspect ratio of 3:3.6 and a size of 6.7 mm×8 mm were used. With this, light utilization efficiency was able to be increased due to decrease of the excessive margin area in a direction perpendicular to Z direction on a plane to be illuminated.

It should be noted that the halfwave plates 253 are only required to be attached on light emitting surfaces of the every other prisms, and the halfwave plates 253 in FIG. 20 may be arranged with displacement of positions thereof each by a pitch P. In this case, unpolarized light is converted to p-polarized light by the polarization conversion element 25D. Further, it is only required that the s-polarization mirror can reflect at least s-polarized light and therefore the mirror may be a polarization beam splitter.

Twelfth Embodiment

Figure 21:
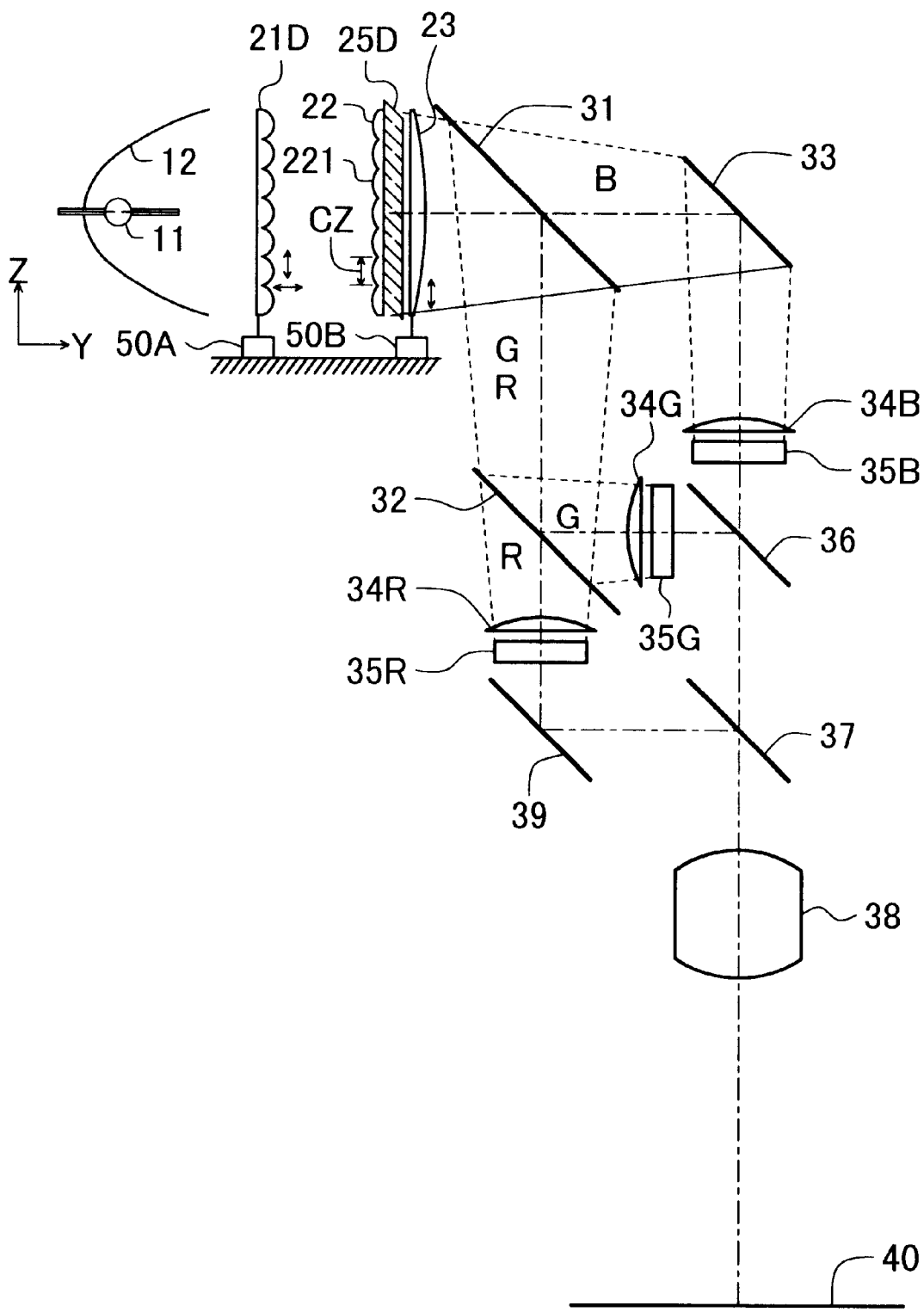
FIG. 21 is a schematic cross-sectional view taking along the optical axis of a liquid crystal projection device of the twelfth embodiment according to the present invention.

FIG. 21 shows a schematic cross-sectional view taken along the optical axis of a liquid crystal projection device of the twelfth embodiment according to the present invention.

In this device, a lens array 21D having aspherical lenses whose spherical aberration is corrected is employed in order to increase light utilization efficiency by increasing an incident light amount entering useful incident areas on the polarization conversion element 25D. The other points of the configuration are same as the liquid crystal projection device of FIG. 19.

Herein, it should be noted that in regard to the above-described first to twelfth embodiments, various changes and modifications thereof are included in the scope of the present invention.

For example, application of the above described luminaires is not limited to a projectors such as a liquid crystal projection device or a movie projector.

The liquid crystal projection device may be of a single plate type in which only one liquid crystal light valve is employed.

Further, a light source is not limited to the metal halide lamp but various kinds can be employed depending on applications.

Furthermore, an emitting luminous flux from a luminaire may be of a converging one or a diverging one depending on application or a purpose of use, by arranging the luminescence center of a light source at positions displaced from the focal point of a parabolic mirror.

Further, it is alternatively allowed that a spherical mirror is employed instead of a parabolic mirror, a light source is arranged at the center of the spherical surface, and convex lens whose focal point coincides with the center of the spherical surface is arranged in front of the aperture of the spherical mirror. Still further, only the convex lens may be employed without using the spherical mirror.

Thirteenth Embodiment

Figure 22:
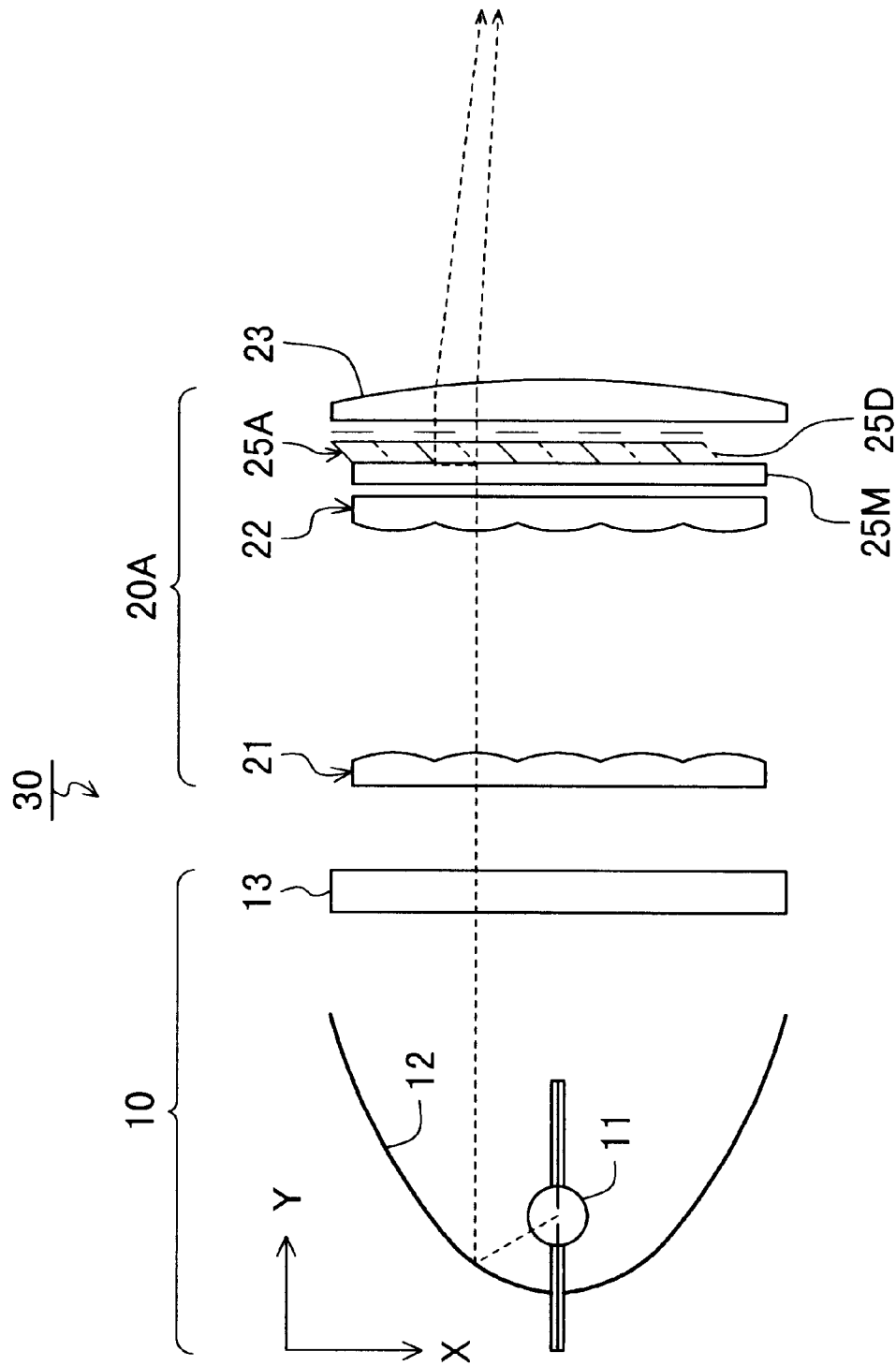
FIG. 22 is a schematic, lateral sectional view taken along the optical axis of a polarized luminaire of the thirteenth embodiment according to the present invention.
Figure 23:
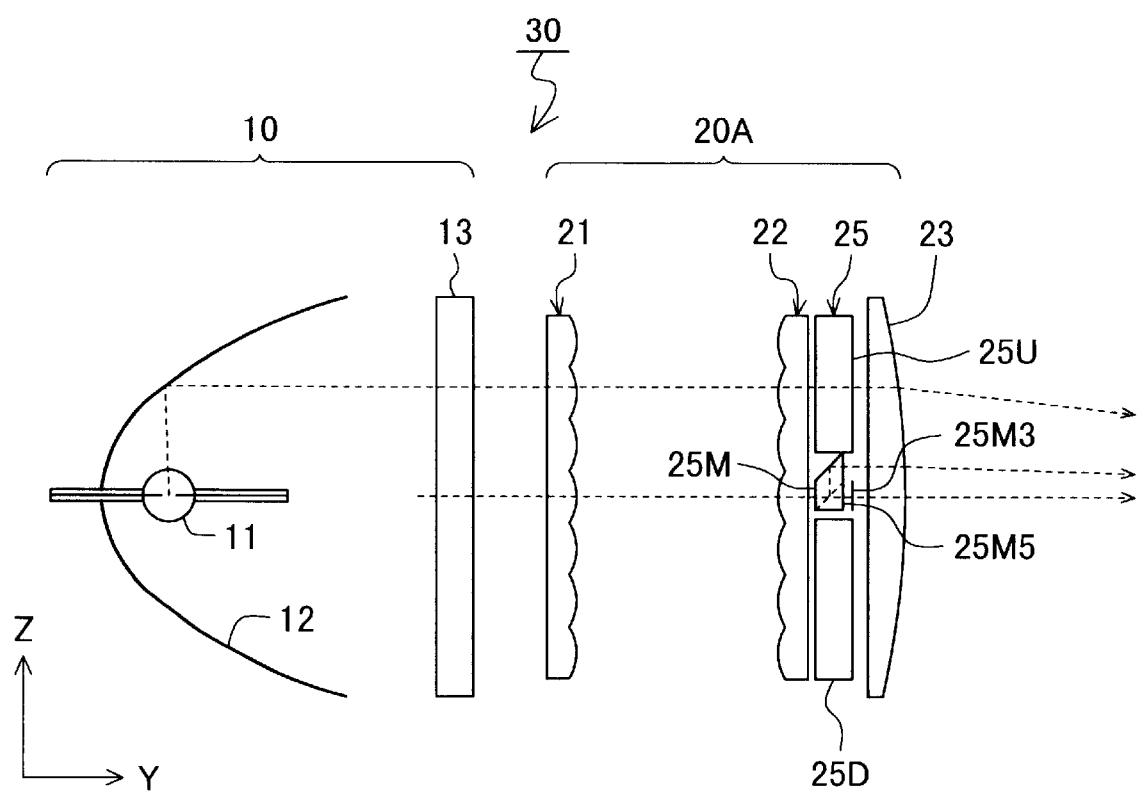
FIG. 23 is a schematic, longitudinal sectional view taken along the optical axis of this polarized luminaire.

FIG. 22 is a schematic, lateral sectional view taken along the optical axis of a polarized luminaire 30 of the thirteenth embodiment according to the present invention, and FIG. 23 is a schematic, longitudinal sectional view taken along the optical axis of the polarized luminaire 30.

The polarized luminaire 30 consists of the unpolarized luminaire 10 and a polarization conversion device 20A located at the front thereof. The device 20A is the same as the device 20 in FIG. 50 except for a polarization conversion element 25A, and not only improves an illuminance distribution in a illumination spot on the plane 24, but also converts unpolarized light to linearly polarized light.

Figure 24:
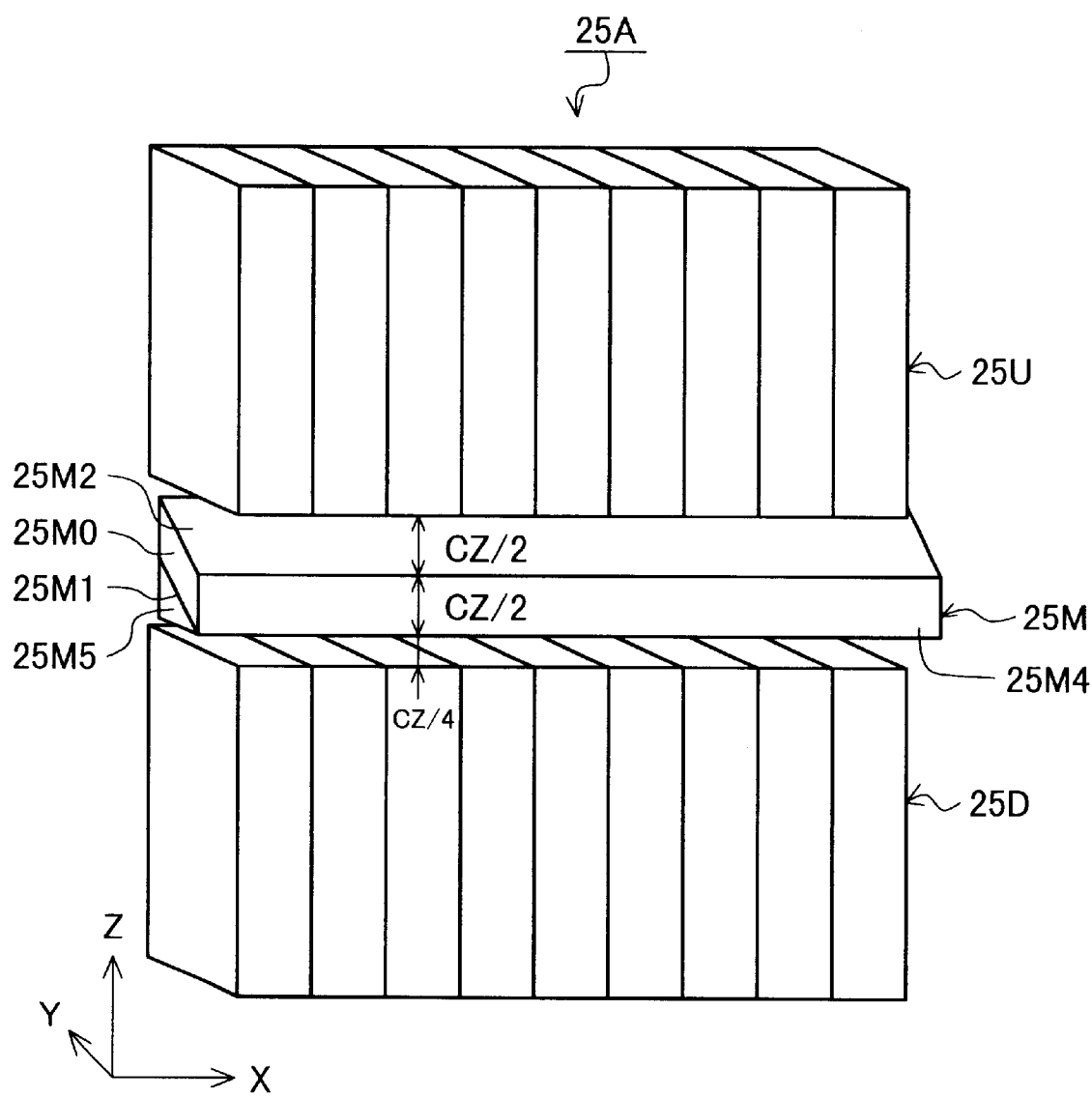
FIG. 24 is an enlarged perspective view of the polarization conversion element in FIG. 23.

FIG. 24 is an enlarged perspective view of the polarization conversion element 25A. As shown, assume an X-Y-Z orthogonal coordinate system whose Y axis is parallel to the optical axis.

The polarization conversion element 25A comprises polarization conversion elements 25U and 25D, both of which are the same as each other in size and structure, and a polarization element 25M disposed between the elements 25U and 25D. Longitudinal directions of polarization conversion components of the polarization conversion elements 25U and 25D are parallel to Z axis, while longitudinal directions of components of the polarization conversion element 25M are parallel to X axis. The element 25U is the same as the element 25D in FIG. 50 except for a length of Z direction. A distance between the polarization conversion elements 25U and 25D is 1.25 times as long as a length CZ of each lens of lens arrays 21 and 22 in Z direction.

The polarization conversion element 25M comprises a quadrangular prism 25M0 that is the same as a component of the polarization conversion element 25U except for size, a cross section of the prism 25M0 in parallel to the X-Z plane being of a parallelogram, the prism 25M0 extending to X direction. The element 25M further comprises a polarization beam splitter 25M1 and a mirror 25M2 respectively formed on surfaces of the prism 25M0 opposite to each other, a triangular prism 25M5 whose one surface is joined with a surface of the polarization beam splitter 25M1, and a halfwave plate 25M3 (see FIG. 23) formed on an emitting surface of the triangular prism 25M5, opposite to an incident surface 25M4. Widths of the incident surface 25M4 and the mirror 25M2 in a direction perpendicular to the X axis are respectively CZ/2 and $2^{1/2}$ times CZ/2, and an angle formed between the polarization beam splitter 25M1 and the incident surface 25M4 is 45 degrees. The incident surface 25M4 is in the same assumed plane as or in parallel to the incident surfaces of the polarization conversion elements 25U and 25D.

Figure 50:
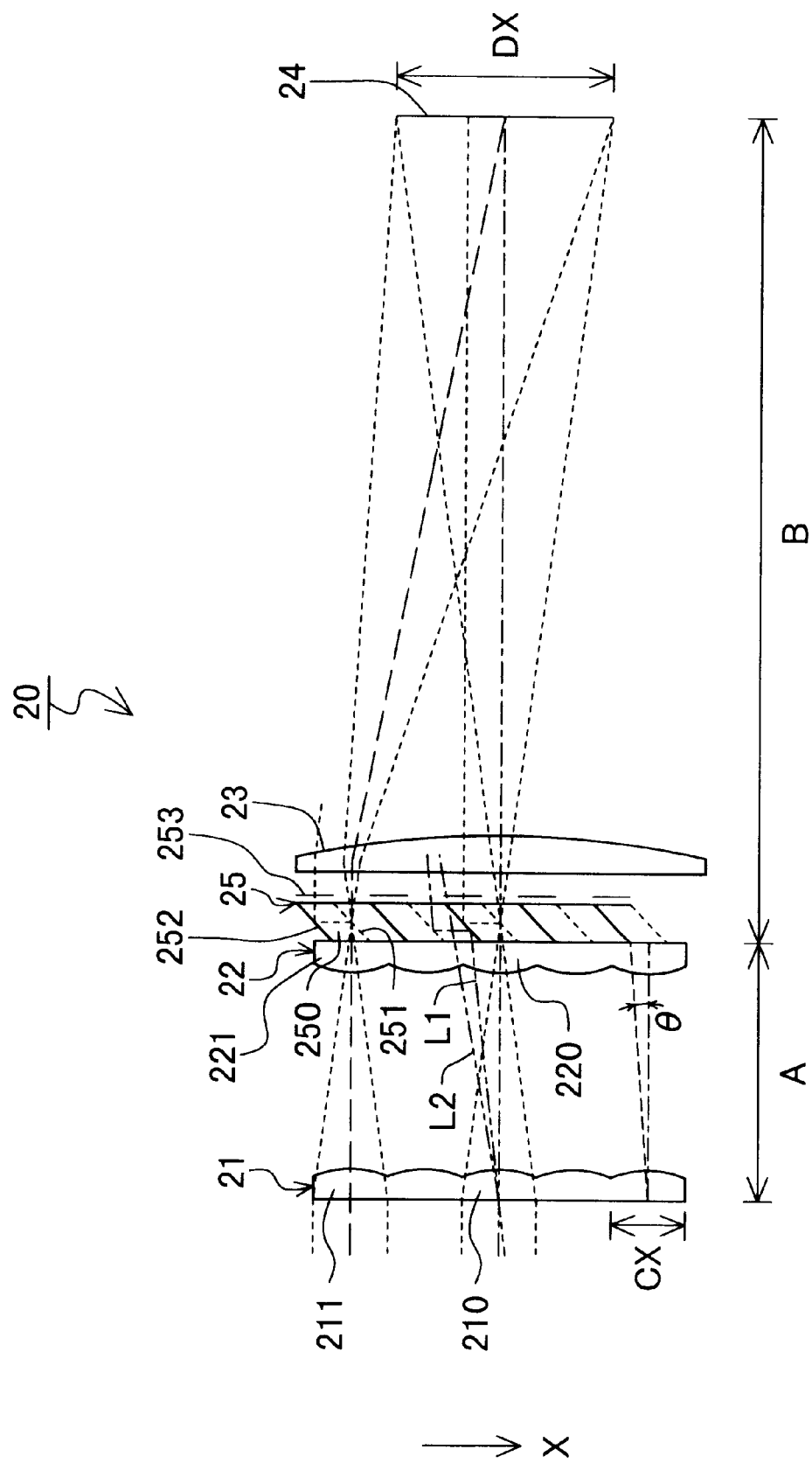
FIG. 50 is a sectional view taken along the optical axis of a prior art polarization conversion device.

Paths of light beams incident on the polarization conversion elements 25U and 25D are the same as those above-described in relation to FIG. 50. A p-polarized light component of a light beam incident on the polarization conversion element 25M passes through the polarization beam splitter 25M1, is converted to s-polarized light by passing through the halfwave plate 25M3, while a s-polarized light component thereof is reflected by the polarization beam splitter 25M1, further reflected by the mirror 25M2 and emitted from the prism 25M0. With such process, polarization planes of linearly polarized lights emitted from the polarization conversion elements 25U, 25M and 25D become same as one another.

Figure 25:
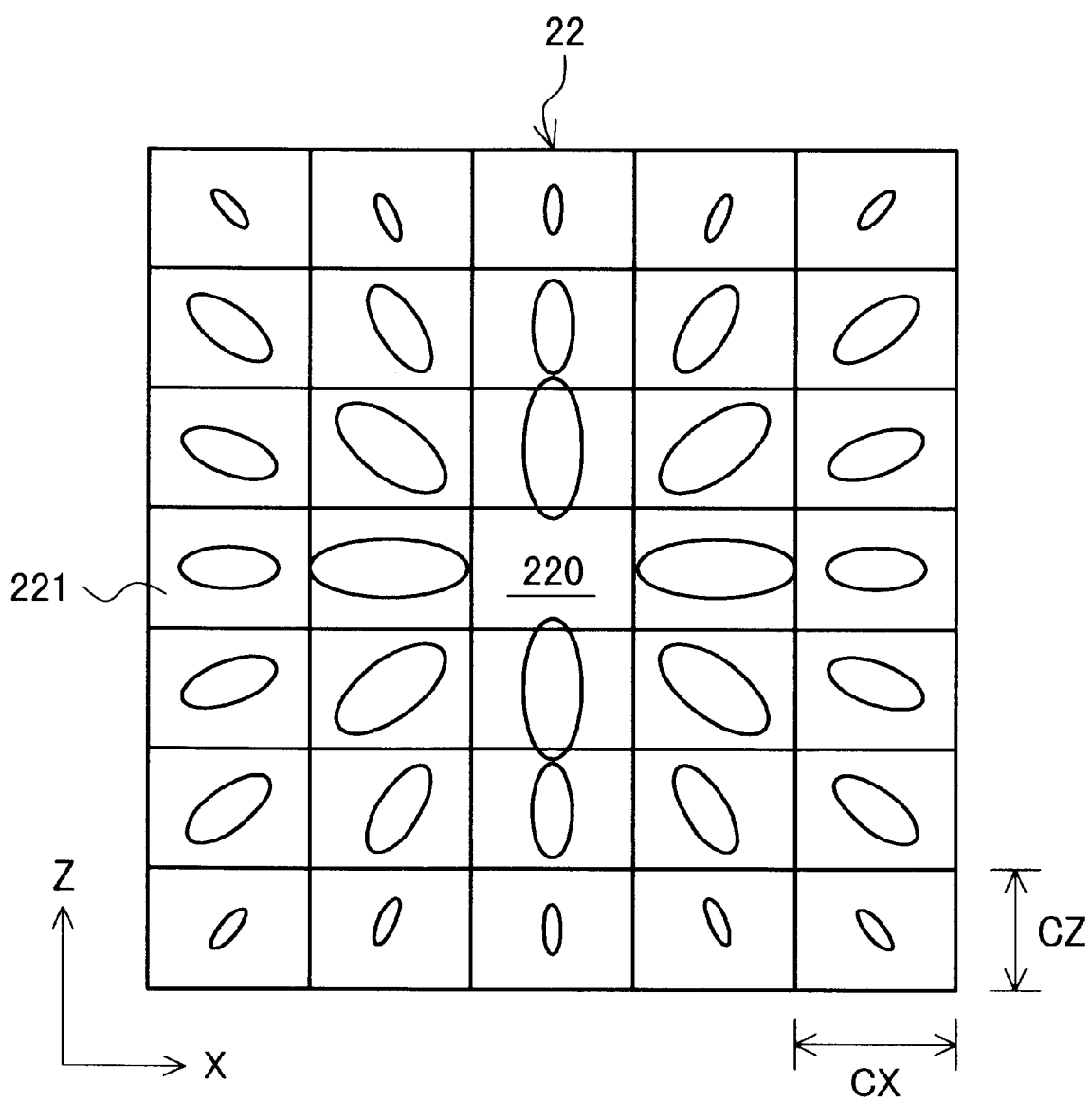
FIG. 25 is a plan view showing equiluminous curves of an image of a light emitting part, the image being formed on a lens array by an opposed lens array thereto.

In FIG. 23, images of the light emitting part in the metal halide lamp 11 are formed on lenses of the lens array 22 by respective lenses of the lens array 21 in a matrix of the lenses whose shapes each are of rectangles. FIG. 25 shows equiluminous curves of the images of the light emitting part formed on the lens array 22. Since a length of the light emitting part in an arc gap direction is longer than that in a direction perpendicular to the arc direction, and the parabolic mirror 12 is rotationally symmetric with respect to the optical axis, therefore the images of the light emitting part each are formed in the shape of ellipse whose major axis is in a radial direction from the center of the lens array 22 to those of lenses thereof. Since a light intensity at the aperture of the parabolic mirror 11 is reduced with increase in distance from the optical axis thereof to the outside, the size of ellipses also decreases with increase in the distance.

Figure 26:
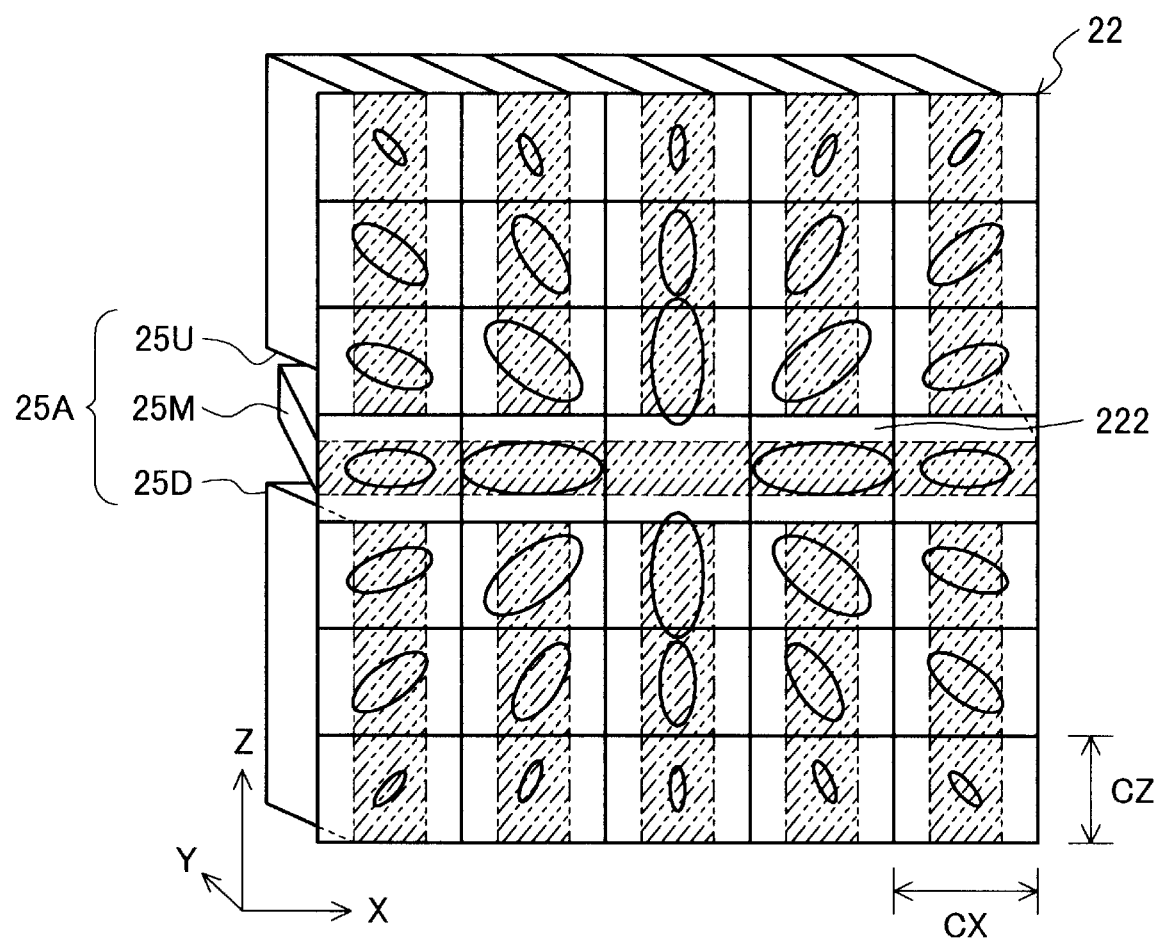
FIG. 26 is a plan view showing useful incident areas with hatches on the lens array of FIG. 25, that is simplified to a plan, placed on the front of the polarization conversion element of FIG. 24.

FIG. 26 is a plan view showing useful incident areas with hatches of double dot and dash lines on the lens array 22 of FIG. 25, that is simplified to a plan, placed on the front of the polarization conversion element 25A of FIG. 24. Light incident on the hatched areas are converted to p-polarized light by the polarization conversion element 25A, but s-polarized light component of almost all incident light beams incident to the area outside the useful incident areas are emitted from the polarization conversion element 25A.

Figure 27A:
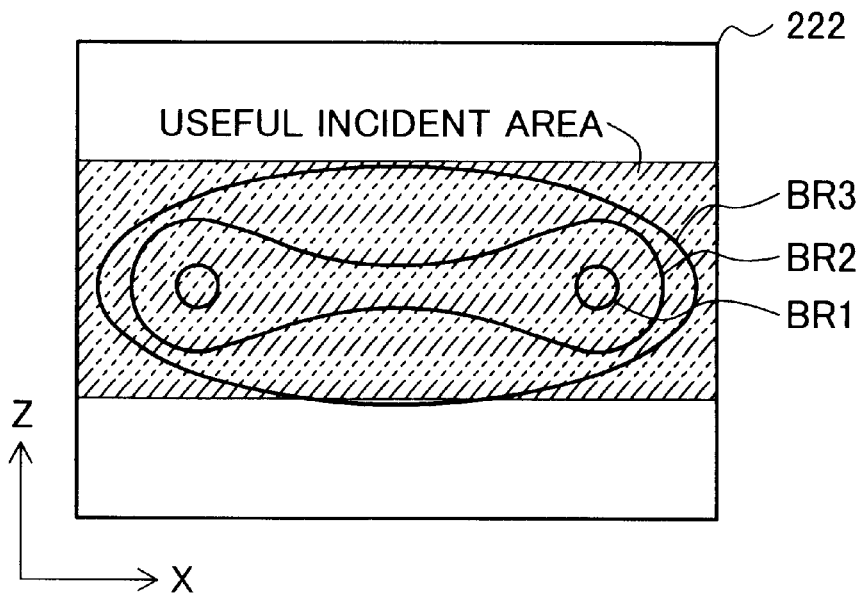
FIG. 27(A) is an enlarged plan view showing a relation between equiluminous curves of the image of light emitting part, formed on the lens 222 of the lens array of FIG. 26, and a useful incident area (hatched portion)

FIG. 27(A) is an enlarged plan view showing a relation between equiluminous curves of the image of light emitting part, formed on the lens 222 of the lens array of FIG. 26, and a useful incident area (hatched portion). Since brightness is the highest at the electrode ends of the metal halide lamp 11 shown in FIG. 23, a brightness BR1 is higher than a brightness BR2 and the brightness of BR2 is higher than a brightness BR3.

Figure 27B:
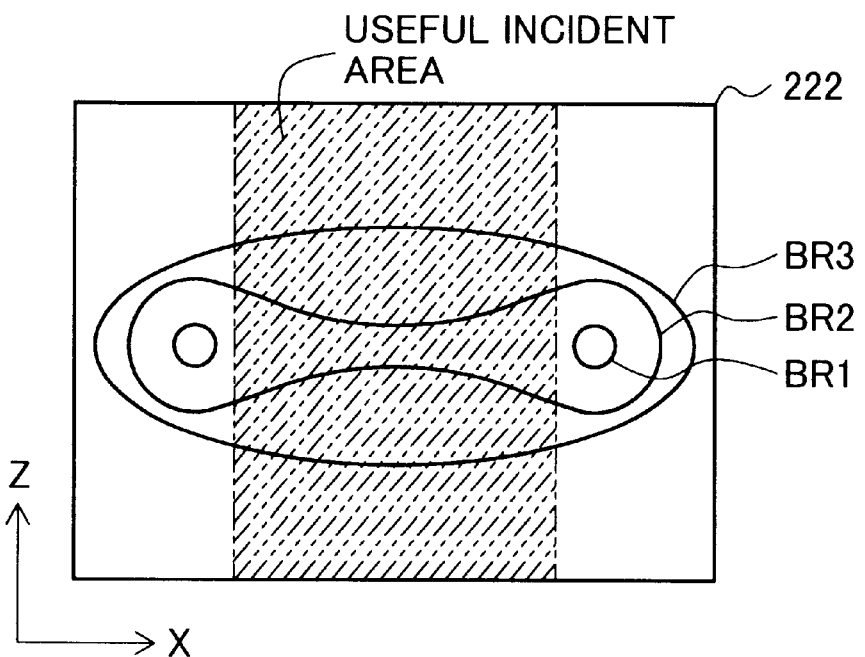
FIG. 27(B) is a plan view showing the same relation in a prior art example of FIG. 50, corresponding to FIG. 27(A)

FIG. 27(B) is a plan view showing the relation in a prior art example of FIG. 50, corresponding to FIG. 27(A).

In the prior art, longitudinal directions of the prisms of the polarization conversion element was all the same as one another, therefore on a place where light utilization efficiency is the poorest, as shown in FIG. 27(B), both end portions of image of a light emitting part that are the brightest are located outside a useful incident area and are useless light. But in the thirteenth embodiment, since the polarization conversion element 25M corresponding to this poorest place is aligned in the same direction as a longitudinal direction of the image of the light emitting part, almost all the image comes in a useful incident area and can be converted to p-polarized light by the polarization conversion element 25A, improving light utilization efficiency.

Parameter example of the polarized luminaire 30 in FIG. 23 are as follows.

The metal halide lamp 11 has an arc length of 3 mm;
the parabolic mirror 12 has a focal length of 13 mm;
the lens array 21 has its lens size of lateral 8 mm×longitudinal 6 mm, a focal length A of 60 mm and a matrix arrangement of 12×16;
the lens array 22 has the same parameters as those of the lens array 21; and each of the polarization conversion elements 25U and 25D has 12 polarization conversion components, and the polarization conversion element 25M has 6 polarization conversion components.

It should be noted that the mirror 25M2 is only required for a capability of reflecting at least s-polarized light and may be replaced with a polarization beam splitter. Further, the polarization conversion element 25A is only required for capability of conversion to linearly polarized light having a polarization plane of one direction and therefore, each halfwave plate 25M3 may be located on a emitting surface of the triangular prism 25M5 to perform conversion to s-polarized light.

Fourteenth Embodiment

Figure 28:
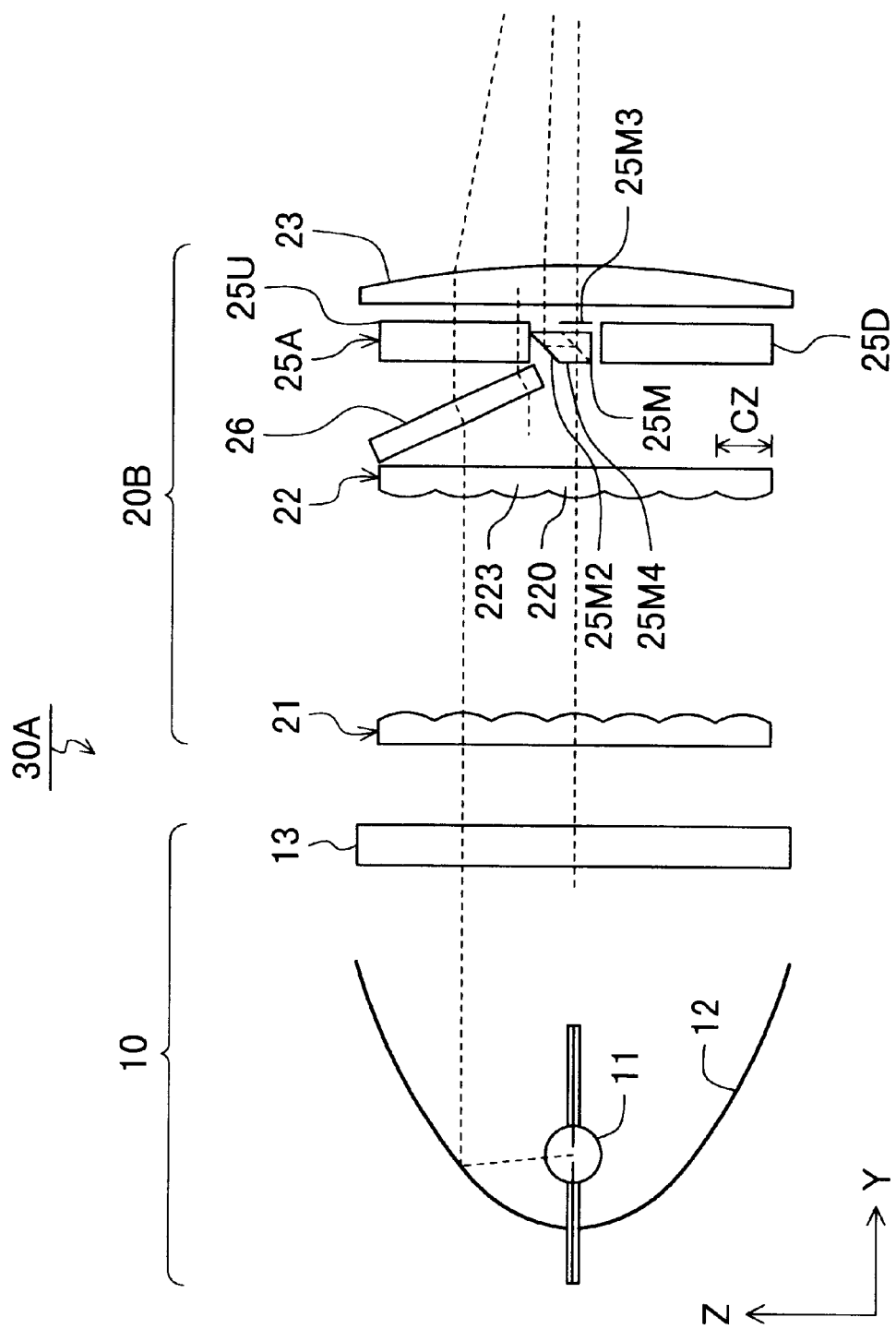
FIG. 28 is a schematic, longitudinal sectional view taken along the optical axis of a polarized luminaire of the fourteenth embodiment according to the present invention.

FIG. 28 is a schematic, longitudinal sectional view taken along the optical axis of a polarized luminaire of the fourteenth embodiment according to the present invention.

The width in Z direction of an incident area 25M4 (useful incident area) of the polarization conversion element 25M and the width in Z direction of the useless incident area adjacent thereto each are CZ/2, where CZ is a length in Z direction of each lens of the lens array 22. And the center in the Z direction of the useful incident area is the same as the center in Z direction of the lens 220 opposite to the polarization conversion element 25M. Therefore, the useless incident area of the polarization conversion element 25M protrudes from the end of the lens 220 by a distance of CZ/4 in Z direction. With this, lens 220 side part of a luminous flux incident on a lens 223 adjacent to the lens 220 enters into the useless incident area of the polarization conversion element 25M.

In order to prevent this, in the polarization conversion device 20B, a optical path correcting plate 26 is disposed obliquely to the lens array 22 between the lens array 22 and the polarization conversion element 25U. The plate 26 has the same width in the direction perpendicular to the drawing paper as that of the lens array 22.

A light beam that progresses in Y direction after passing through the lens 223 is shifted to Z direction in the course of transmission through the optical path correcting plate 26 and go out of the optical path correcting plate 26 again in Y direction. An inclination angle of the optical path correcting plate 26 to the lens array 22 and a thickness of the optical path correcting plate 26 are properly selected such that the shift is equal to or larger than CZ/4. With this selection, a light beam passing through the lens 223 is directed so as to pass through the optical path correcting plate 26, the polarization conversion element 25U and the condenser lens 23 without entering into the mirror 25M2. For example, in the case of CZ=6 mm, the shift is adjusted to 1.5 mm that is equal to CZ/4 by setting an inclination angle of the optical path correcting plate 26 to 48 degrees and the thickness of the optical path correcting plate 26 to 10 mm. The other points are the same as those of the thirteenth embodiment.

According to the fourteenth embodiment, light that would otherwise be directed to a useless incident area of the polarization conversion element 25M is refracted by the optical path correcting plate 26, thereby preventing the light from entering the useless incident area and in turn, improving light utilization efficiency as compared with that of the thirteenth embodiment.

Fifteenth Embodiment

Figure 29:
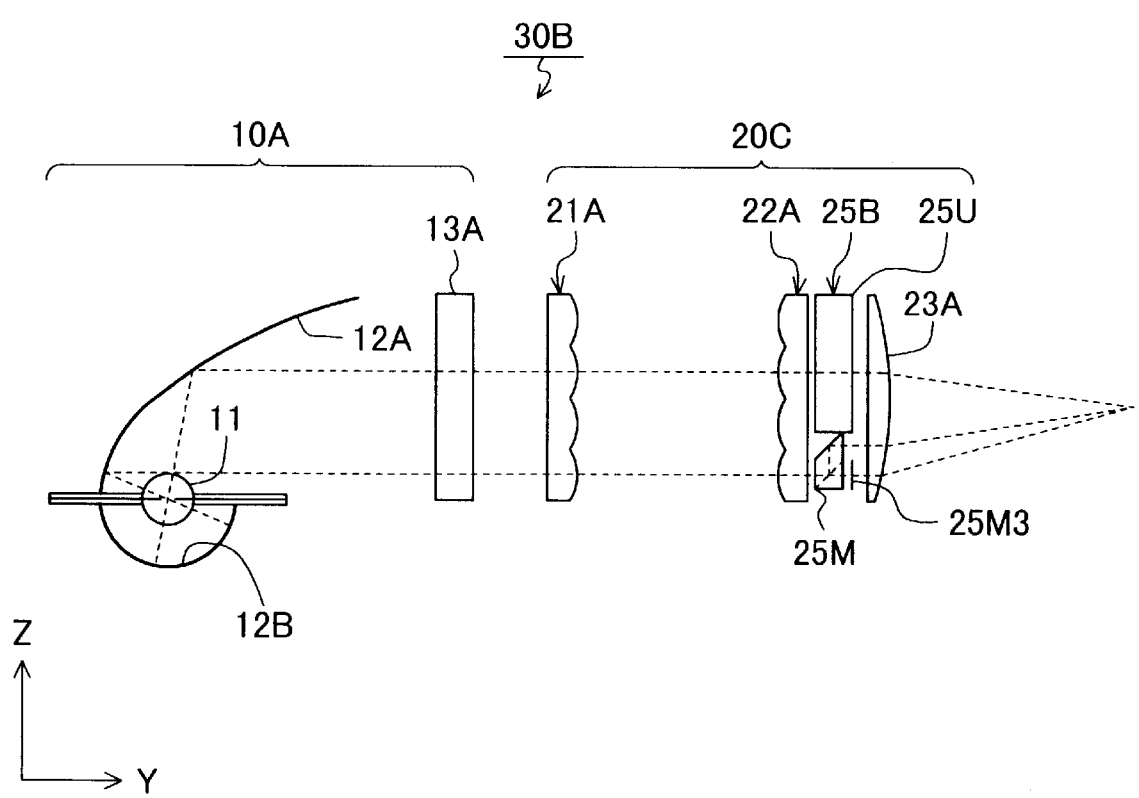
FIG. 29 is a schematic, longitudinal sectional view taken along the optical axis of a polarized luminaire of the fifteenth embodiment according to the present invention.

FIG. 29 is a schematic, longitudinal sectional view taken along the optical axis of a polarized luminaire 30B of the fifteenth embodiment according to the present invention.

In the unpolarized luminaire 10A, reflecting means for emitted light from the metal halide lamp 11 is constructed of a semi-parabolic mirror 12A and a semi-spherical mirror 12B. The semi-parabolic mirror 12A is half the parabolic mirror 12 obtained by dividing it along a plane comprising the optical axis. The radius of the spherical mirror 12B is equal to the focal length of the semi-parabolic mirror 12A, and the center of the spherical mirror 12B and the focal point of the semi-parabolic mirror 12A are coincide with each other. The metal halide lamp 11 is arranged such that the center of the arc gap of the metal halide lamp 11 coincides with the focal point.

Light beams incident on the spherical mirror 12B as part of emitted light beams from the metal halide lamps 11 are reflected back from the spherical mirror 12B, pass through the halide metal lamp 11 and are reflected by the semi-parabolic mirror 12A. Hence, a light emitting area from the luminaire 10A is reduced to half that in the case of FIG. 28, leading to a light intensity of about two times that in the case of FIG. 28. In correspondence to this, lengths in Z direction of a UV/IR cut filter 13A of the unpolarized luminaire 10A and lens arrays 21A and 22A, and a condenser lens 23A of a polarization conversion device 20C are reduced to half of corresponding ones in FIG. 28. A polarization conversion element 25B has no counterpart of the polarization conversion element 25D in FIG. 28 and comprises only the polarization elements 25U and 25M.

The other points are the same as those of the thirteenth embodiment.

Sixteenth Embodiment

Figure 30:
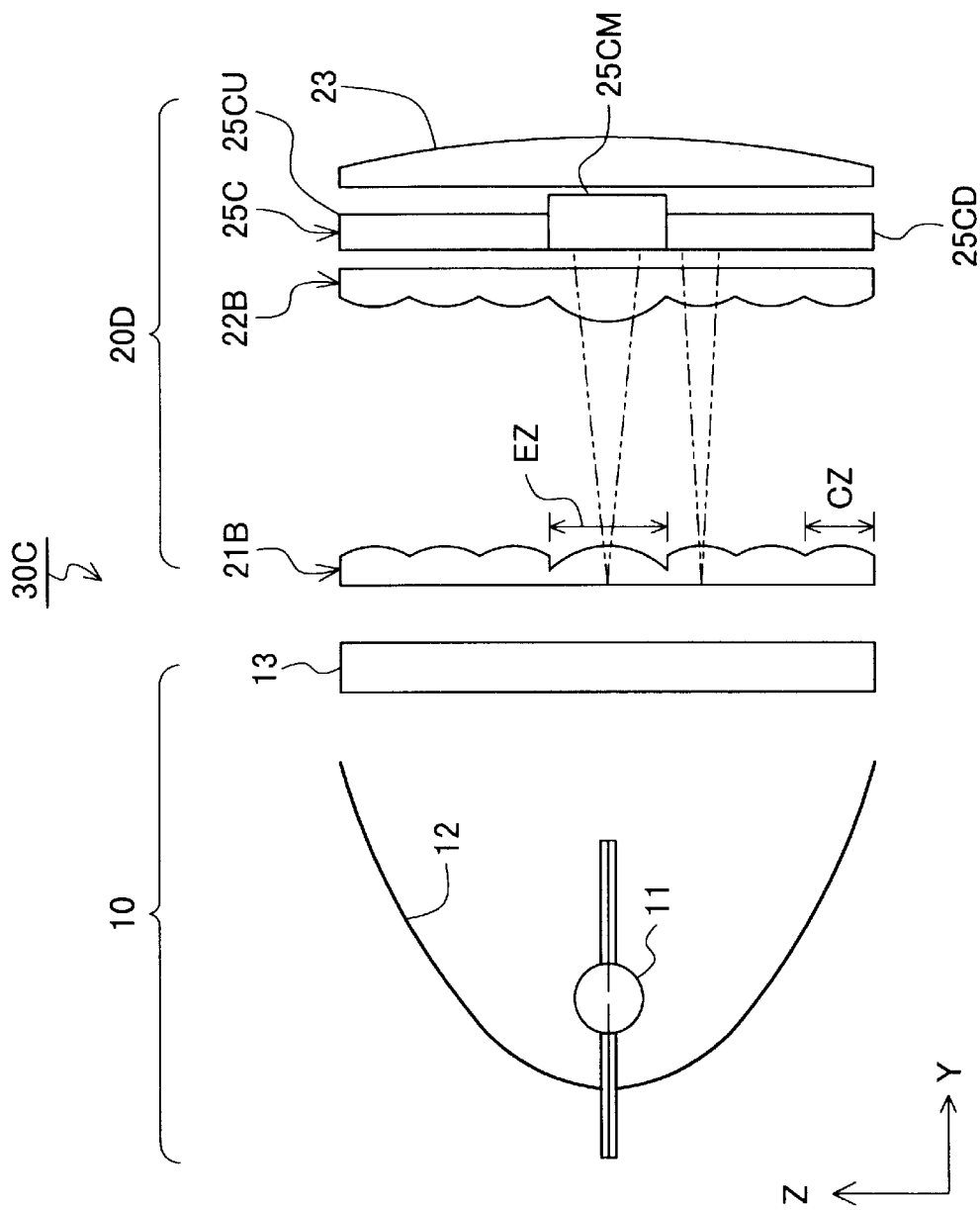
FIG. 30 is a schematic, longitudinal sectional view taken along the optical axis of a polarized luminaire of the sixteenth embodiment according to the present invention.
Figure 31:
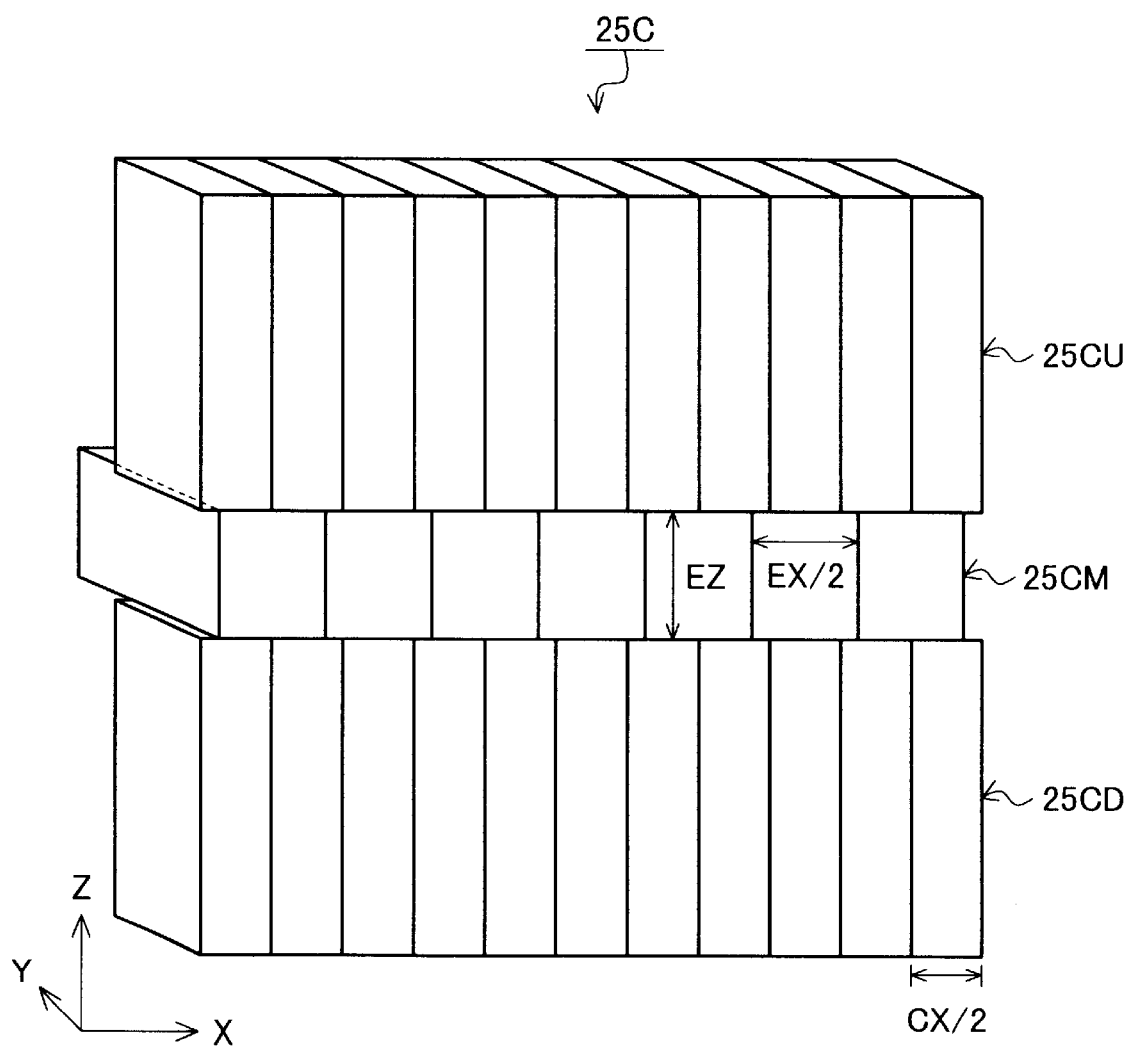
FIG. 31 is an enlarged perspective view of the polarization conversion element in FIG. 30.

FIG. 30 is a schematic, longitudinal sectional view taken along the optical axis of a polarized luminaire of the sixteenth embodiment according to the present invention. FIG. 31 is an enlarged perspective view of a polarization conversion element 25C.

In the polarization conversion device 20D, a lens size in the middle portion in Z direction of a lens array 21B is larger than that of lenses in the other portions. Focal lengths of lenses in the lens array 21B are all equal to one another. The shapes in X-Z plane of larger and smaller lenses are similar figures to each other. Letting lengths of larger lenses in X and Z directions be EX and EZ, respectively, the following relation holds.

$CX:CZ=EX:EZ$

For example, EZ=9 mm and EX=12 mm when CZ=6 mm and CX=8 mm. The lens array 22B disposed opposite to the lens array 21B are of the same shape as each other. However, a focal length of the lens array 22B is not required to be equal to that of the lens array 21B.

Corresponding to lens size of the lens array 22B, an polarization conversion element 25C consists of polarization conversion elements 25CU and 25CD, and a polarization conversion element 25CM interposed therebetween. The elements 25CU and 25CD are of the same shape as each other, and the cross section of each component of the element 25CM has similar figure to that of the element 25CU. Lengths of the incident surface in X and Z directions of the polarization conversion element 25CM are EX/2 and EZ, respectively.

Figure 32:
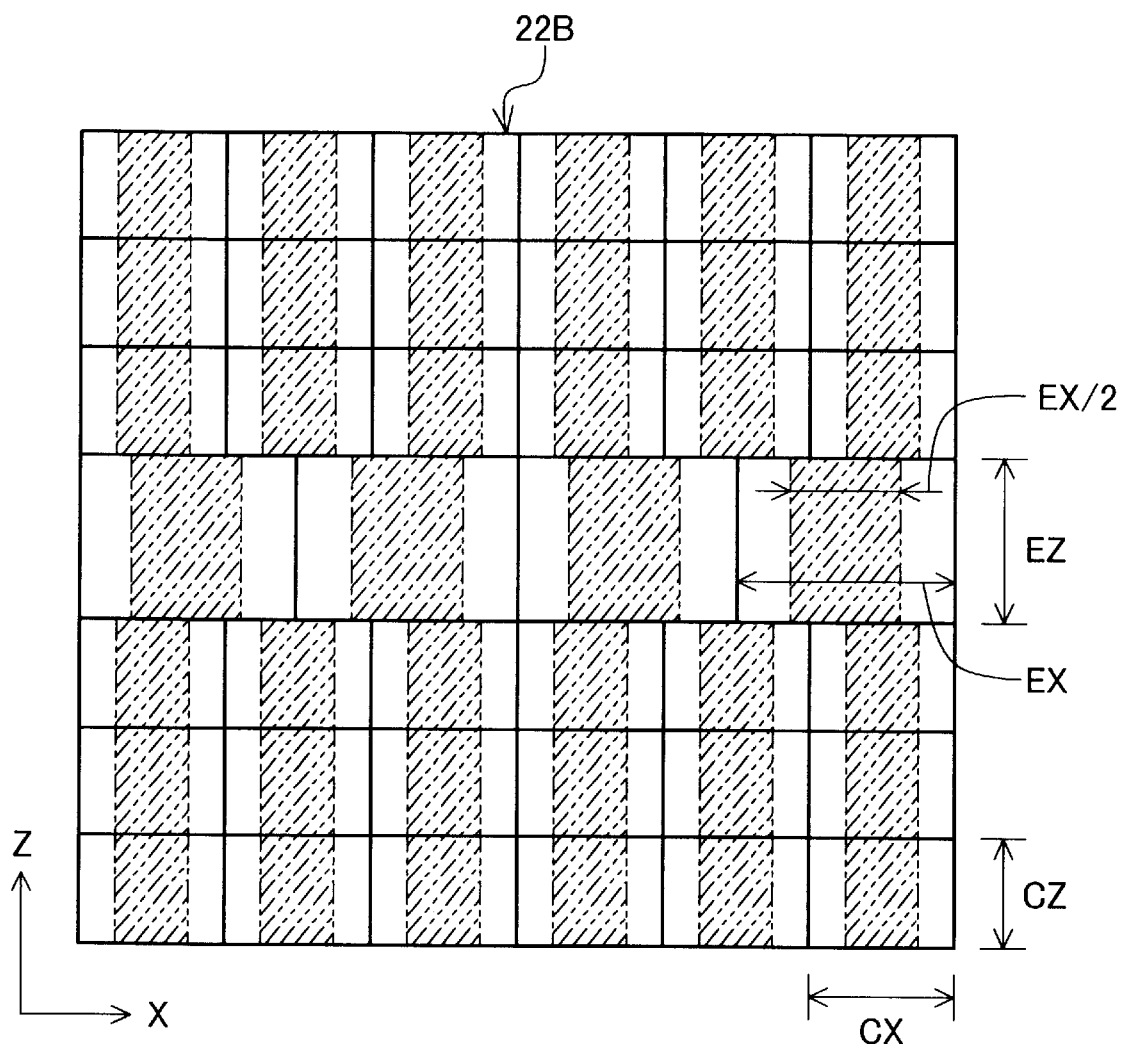
FIG. 32 is an enlarged plan view showing useful incident areas with hatched portions on the polarization conversion element written together with the lens array in FIG. 30.

FIG. 32 is an enlarged plan view showing useful incident areas with hatched portions on the polarization conversion element 25C written together with the lens array 22B in FIG. 30.

In the sixteen embodiment, a size of lenses in the middle row of lens arrays 21B and 22B is larger than that of lenses in the other portions, and corresponding to this, width in X direction of each polarization conversion component of the polarization conversion element 25CM is increased. Therefore, a visual angle in X direction from the center of a large lens of the lens array 21B for a useful incident area on a corresponding large lens of the lens array 22B is larger than that in regard to a small lens and thereby, a ratio of entering into useful incident area is large as compared with a prior art case, leading to improvement of light utilization efficiency.

Such a lens array 22B was employed, whose lenses having the above described size and a focal length of 60 mm, wherein large lenses of four rows were arranged in the middle in Z direction and small lenses were arranged in upper five rows and lower five rows, and as a result, light utilization efficiency is increased by about 15% as compared with a case employing a pair of lens array having only small lenses.

Seventeenth Embodiment

Figure 33:
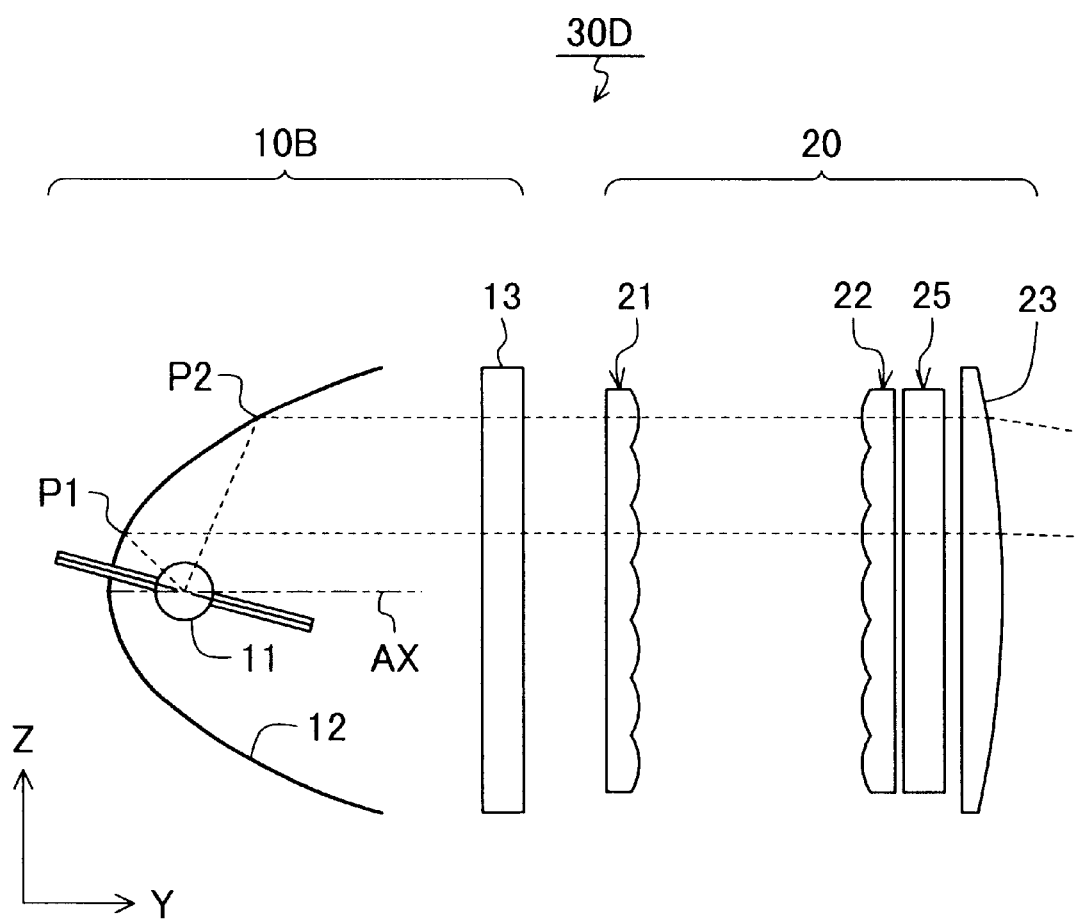
FIG. 33 is a schematic, longitudinal sectional view taken along the optical axis of a polarized luminaire of the seventeenth embodiment according to the present invention.

FIG. 33 is a schematic, longitudinal sectional view taken along the optical axis of a polarized luminaire 30D of the seventeenth embodiment according to the present invention.

In an unpolarized luminaire 10B, the direction of the arc gap of the metal halide lamp 11 is inclined from the optical axis of the parabolic mirror 12. A plane containing the arc gap direction and the optical axis AX is in parallel to longitudinal directions of each prism of the polarization conversion element 25.

Figure 34:
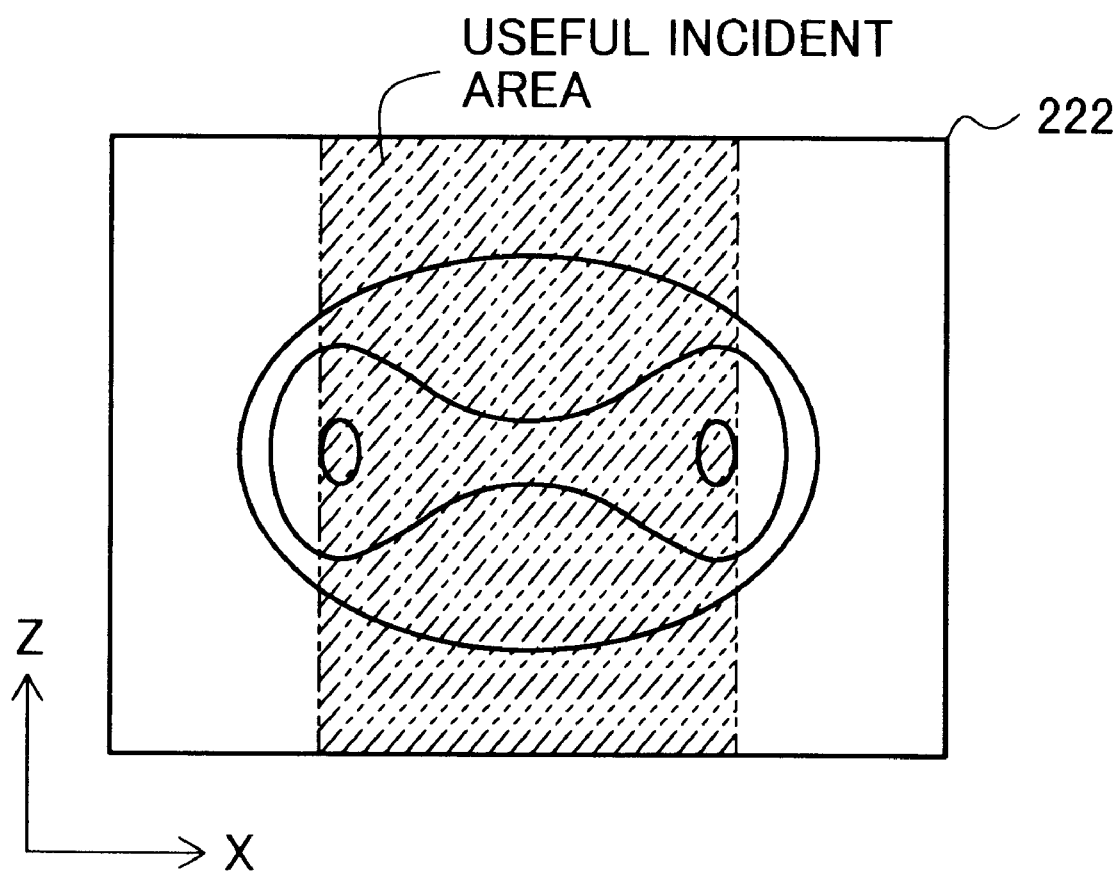
FIG. 34 is an enlarged plan view showing a relation between equiluminous curves of the image of light emitting part, formed on the lens of the lens array in FIG. 33, and a useful incident area (hatched portion)

With this inclination, since a visual angle from a point P1 on the parabolic mirror 12 for the light emitting part is smaller than the case of no inclination, as shown in FIG. 34, a light emitting part image of the maximum size formed on the lens array 22 is smaller than the case of FIG. 27(B). Contrary to this, a visual from a point P2 on the parabolic mirror 12 for the light emitting part is larger than the case of no inclination, but since a light intensity of reflected light from the point P2 is lower than that of the reflected light from the point P1, no problem arises in light utilization efficiency in spite of the light emitting part image on the lens array 22 being larger a little in size.

In the experiment, parameters employed is as follows.

Each of the lens arrays 21 and 22 has lenses whose focal lengths each are 60 mm, whose sizes each are lateral 8 mm×longitudinal 6 mm, and whose matrix arrangement is 12×16, the parabolic mirror 12 has the focal length of 13 mm, the metal halide lamp 11 has the arc gap of 3.0 mm, and the inclination angle is 15 degrees.

As a result, a light amount emitted from the polarization conversion device 20 was able to be increased by about 10%.

According to the seventeenth embodiment, the arc gap direction of the metal halide lamp 11 is inclined from the optical axis of the parabolic mirror 12 such that a plane containing the arc gap direction of the meal halide lamp 11 and the optical axis AX is in parallel to a longitudinal direction of each prism of the polarization conversion element 25, and with such a simple configuration, light utilization efficiency is increased.

Eighteenth Embodiment

FIG. 35(A) is a schematic, longitudinal sectional view taken along the optical axis of a polarized luminaire 30E of the eighteenth embodiment according to the present invention, and FIG. 35(B) is a front view of a parabolic mirror 12C.

The end portions in X direction of the parabolic mirror 12C is cut away in order to improve an air cooling effect. With this, a width of the parabolic mirror 12C in X direction is narrower than that in Z direction. For example, the parabolic mirror 12C has a diameter of 100 mm and a width of 78 mm in X direction at an aperture thereof.

The longitudinal direction of the parabolic mirror 12C at the aperture is parallel to the longitudinal direction of prisms of the polarization conversion element 25. Thereby the width in X direction of the light emitting part image formed on the lens array 22 is narrower than that in FIG. 25. Accordingly, light utilization efficiency of the luminaire 30E is improved as compared with a case where a longitudinal direction of the aperture of the parabolic mirror 12 is in parallel to X direction.

Further, an negative electrode is connected to a lead rod in the metal halide lamp 11 and an end portion 111 of the lead rod is connected to a lead line 14 outside the metal halide lamp 11. The lead line 14 is, for example, a bare wire having a diameter of about 2 mm. The lead wire 14 passes through a plane parallel to X-Y plane and further passes through a hole 15 formed in the wall of the parabolic mirror 12C.

With such a configuration, since a shadow of the lead wire 14, formed on the lens array 22, is in parallel to X direction, that is perpendicular to the longitudinal direction of each prism of the polarization conversion element 25, a half of the shadow is directed to useless incident areas. Therefore, light utilization efficiency of the polarized luminaire 30E is improved as compared with that in a case where a shadow of the lead wire 14 is formed in a useful incident area on the lens array 22 by rotation of the lead wire 14 about the optical axis of the parabolic mirror 12C by 90 degrees. Further, even if almost all of the shadow of the lead wire 14 is formed in a useless incident area by this rotation, a rate of the shadow of the lead wire 14 coming in the useful incident area will vary with random shift of the lead wire 14 product by product. In contrast to this, according to the eighteenth embodiment, no such a variation arises.

Nineteenth Embodiment

Figure 36:
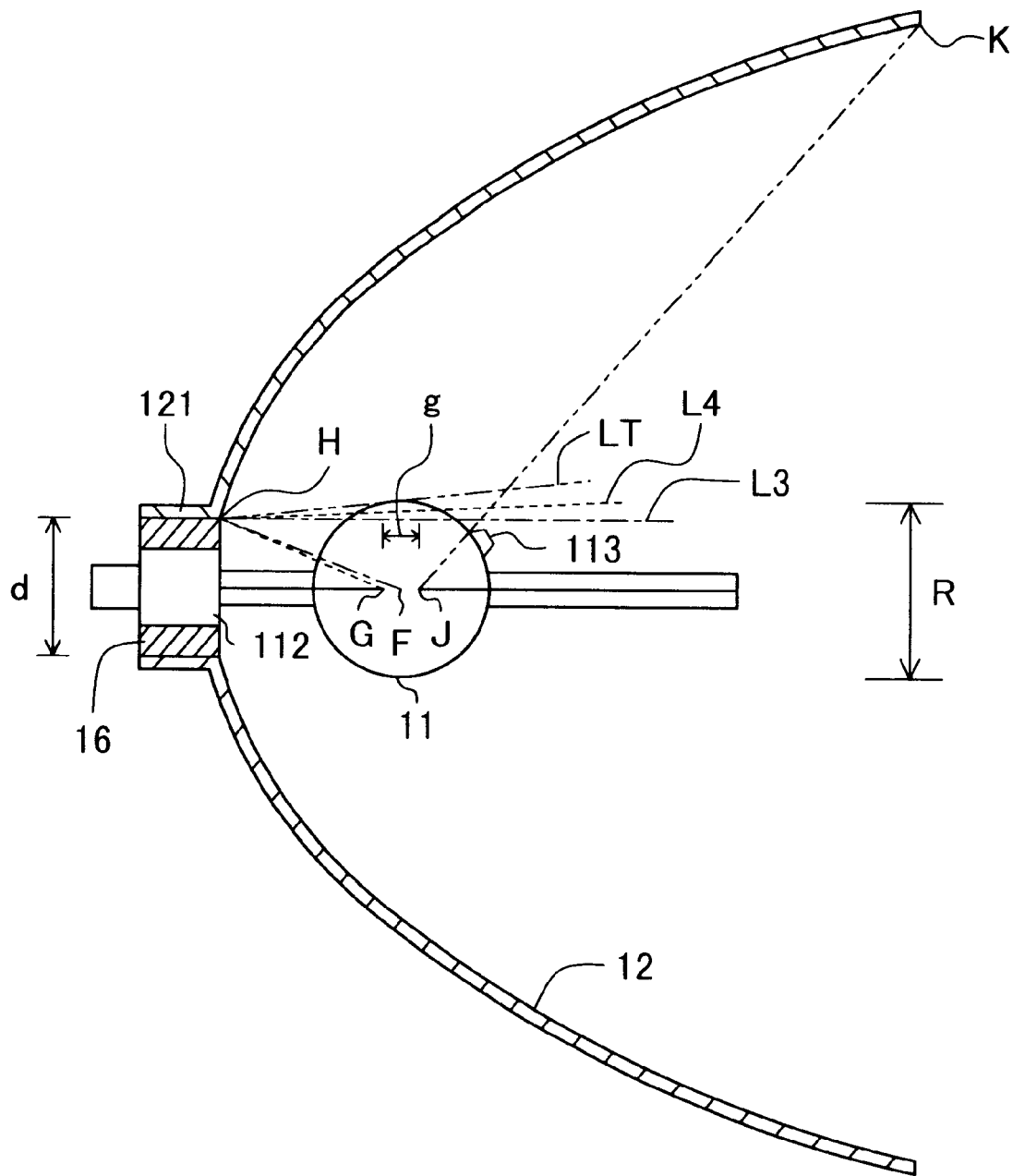
FIG. 36 is a schematic, longitudinal sectional view taken along the optical axis of an unpolarized luminaire of the nineteenth embodiment according to the present invention.

FIG. 36 is a schematic, longitudinal sectional view taken along the optical axis of an unpolarized luminaire of the nineteenth embodiment according to the present invention.

The metal halide lamp 11 is fixed to the neck portion 121 of the parabolic mirror 12 with an adhesive 16 being interposed between mouthpiece 112 and the inner wall of the neck portion 121. A focal length of the parabolic mirror 12 is, for example, 13 mm and therefore the light emitting part of the metal halide lamp 11 is located close to the neck portion. It is preferable to increase a diameter d of the neck portion 121 in order to reduce a heat amount conducted to the parabolic mirror 12 through the mouthpiece 112 and the adhesives from the positive electrode of the metal halide lamp 11. On the other hand, if an emitted light beam from the metal halide lamp 11 is reflected by the parabolic mirror 12 and thereafter, the reflected light beam is reflected back to the metal halide lamp 11, then the reflected light beam is refracted in the glass sphere of the metal halide lamp 11 and as a result, such light is deteriorated in parallelism to the optical axis of the parabolic mirror 12 to be eventually useless light. A proportion of such useless light beams are increased as a diameter d of the neck portion 121 is smaller.

A light beam directed from the arc gap center F to a neck side end point H of the mirror surface is reflected at the point H and then directed along a straight line L3 parallel to the optical axis. A light beam directed from a positive electrode end G to the point H is reflected at the point H and directed along a straight line L4. ∠FHG=θ1 is equal to an angle between the straight lines L3 and L4. Letting an angle between a straight line LT, that passes through the point H and touches the bulb surface of the metal halide lamp 11 in a plane containing the straight line L3 and the optical axis, and the straight line L3 be θ2, the diameter d of the neck portion is determined such that θ1 is approximately equal to θ2.

Thereby, thermal conduction from the metal halide lamp 11 to the parabolic mirror 12 can be reduced with almost no decrease in light utilization efficiency. Letting the arc gap length be g, the bulb diameter in a section perpendicular to the optical axis of the metal halide lamp 11 be R and the focal length of the parabolic mirror 12 be f, θ1 and θ2 are expressed as follows.

$$\theta 1 = \arctan(0.5d/(f-g/2)) - \arctan(0.5d/f)$$

$$\theta 2 = \arctan((R-d)/(2f))$$

Further, a light beam passed through a tip 113, which is formed when sealing the bulb is refracted, is refracted on the tip 113 and becomes poor parallelism and useless. Therefore, in order to prevent this to improve light utilization efficiency, the bulb is produced such that the tip 113 is inside a assumed cone formed by straight lines each passing the negative electrode end J of the metal halide lamp 11 and points of the aperture K of the parabolic mirror 12.

Twentieth Embodiment

Figure 37:
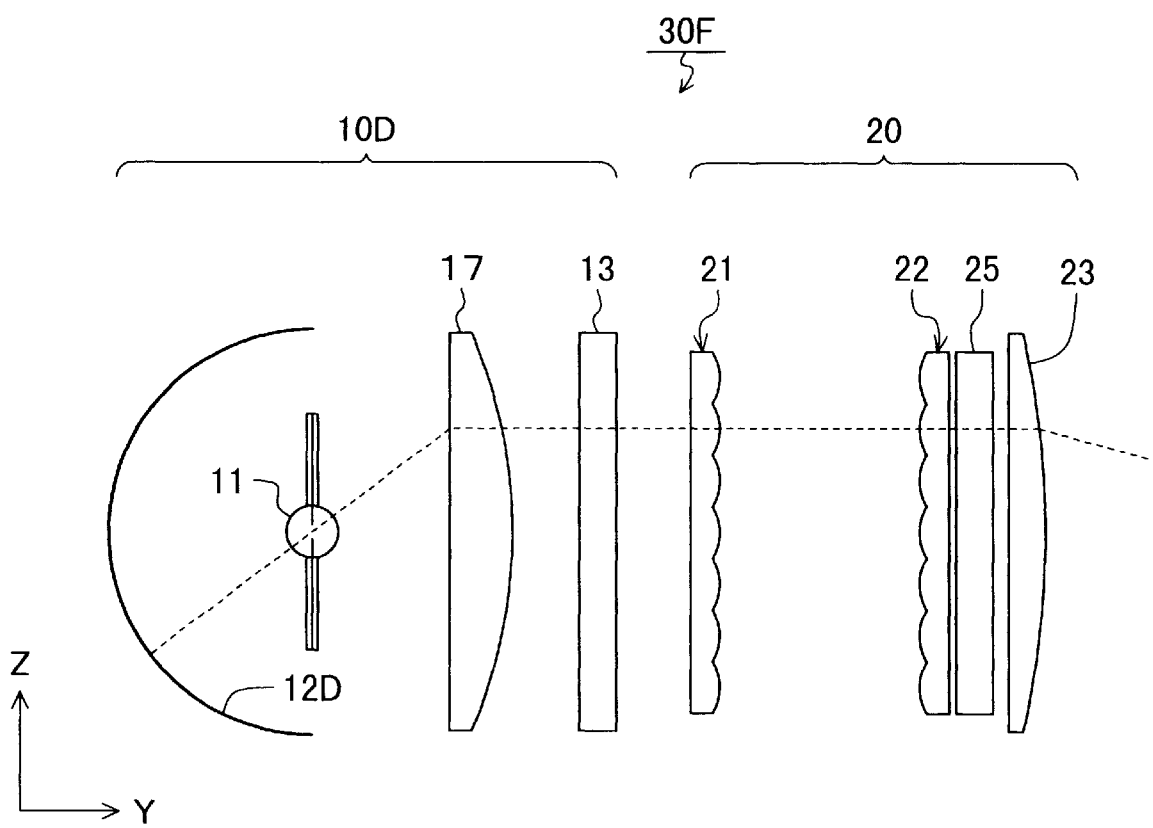
FIG. 37 is a schematic, longitudinal sectional view taken along the optical axis of a polarized luminaire of the twentieth embodiment according to the present invention.

FIG. 37 is a schematic, longitudinal sectional view taken along the optical axis of a polarized luminaire 30F of the twentieth embodiment according to the present invention.

An unpolarized luminaire 10D comprises a spherical mirror 12D, a convex lens 17 disposed between the spherical mirror 12D and a UV/IR cut filter 13, in stead of the parabolic mirror 12 in FIG. 36. The metal halide lamp 11 is arranged such that the arc gap center thereof is located at the center of the spherical mirror 12D.

Such a configuration itself is well-known, but the feature of the twentieth embodiment is that by arranging the direction of the electrodes of the metal halide lamp 11 in Z direction, emitting light and reflected light from the parabolic mirror 12 are not hindered by the protrusions of the metal halide lamp 11, whereby light utilization efficiency is increased as compared with that of the case of FIG. 36.

Herein, it should be noted that in regard to the above-described thirteenth to twentieth embodiments, various changes and modifications thereof are included in the scope of the present invention.

For example, applications of the above described unpolarized luminaire, polarized luminaire and polarization conversion device are not limited to a liquid crystal projection device.

The liquid crystal projection device is not limited to an example of FIG. 1, but the liquid crystal projection device may be of a single light valve type.

Further, a light source is not limited to the metal halide lamp but various kinds of light sources can be employed according to a way of application.

Besides, a light emitting part may be displaced from the focal point of a parabolic mirror to obtain emitting light from a luminaire as either converging or diverging light, according to an application or a purpose of use.

Twenty-first Embodiment

Figure 38:
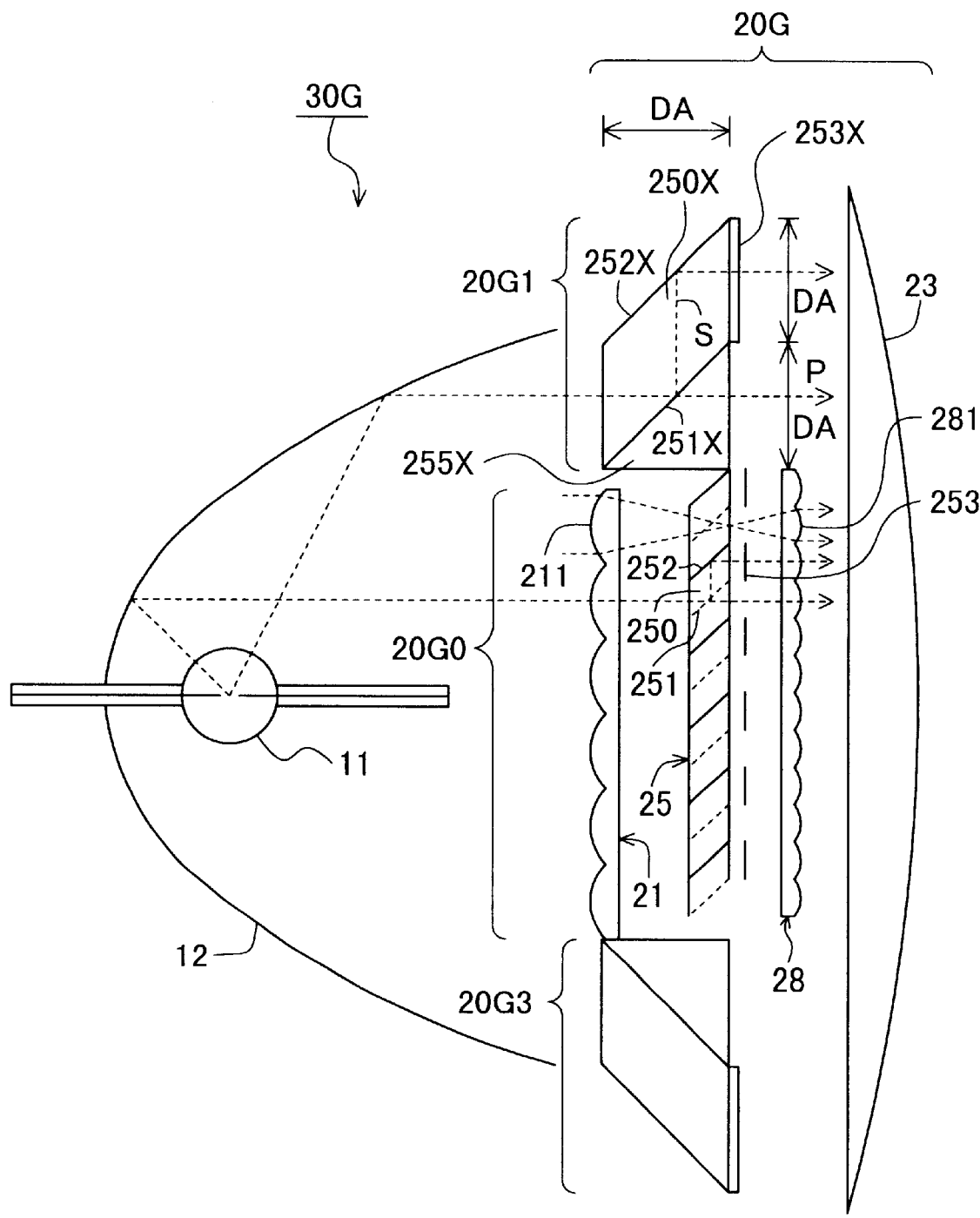
FIG. 38 is a schematic sectional view taken along the optical axis of a polarized luminaire of the twenty-second embodiment according to the present invention.

FIG. 38 is a schematic sectional view taken along the optical axis of a luminaire 30G of the twenty-first embodiment according to the present invention.

The metal halide lamp 11 is fixed to a parabolic mirror 12 such that the arc gap center thereof coincides with the focal point of the parabolic mirror 12. A polarization conversion device 20G is disposed in front of the aperture of the parabolic mirror 12. The polarization conversion device 20G comprises a polarization conversion section and a condenser lens 23 disposed in front of the section. The condenser lens 23 is for directing an illumination spot to liquid crystal panel of the light valves 35B, 35G and 35R in FIG. 13.

Figure 39:
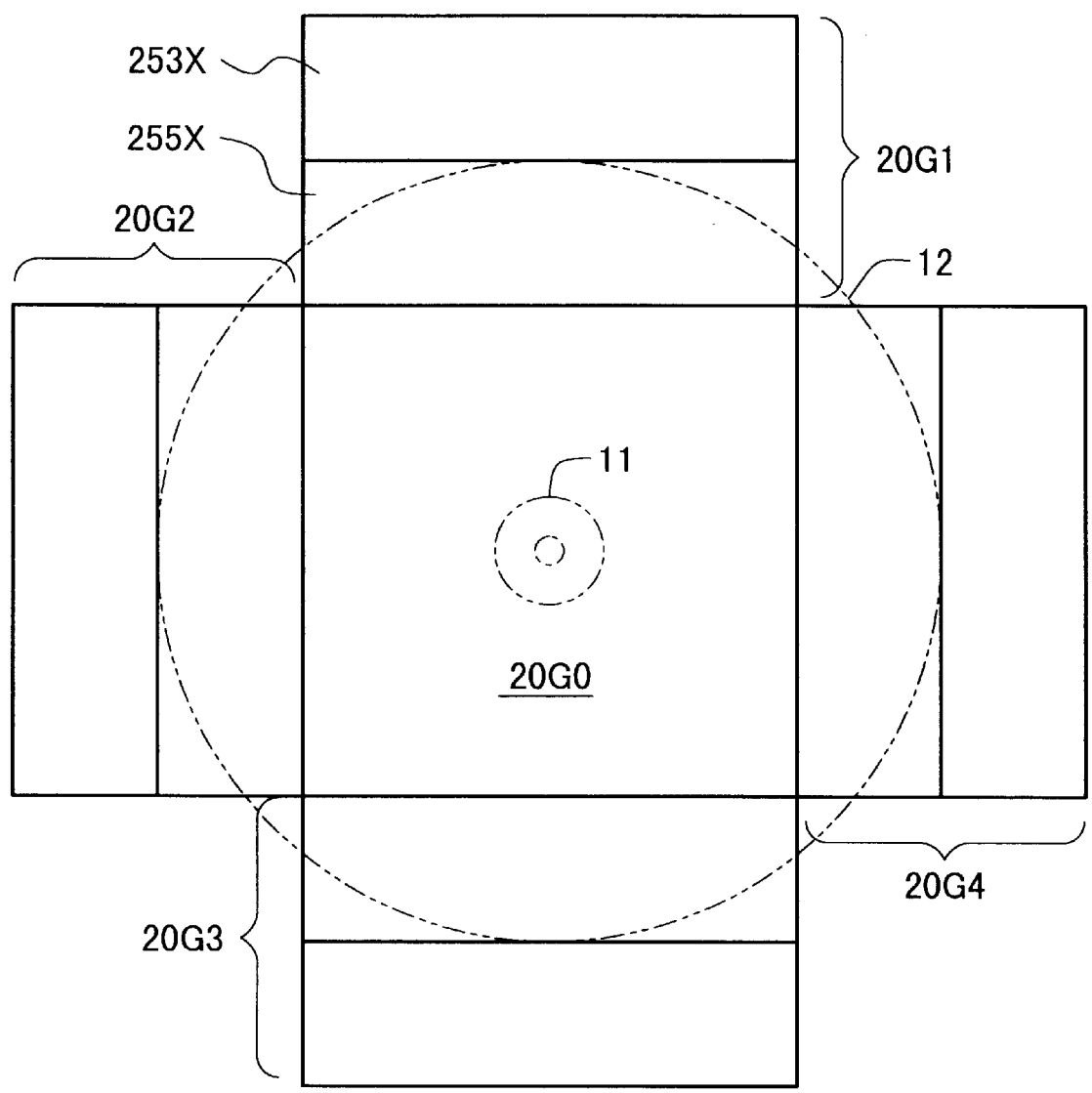
FIG. 39 is a schematic front view showing the configuration of a polarization conversion section in FIG. 38.

FIG. 39 is a schematic front view showing a configuration of the polarization conversion section.

This section comprises a middle part 20G0 and side parts 20G1 to 20G4 arranged along four outer peripheral sides of the middle part 20G0.

Figure 51:
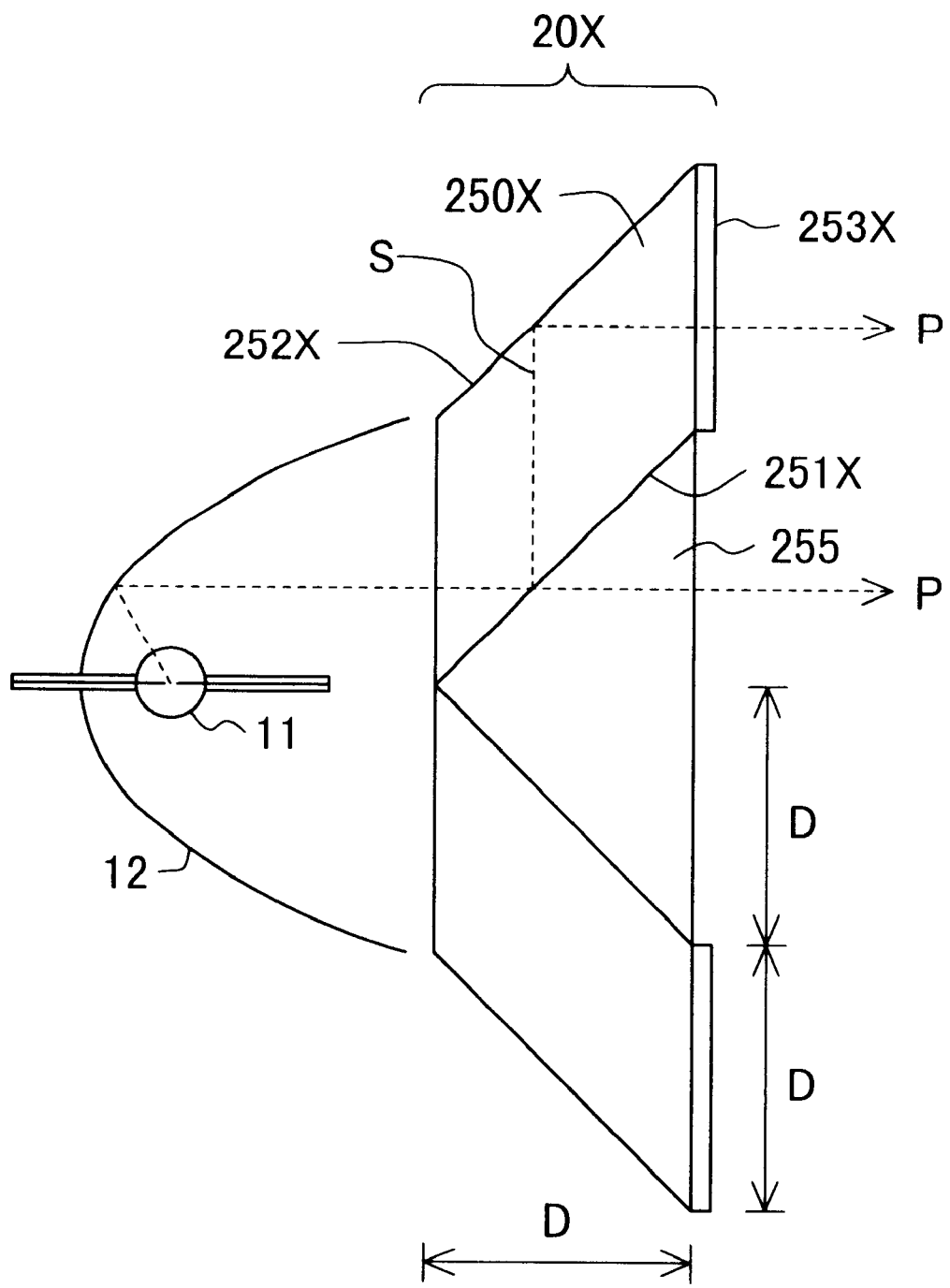
FIG. 51 is a schematic sectional view taken along the optical axis of a prior art polarized luminaire for use in a projection device.
Figure 52:
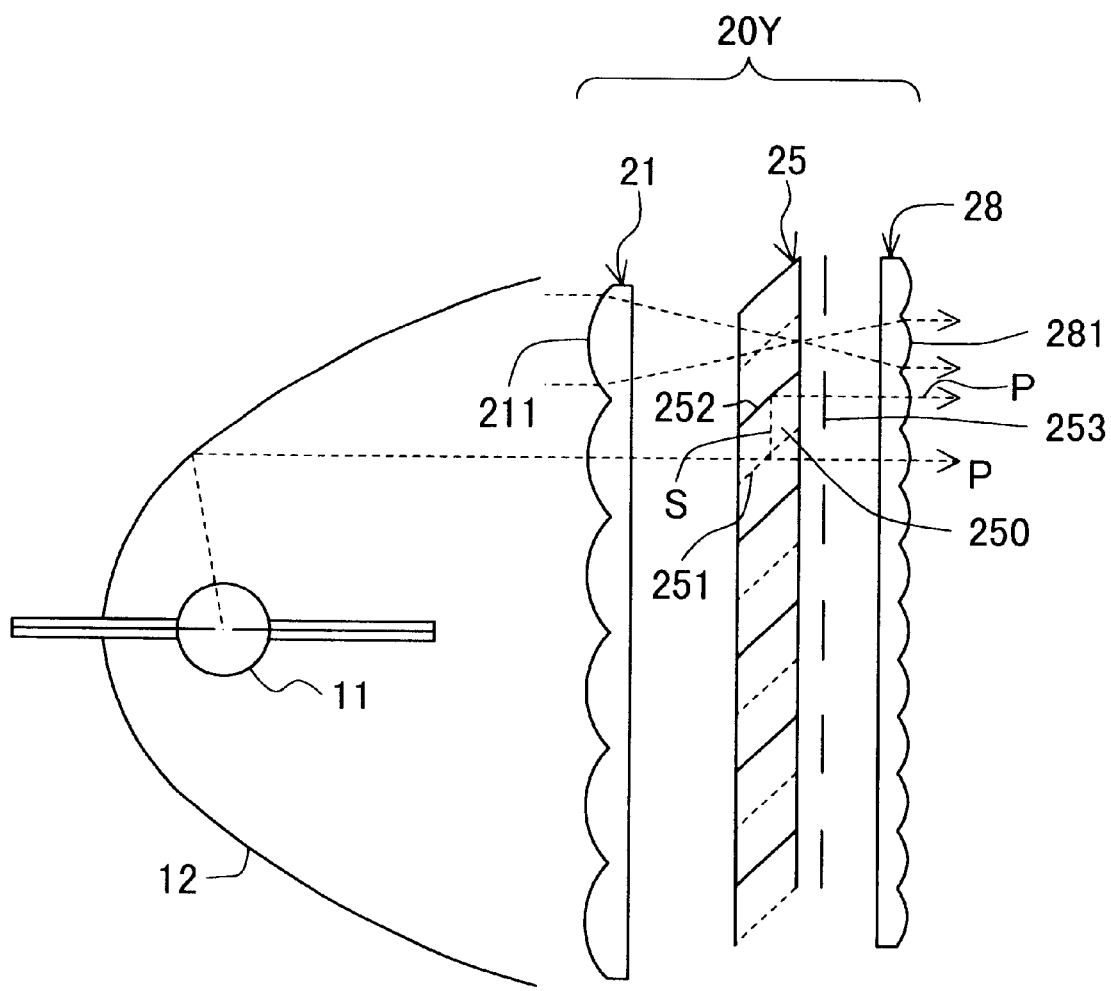
FIG. 52 is a schematic sectional view taken along the optical axis of another prior art polarized luminaire for use in a projection device.
Figure 53:
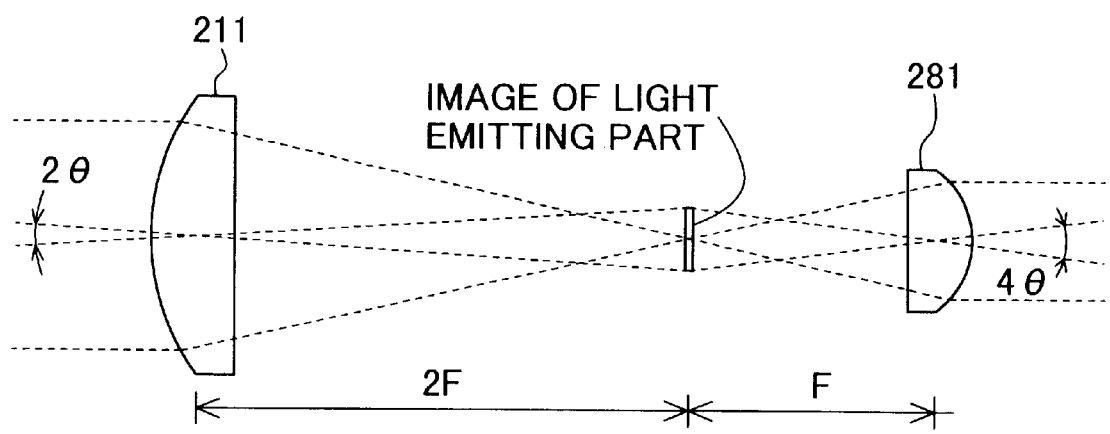
FIG. 53 is a optical path diagram showing a relation between a combination of convex lenses 211 and 281 in FIG. 52, and a divergence angle caused by a non-point light source.

The polarization conversion part 20G0 has the same structure as that of the polarization conversion device 20Y in FIG. 52 except for size. Each of the polarization conversion parts 20G1 to 20G4 has the same structure as one of the two halves obtained by dividing the polarization conversion device 20X in FIG. 51 with respect to a plane comprising the optical axis of the device 20X.

Figure 40A:
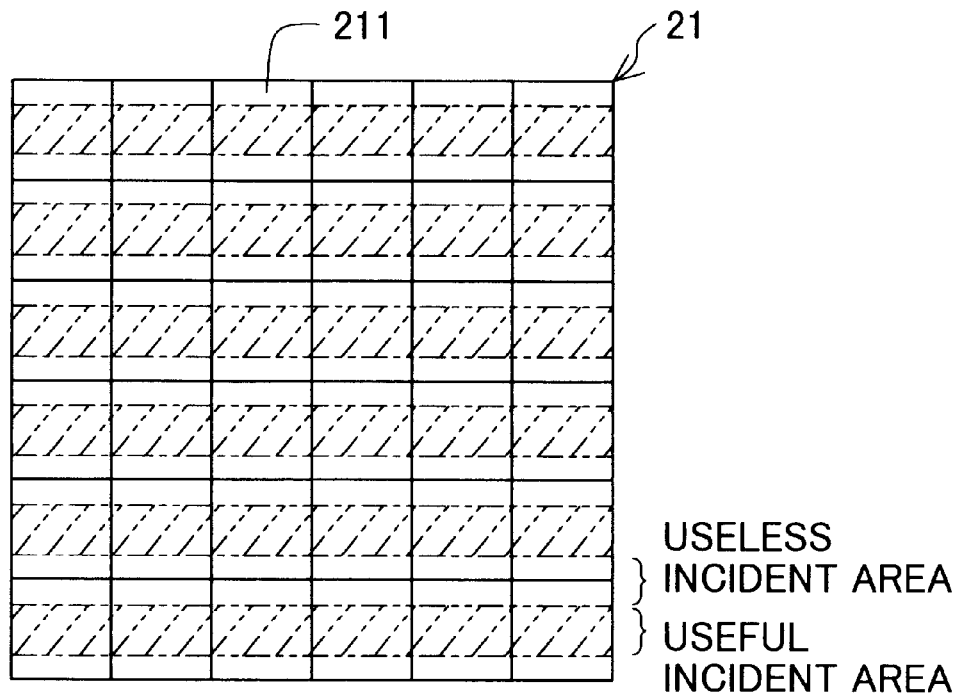
FIG. 40(A) is a plan view showing a lens partition of the lens array 21 in FIG. 38 with solid lines and useful incident areas on the polarization conversion element 25 with hatching of double dot and chain lines.
Figure 40B:
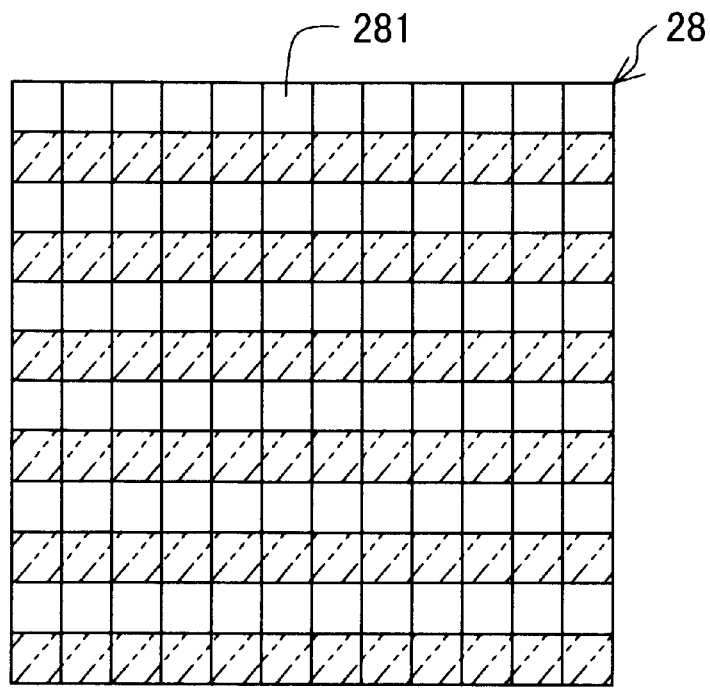
FIG. 40(B) is a plan view showing a lens partition of the lens array 28 in FIG. 38 with solid lines and useful incident areas on the polarization conversion element 25 with hatching of double dot and chain lines.

FIG. 40(A) shows a lens partition of the lens array 21 in FIG. 38 with solid lines and useful incident areas on the polarization conversion element 25 with hatching of double dot and chain lines, and FIG. 40(B) shows a lens partition of the lens array 28 in FIG. 38 with solid lines and useful incident areas on the polarization conversion element 25 with hatching of double dot and chain lines.

The convex lenses 211 of the lens array 21 and the convex lenses 281 of the lens array 28 each are rectangular and one convex lens 211 has the same size as a matrix of 2×2 convex lenses 281.

Since the polarization conversion part 20G0 is arranged in the middle place of the polarization conversion section 20G, almost all of light beams can be directed to the liquid crystal valves 35B, 35G and 35R in FIG. 13, thereby increasing light utilization efficiency, although parallelism thereof is deteriorated by passing through the polarization conversion part 20G0 as described above. Further, since the thickness DA of the polarization conversion part 20G1 is smaller than that of the thickness D in FIG. 51, the luminaire 30G can be compact and light.

Example parameters of the polarized luminaire 30G in FIG. 38 are as follows.

The parabolic mirror 12 has an aperture diameter of 100 mm,
the polarization conversion part 20G0 has a size of 50 mm×45 mm,
the polarization conversion part 20G0 has a thickness DA=50 mm,
the lens array 21 has a matrix of lateral 5×longitudinal 6, and each lens thereof has a size of lateral 10 mm×longitudinal 7.5 mm and a focal length of 30 mm, and
the lens array 28 has a matrix of lateral 10×longitudinal 12, and each lens thereof has a size of lateral 5 mm×longitudinal 3.75 mm and a focal length of 15 mm.

Twenty-second Embodiment

In the twenty-second embodiment according to the present invention, each of two lens arrays in FIG. 38 is constructed of one column of cylindrical lenses. Cross sections of the lens arrays are the same as those of the lens arrays 21 and 28 shown in FIG. 38 and each cylindrical lens extends in a direction perpendicular to the drawing paper.

Figure 41A:
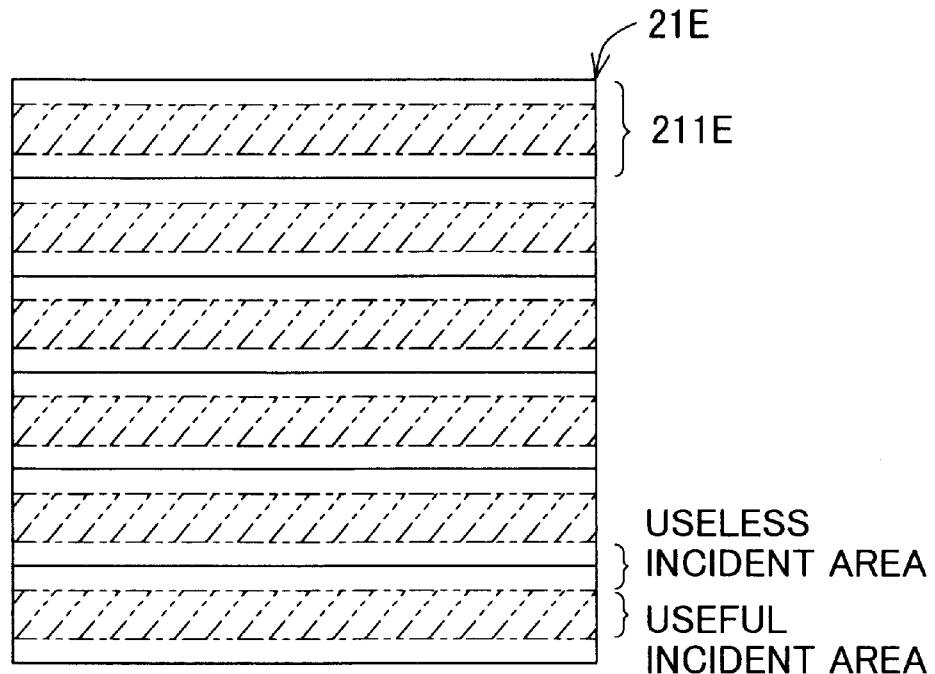
FIGS. 41(A) and 41(B) are views respectively corresponding to the views of FIGS. 40(A) and 40(B), of the twenty-second embodiment according to the present invention.
Figure 41B:
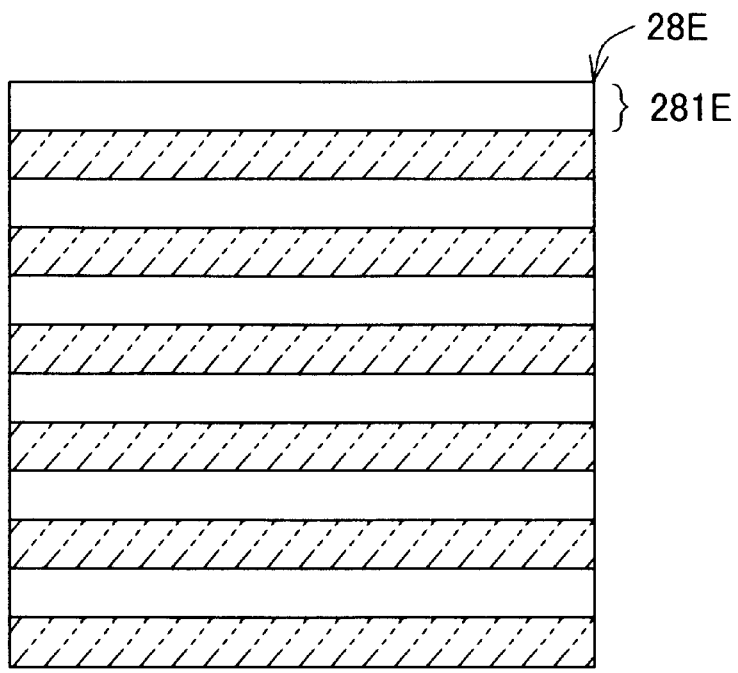

FIGS. 41(A) and 41(B) respectively correspond to FIGS. 40(A) and 40(B). FIG. 41(A) shows a lens partition of the lens array 21E with solid lines and useful incident areas on the polarization conversion element with hatching of double dot and chain lines. FIG. 41(B) shows a lens partition of the lens array 28E with solid lines and useful incident areas on the polarization conversion element with hatching of double dot and chain lines.

The cylindrical lens 211E has the same length as the cylindrical lens 281E, and the width of the cylindrical lens 211E is two times that of the cylindrical lens 281E.

The other points are the same as those of the twenty-first embodiment.

According to the twenty-second embodiment, since a divergence angle in the longitudinal direction of the cylindrical lens is not increased owing to focal length thereof is ∞, light utilization efficiency is improved.

Twenty-third Embodiment

Figure 42:
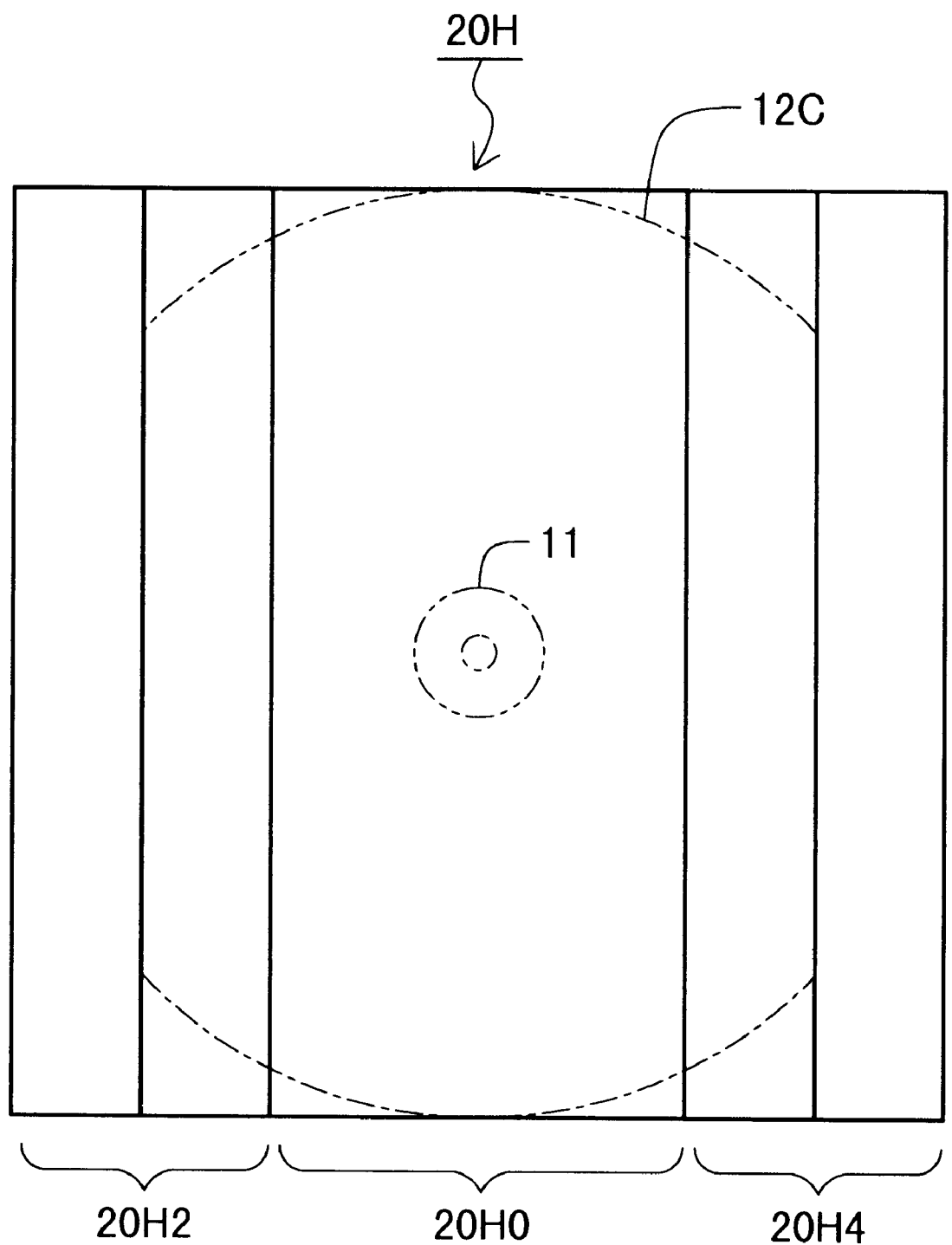
FIG. 42 is a schematic front view showing a configuration of a polarization conversion section of the twenty-third embodiment according to the present invention, corresponding to FIG. 39.
Figure 43:
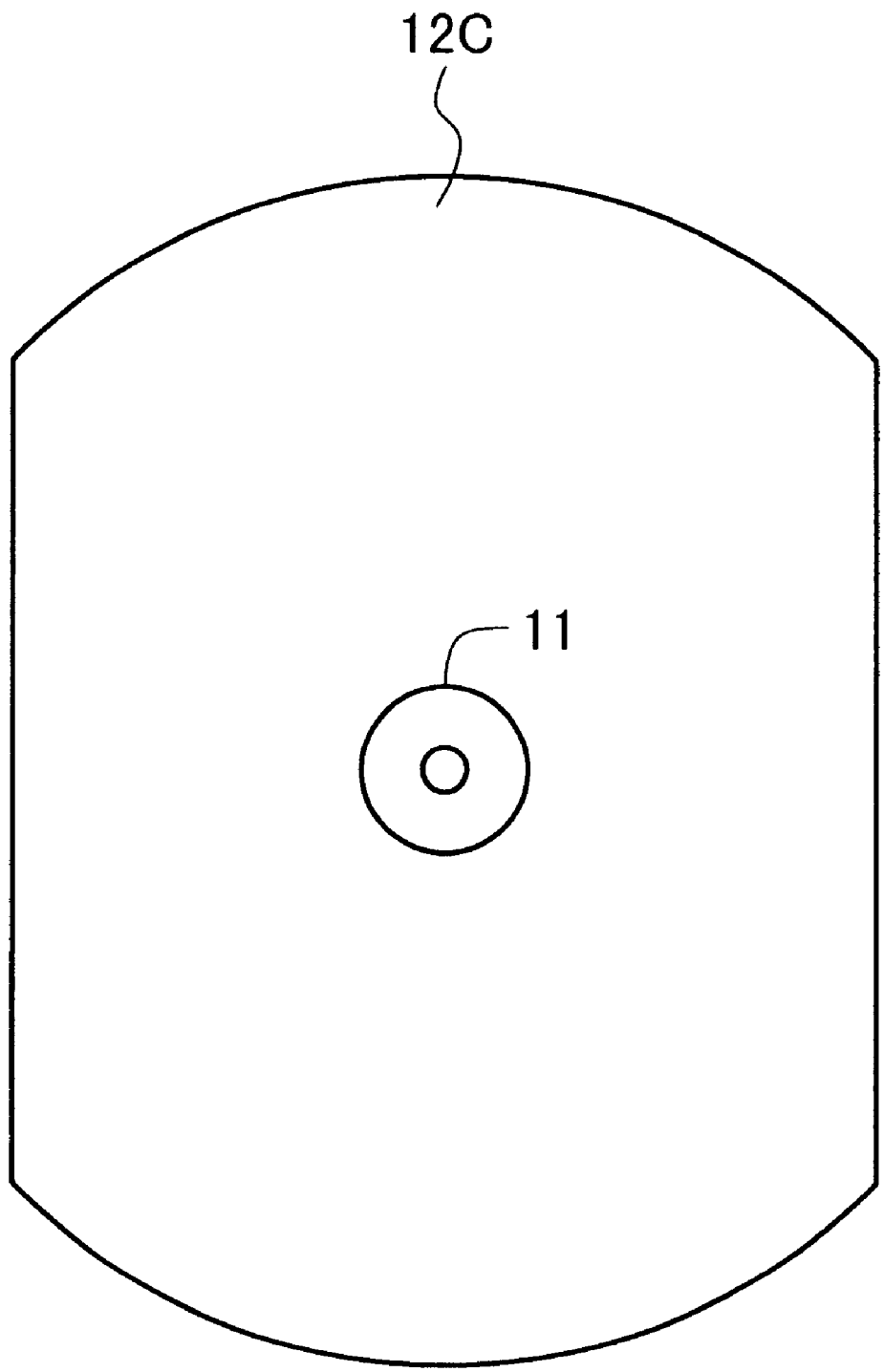
FIG. 43 is a schematic front view of a metal halide lamp and a parabolic mirror.

FIG. 42 is a schematic front view showing a configuration of a polarization conversion section of the twenty-third embodiment according to the present invention, corresponding to FIG. 39. FIG. 43 is a schematic front view of the metal halide lamp 11 and a parabolic mirror 12C.

In FIG. 43, the end portions in left and right sides of the parabolic mirror 12C are cut away, thereby increasing an air cooling effect against heat generation of the metal halide lamp 11. In the polarization conversion device 20H, side parts 20H2 and 20H4 are disposed on one and the other sides of the middle part 20H0. Lengths in longitudinal directions of the polarization conversion parts 20H0 to 20H4 are all equal to the diameter of the aperture of the parabolic mirror 12C.

The width in a lateral direction of the polarization conversion device 20H at its incident plane is equal to the width in a lateral direction of the aperture of the parabolic mirror 12C. The polarization conversion part 20H0 is disposed in front of the aperture of the parabolic mirror 12C with a longitudinal direction thereof being set in parallel to a longitudinal direction of the parabolic mirror 12C.

With such an arrangement of the polarization conversion device 20H relative to the parabolic mirror 12C, since the front shape of the polarization conversion device 20H is approximately similar to a shape of a rectangular liquid crystal panel of an aspect ratio of 3:4, light utilization efficiency is improved as compared with that in a case where the polarization conversion device 20H is rotated about the optical axis of the parabolic mirror 12C from the state of FIG. 42 by 90 degrees.

Further, a lens array is constructed of one column of cylindrical lenses as in the twenty-second embodiment, and the longitudinal direction thereof coincides with the longitudinal direction of the polarization conversion part 20H0. Thereby, light utilization efficiency for a liquid crystal panel is improved.

Example parameters of the polarized luminaire in FIG. 42 are as follows.

The parabolic mirror 12 has an aperture size of 60 mm×100 mm, the polarization conversion part 20H0 has its size of 40 mm×100 mm, and the polarization conversion device 20H has a light emitting surface with a size of 80 mm×100 mm.

Twenty-fourth Embodiment

Figure 44:
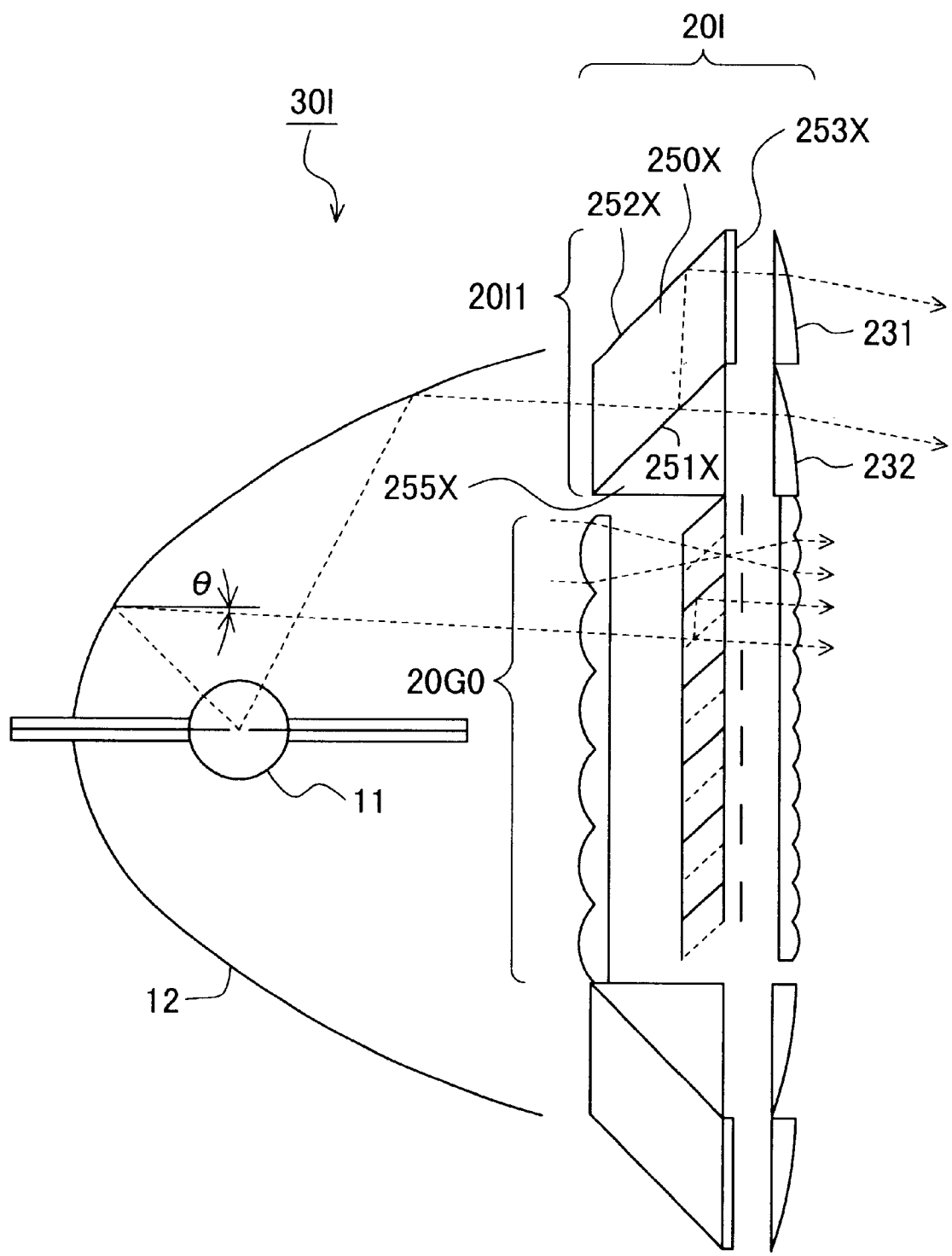
FIG. 44 is a schematic sectional view taken along the optical axis of a polarized luminaire of the twenty-fourth embodiment according to the present invention.

FIG. 44 is a schematic sectional view taken along the optical axis of a polarized luminaire 30I of the twenty-fourth embodiment according to the present invention. The same constituents as those corresponding in FIG. 38 are indicated by the same reference characters and descriptions thereof are omitted.

In the device, the arc gap center of the metal halide lamp 11 is deviated from the focal point of a parabolic mirror 12 a little toward the light emitting side on the optical axis. Thereby, a light flux from the parabolic mirror 12 is a converging light flux. The farther from the optical axis, the smaller a convergent angle of a light beam reflected by the parabolic mirror 12. Therefore, in the side part 30I1 of the polarization conversion device 30I, decentered lenses 231 and 232 are respectively arranged in front of the halfwave plate 253X and the right-angular triangle prism 255X. The decentered lenses 231 and 232 are respectively cylindrical lenses and the center of the curved surface of each lens exists approximately on the optical axis of the parabolic mirror 12. This applies to the other parts around the polarization part 20G0.

With such a configuration, the condenser lens 23 in FIG. 38 can be omitted, thereby decreasing a weight of the polarized luminaire 30I.

Example parameters of the polarized luminaire 30I in FIG. 44 are as follows.

The parabolic mirror 12 has an aperture diameter of 100 mm, the polarization conversion part 20G0 has a size of 50 mm×50 mm, the polarization conversion part 20I1 has a light emitting surface whose size is of 50 mm×100 mm, an optical path length from the aperture of the parabolic mirror 12 to a liquid crystal panel is of 200 mm, the liquid crystal panel has a size of 64 mm×48 mm, light from the parabolic mirror 12 has a divergence angle φ of about 4 degrees and an inclination angle θ to the optical axis of about 3.5 degrees, a refracting angle by the decentered lens 232 is of 5.3 degrees, an optical path length from the liquid crystal panel to a projection lens is of 200 mm, and a light spot at the projection lens has a diameter of about 62 mm. (in the case of the polarized luminaire of FIG. 52, a light spot at the projection lens has a diameter of about 100 mm.)

Twenty-fifth Embodiment

Figure 45:
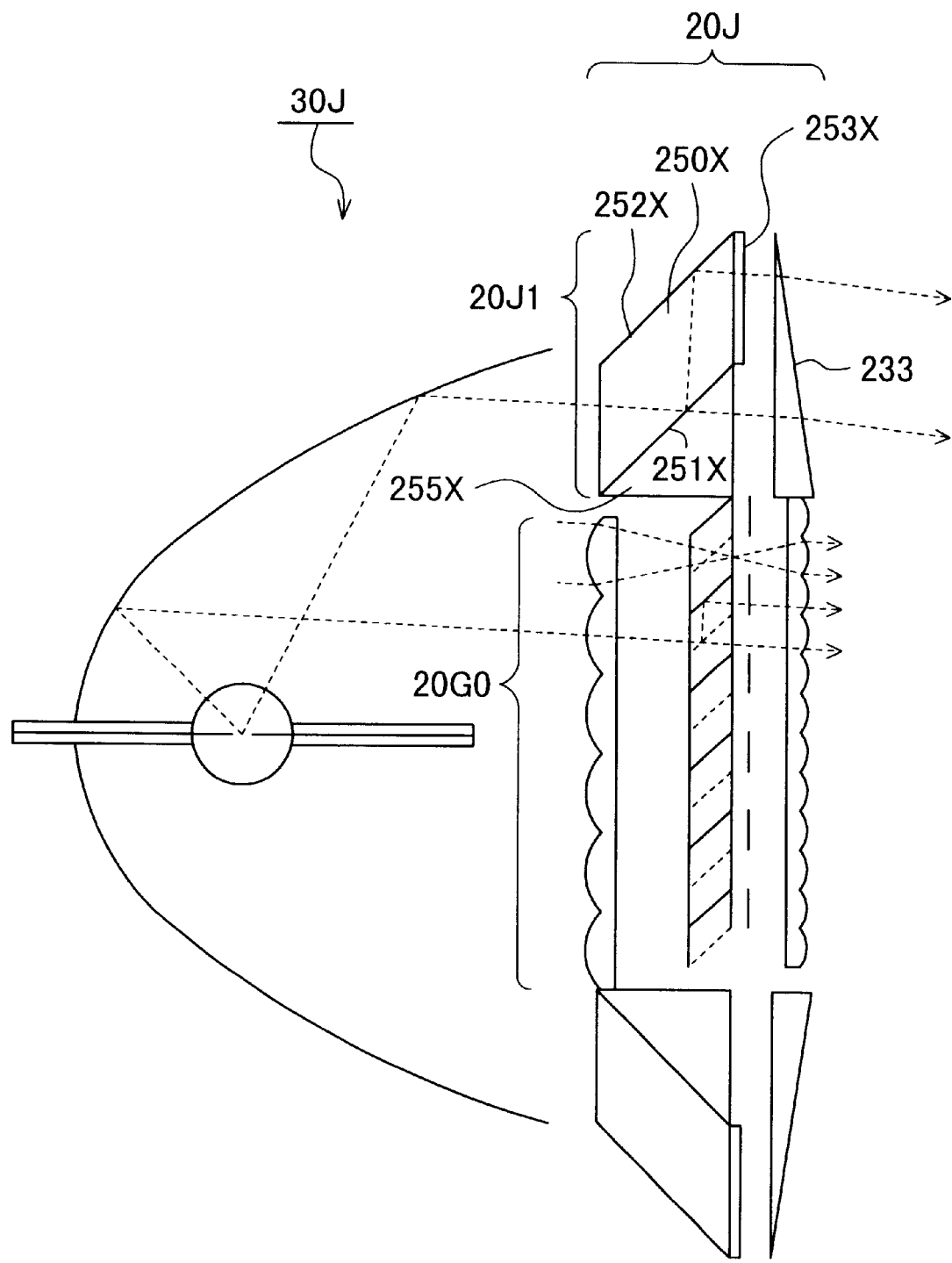
FIG. 45 is a schematic sectional view taken along the optical axis of a polarized luminaire of the twenty-fifth embodiment according to the present invention.

FIG. 45 is a schematic sectional view taken along the optical axis of a polarized luminaire 30J of the twenty-fifth embodiment according to the present invention. The same constituents as those corresponding in FIG. 44 are indicated by the same reference characters and descriptions thereof are omitted.

In this device, a wedge prism 233 is employed in stead of the decentered lenses 231 and 232 in FIG. 44 at a side part of a polarization conversion device 20J. This applies to the other polarization conversion parts around the polarization conversion part 20G0.

The other points are same as those in FIG. 44.

Twenty-sixth Embodiment

Figure 46:
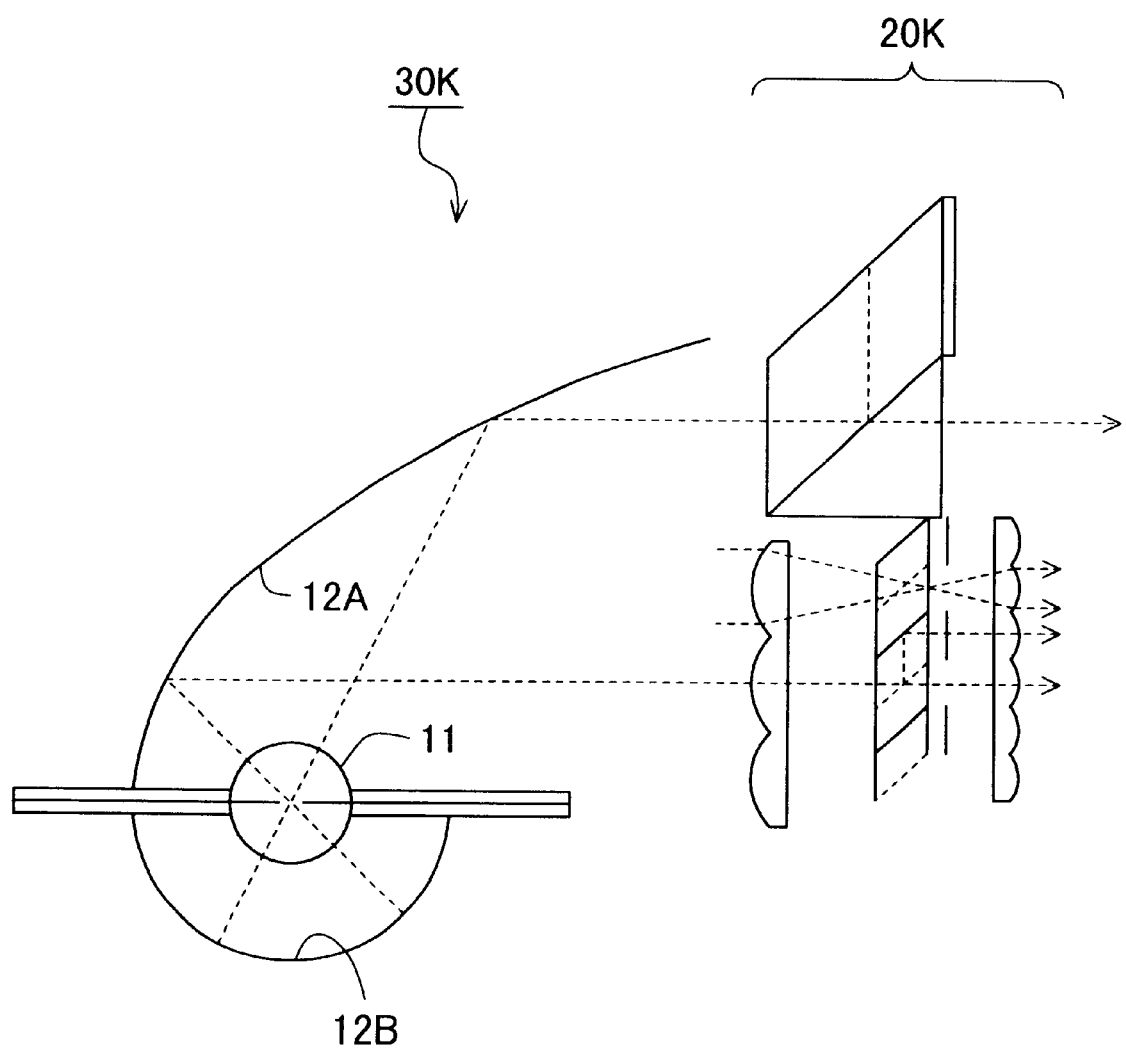
FIG. 46 is a schematic sectional view taken along the optical axis of a polarized luminaire of the twenty-sixth embodiment according to the present invention.

FIG. 46 is a schematic sectional view taken along the optical axis of a polarized luminaire 30K of the twenty-sixth embodiment according to the present invention. The same constituents as those in FIG. 38 are indicated by the same reference characters and descriptions thereof are omitted.

In the device, reflecting means for the metal halide lamp 11 is the same as that in FIG. 23.

Since the opening area of the aperture of the semi-parabolic mirror 12A is half that of the parabolic mirror 12 in FIG. 38, corresponding to this, the polarized luminaire 20K has a half construction of the polarized luminaire 20G in FIG. 38.

Herein, it should be noted that in regard to the above-described twenty-first to twenty-sixth embodiments, various changes and modifications thereof are included in the scope of the present invention.

For example, the total reflection mirrors 252 and 252X each are only required to reflect at least s-polarized light, and therefore each of them may be replaced with a polarization beam splitter or a total reflection mirror. Further a polarized luminaire is only required to be able to perform conversion to linearly polarized light whose polarization plane is of one direction, and therefore positions of halfwave plates and positions of no halfwave plates may be interchanged therebetween to convert unpolarized light to s-polarized light.

What is claimed is:

1. An illuminance distribution improving device for a luminaire comprising:
   a first lens array having a plurality of convex lenses each having a first focal length;
   a second lens array, having a plurality of lenses corresponding to respective lenses of said first lens array, disposed opposite to said first lens array; and
   a condenser lens disposed on the opposite side to said first lens array with respect to said second lens array,
   wherein a distance between said first and second lens arrays is substantially equal to said first focal length,
   wherein said second lens array has:
      a first lens group composed of a plurality of convex lenses each having a second focal length; and
      a second lens group composed of a plurality of lenses each having a second focal length negative or longer than that of said convex lenses of said first lens group.

2. A device according to claim 1, wherein in said second lens array, said lenses of said first lens group and said lenses of said second lens group are arranged in alternate and staggered manner.

3. A luminaire comprising:
   a light source;
   a collimator for collimating light emitted from said light source by reflecting or refracting; and
   an illuminance distribution improving device disposed so as to receive light from said collimator,
   wherein said illuminance distribution improving device comprises:
      a first lens array, having a plurality of convex lenses each having a first focal length, receiving light from said collimator;
      a second lens array, having a plurality of lenses corresponding to respective lenses of said first lens array, disposed opposite to said first lens array; and
      a condenser lens disposed on the opposite side to said first lens array with respect to said second lens array,
      wherein a distance between said first and second lens arrays is substantially equal to said first focal length,
      wherein said second lens array has:
         a first lens group composed of a plurality of convex lenses each having a second focal length; and
         a second lens group composed of a plurality of lenses each having a second focal length negative or longer than that of said convex lenses of said first lens group.

* * * * *